US007978355B2

(12) United States Patent
Suzuki et al.

(10) Patent No.: US 7,978,355 B2
(45) Date of Patent: *Jul. 12, 2011

(54) JOB SCHEDULING SYSTEM FOR PRINT PROCESSING

(75) Inventors: Akihiro Suzuki, Kanagawa (JP); Kentaro Yamada, Kanagawa (JP); Koji Nishiyama, Kanagawa (JP); Tooru Nakatani, Kanagawa (JP); Yoh Nakamura, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 159 days.

This patent is subject to a terminal disclaimer.

(21) Appl. No.: 12/382,051

(22) Filed: Mar. 6, 2009

(65) Prior Publication Data

US 2009/0180142 A1    Jul. 16, 2009

Related U.S. Application Data

(62) Division of application No. 09/364,070, filed on Jul. 30, 1999, now Pat. No. 7,630,092, which is a division of application No. 08/544,076, filed on Oct. 17, 1995, now Pat. No. 6,213,652.

(30) Foreign Application Priority Data

| Apr. 18, 1995 | (JP) | H7-092615 |
| Apr. 19, 1995 | (JP) | H7-093818 |
| Apr. 19, 1995 | (JP) | H7-093819 |
| Apr. 19, 1995 | (JP) | H7-093820 |
| Apr. 19, 1995 | (JP) | H7-117982 |
| Apr. 20, 1995 | (JP) | H7-095447 |
| Apr. 20, 1995 | (JP) | H7-095448 |
| Apr. 20, 1995 | (JP) | H7-095449 |

(51) Int. Cl.
*G06K 15/00* (2006.01)
*G06F 3/12* (2006.01)
(52) U.S. Cl. ................ 358/1.14; 358/1.15
(58) Field of Classification Search .......... 358/1.1, 358/1.9, 1.13, 1.14, 1.15, 1.18; 711/158
See application file for complete search history.

(56) References Cited

U.S. PATENT DOCUMENTS 4,947,345 A    8/1990    Paradise et al.
(Continued)

FOREIGN PATENT DOCUMENTS

DE    44 08 355    10/1994
(Continued)

OTHER PUBLICATIONS

IBM Technical Disclosure Bulletin, Enhanced Queue Management Program, Oct. 1987, vol. 30, Issue 5, pp. 242-248.*

*Primary Examiner* — Gabriel I Garcia
(74) *Attorney, Agent, or Firm* — Oliff & Berridge, PLC

(57) ABSTRACT

A job scheduling device that sequentially stores jobs, for which processing requests were received from terminals, in a queue and sequentially processes the jobs held in the queue using a job execution section having a plurality of queues provided corresponding to a status of a sequential job process, a scheduling unit that schedules the jobs using the plurality of queues, wherein each job has associated job information which includes job status information, and a recovery unit that recovers the status of each of the jobs being held in the plurality of queues.

1 Claim, 48 Drawing Sheets

U.S. PATENT DOCUMENTS

| | | | |
|---|---|---|---|
| 5,045,880 A | 9/1991 | Evanitsky et al. | |
| 5,179,637 A | 1/1993 | Nardozzi | |
| 5,206,735 A | 4/1993 | Gauvonski et al. | |
| 5,287,194 A | 2/1994 | Lobiondo | |
| 5,287,434 A | 2/1994 | Bain et al. | |
| 5,299,296 A | 3/1994 | Padalino et al. | |
| 5,398,289 A | 3/1995 | Rourke et al. | |
| 5,422,985 A | 6/1995 | Tanaka | |
| 5,467,434 A | 11/1995 | Hower et al. | |
| 5,517,316 A | 5/1996 | Hube | |
| 5,535,009 A | 7/1996 | Hansen | |
| 5,623,675 A | 4/1997 | Mizuki | |
| 5,638,511 A | 6/1997 | Nezu | |
| 6,047,111 A | 4/2000 | Sugiura et al. | |
| 6,213,652 B1 * | 4/2001 | Suzuki et al. | 358/1.15 |
| 6,272,606 B1 * | 8/2001 | Dorricott et al. | 711/158 |
| 7,148,991 B2 | 12/2006 | Suzuki et al. | |
| 7,630,092 B1 * | 12/2009 | Suzuki et al. | 358/1.14 |

FOREIGN PATENT DOCUMENTS

| | | |
|---|---|---|
| EP | 0 479 494 | 4/1992 |
| EP | 0 529 808 | 3/1993 |
| EP | 0 588 513 | 3/1994 |
| JP | 61-075463 | 4/1986 |
| JP | 62-008222 | 1/1987 |
| JP | 03-251915 | 11/1991 |
| JP | 04-075128 | 3/1992 |
| JP | 04-227537 | 8/1992 |
| JP | 04-364971 | 12/1992 |
| JP | A-05-022577 | 1/1993 |
| JP | 05-061774 | 3/1993 |
| JP | A-05-204566 | 8/1993 |
| JP | 05-284306 | 10/1993 |
| JP | A-05-289834 | 11/1993 |
| JP | A-05-330155 | 12/1993 |
| JP | A-06-019652 | 1/1994 |
| JP | A-06-035903 | 2/1994 |
| JP | 06-119129 | 4/1994 |
| JP | 06-127041 | 5/1994 |
| JP | 06-156868 | 6/1994 |
| JP | 06-242893 | 9/1994 |
| JP | A-06-348436 | 12/1994 |
| JP | 07-028612 | 1/1995 |
| JP | A-08-036472 | 2/1996 |
| JP | 63-276569 | 11/1998 |

* cited by examiner

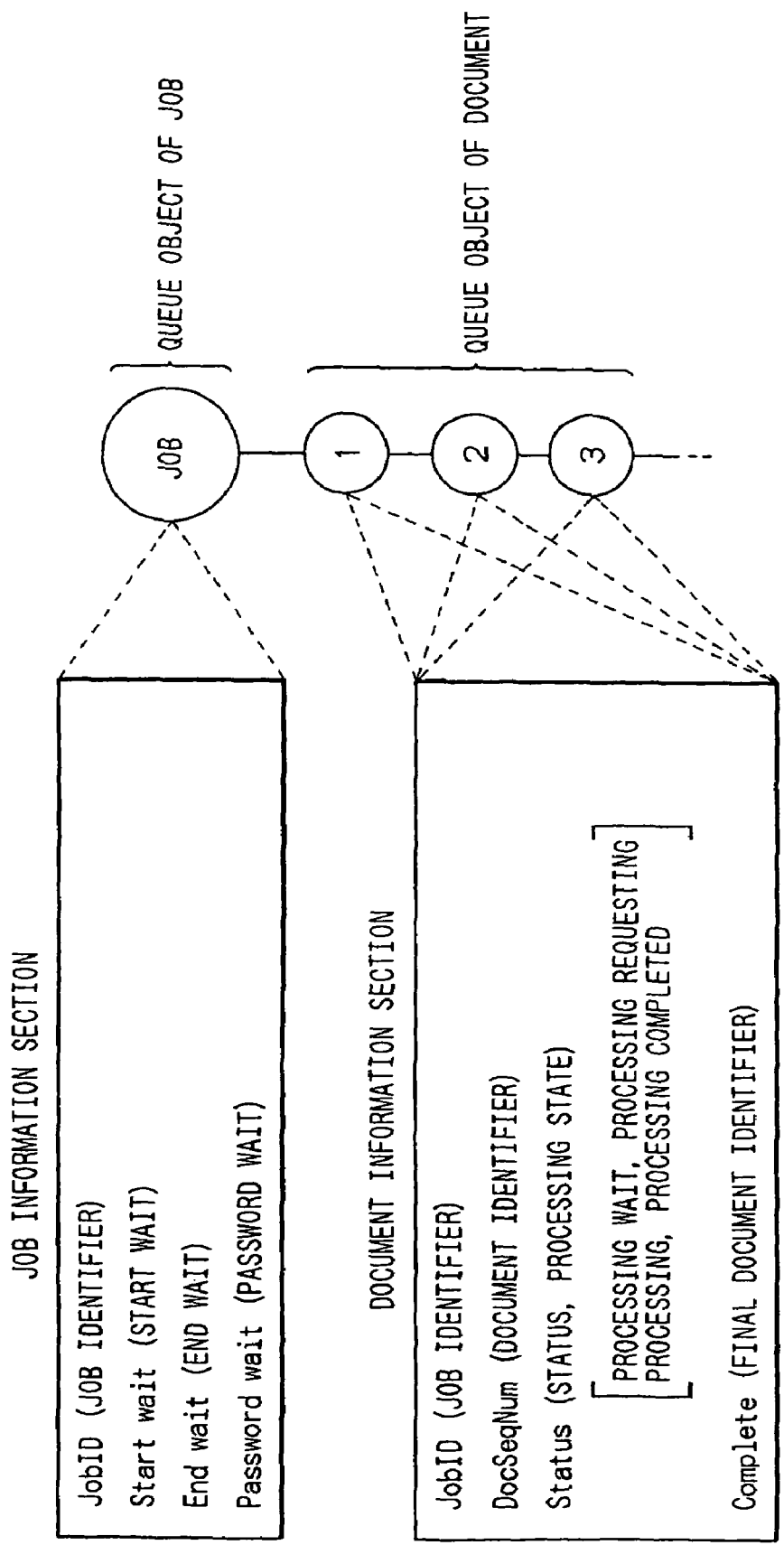

FIG. 30a

| JOB ATTRIBUTE | DOC1 ATTRIBUTE | DOC1 | DOC2 ATTRIBUTE | DOC2 | ... | DOCn ATTRIBUTE | DOCn |

FIG. 30b

| JOB ATTRIBUTE | DOC1 ATTRIBUTE | DOC2 ATTRIBUTE | ... | DOCn ATTRIBUTE |

FIG. 30c

| DOC1 | DOC2 | ... | DOCn |

FIG. 44

| MEMBER | EXPLANATION OF MEMBER |
|---|---|
| jobID | IDENTIFICATION NUMBER OF JOB |
| docsecNum | DOCUMENT IDENTIFICATION NUMBER OF ONE-JOB MULTIDOCUMENT |
| currentDocNum | docsecNum FOR ISSUING PRINT REQUEST |
| status | JOB STATUS |
| prevQID | PREVIOUSLY RETAINED QUEUE ID |
| jobCopyCount | NUMBER OF COPIES |
| requestCounter | NUMBER OF TIMES FOR REQUEST FOR PRINTING DOCUMENT TO JOB EXECUTION SECTION |
| completeCounter | NUMBER OF TIMES PROCESSING OF DOCUMENT IS TERMINATED |
| abortedCounter | NUMBER OF TIMES DOCUMENT BEING PROCESSED IS ABORTED |
| collateFlag | FLAG SHOWING WHETHER OR NOT COLLATION IS EFFECTED |
| resumeFlag | FLAG SHOWING WHETHER OR NOT RESUMING IS EFFECTED |
| previousStatus | PREVIOUS STATUS |
| retry | RETRY COUNTER WHEN REJECTED |
| complete | FLAG SHOWING WHETHER OR NOT THE DOCUMENT IS FINAL DOCUMENT |
| convertID | ID OF REQUESTED CONVERTER |
| ohPagesComp | NUMBER OF PAGES JOB IS OUTPUT |
| ohDocPagesComp | NUMBER OF PAGES DOCUMENT IS OUTPUT |
| ohCurJobState | CURRENT JOB STATE |
| ohPrevJobState | PREVIOUS JOB STATE |
| ohJobStateReason | REASON FOR CHANGE OF CURRENT JOB STATE |
| ohAssignJEID | ASSIGNED PRINTER ID |
| retryCounter | NUMBER OF RETRIES |
| processingFlag | FLAG SHOWING WHETHER OR NOT PRINTING IS BEING CARRIED OUT |

430a

JOB SCHEDULING SYSTEM FOR PRINT PROCESSING

This is a Division of application Ser. No. 09/364,070 filed Jul. 30, 1999 (now U.S. Pat. No. 7,630,092, issued Dec. 8, 2009), which in turn is a Division of application Ser. No. 08/544,076 filed Oct. 17, 1995 (now U.S. Pat. No. 6,213,652 issued Apr. 10, 2001), which claims the benefit of U.S. Japanese Patent Applications Nos. H7-92615 filed Apr. 18, 1995, H7-93818 filed Apr. 19, 1995, H7-93819 filed Apr. 19, 1995, H7-93820 filed Apr. 19, 1995, H7-117982 filed Apr. 19, 1995, H7-95447 filed Apr. 20, 1995, H7-95448 filed Apr. 20, 1995 and H7-95449 filed Apr. 20, 1995. The disclosures of the prior applications are hereby incorporated by reference herein in their entirety.

BACKGROUND

1. Field of the Invention

This invention relates to a job scheduling system which schedules job requests issued from a terminal equipment using a queue and requests a job execution section to carry out print processing by passing the jobs to the job execution section.

2. Discussion of the Related Art

In the print processing executed by a conventional print processing system, a job scheduling device receives a job request delivered from a terminal equipment in a network, and this job is sent to a job execution section after the job request has been subjected to a predetermined scheduling operation, whereby print processing and conversion are executed. The job scheduling device sequentially stores print data, which forms the job request, and an aggregate of attribute groups of the print data (hereinafter referred to as a document) in the queue as one operation unit (hereinafter referred to as a job). The scheduling operation is carried out job by job. Hereinafter, such scheduling is called the scheduling of a one-job-multidocument.

When a user attempts to produce a plurality of outputs of jobs having the same contents, a corresponding number of job requests must be issued in a conventional job processing system. These jobs are handled as different jobs, and therefore output results corresponding to these job requests are mixed with output results for job requests from another user. It takes much time for the user to distinguish the user's output results from other results.

Although a plurality of jobs share the same print data, each of the jobs requires the print data when a plurality of job requests are issued. When the volume of data is large, an increased burden is imposed on a memory device such as a disk. Further, when a job includes documents that require conversion, conversion is executed job by job, thereby resulting in poor processing efficiency. Thus, the use of various resources becomes wasteful.

On the other hand, a job processing can be carried out using acceptance completion type sequential processing or non-acceptance completion type sequential processing. In the acceptance completion type sequential processing, a document processing request is not issued until all of the documents, which form the job, are received. In the non-acceptance completion type sequential processing, processing requests are issued in the order in which the documents are received. The non-acceptance completion type sequential processing is suitable for the case where a high-speed printer is used. The acceptance completion type sequential processing is suitable for the case where the collation and uncollation of a job are controlled. However, in the acceptance completion type sequential processing, it is necessary to wait the issue of a processing request until all of the documents are received, which in turn delays scheduling and renders the overall processing time longer.

The collation (collation is carried out) means that the pages of a document are collated and a specified number of documents are output, and the uncollation (collation is not carried out) means that a specified number of documents are output page by page.

An object of the present invention is to provide a job processing system capable of improving job processing efficiency when a plurality of jobs having the same contents are output.

In the case of the scheduling of the conventional one-job multidocument, the next job processing request is not issued to the job execution section until a job at the head end of a printer queue is completed. So long as a previous job remains in the queue, the next job processing request is not issued. For this reason, it is possible to easily perform a processing start wait operation, or a processing completion wait operation, and a password input wait operation by checking whether or not the job at the head end of the printer queue is designated for a processing start wait, a processing completion wait, or a password input wait.

The job execution section having high throughput can process a plurality of documents at one time. However, the job scheduling device can only issue a job processing request at limited timing, and hence it was sometimes impossible to effectively utilize the throughput of the job execution section.

FIG. 21 is an explanatory view showing the relationship between the state of a printer queue and a document which is processed by a job execution section. In FIG. 21, a job scheduling device (not shown) is interposed between a printer queue 5 and a job execution section 6, and this job scheduling device schedules jobs. Jobs 1 to 4 are queued in the printer queue 5. Processing request for all documents have already been issued with respect to a job 1 at the head end of the queue. On the other hand, the processing of the job shifts sequentially from step 1 to step 3 in the job execution section 6.

For the jobs in the queue, a large circle at the top of each column represents a queue object of a job, and smaller circles following the large circle in each column represent queue objects of a document.

The job execution section 6 advances the processing of the document to step 2 when the processing at step 1 is completed, and informs the job scheduling device that it can accept a processing request. Upon receipt of the acknowledgement from the job execution section 6, the job scheduling device issues a processing request to the job execution section 6 for a document subsequent to the currently completed job, and executes processing of step 1. After the processing of step 3 has been completed, the job execution section 6 informs the job scheduling device of the completion of the processing of that document. The job scheduling device considers the processing of the document for which the acknowledgement has been issued to have been completed, and the job is moved to a terminate (completion) queue (not shown) after the processing of the final document of the job has been completed. The job scheduling device issues a processing request to the job execution section 6 with respect to the next job 2 at the head end of the printer queue 5.

In some case, the job scheduling device cannot issue a document processing request to the job execution section 6 even when the job execution section 6 is liable to carry out processing, which results in an unprocessed document is in the printer queue 5.

For example, FIG. 21 shows that processing requests for all jobs have already been issued with respect to the job 1, and that a job 1-4, i.e., a document 4 of the job 1, is being processed in the job execution section 6. When the job 1-4 is shifted to step 2 after having been subjected to the processing at step 1, it becomes possible to carry out the processing of step 1. The job execution section 6 informs the job scheduling device that it can accept processing. However, the job scheduling device has not yet received the acknowledgement of the completion of the processing of jobs 1-2, 1-3, and 1-4 from the job execution section 6. Accordingly, the job scheduling device can neither shift the job 1 from the head end of the printer queue 5 nor issue a processing request for a job 2-1. In other words, in spite of the fact that the job execution section 6 informs the job scheduling device that it can accept processing, the job execution section 6 cannot receive a processing request for the job 2-1 from the job scheduling device until the processing of the job 1-4 is finished. Hence, the job execution section 6 is idle for a waiting time, and it takes a long time to execute job processing. As a result of this, even if the job execution section 6 can process a plurality of documents at one time, it becomes impossible to effectively utilize the throughput of the job execution section.

As previously mentioned, the job scheduling device controls jobs by checking whether or not a job at the head end of the printer queue 5 is set to the processing start wait, or the processing completion wait, and the password input wait. If processing requests for documents were issued with respect to jobs other than the job at the head end of the queue when the job scheduling device received the acknowledgement from the job execution section 6, it will become impossible for the job scheduling device to control these jobs.

Another object of the present invention is to provide a job processing system capable of continuously issuing document processing requests without obstructing job control such as a processing start wait.

When print processing is conventionally carried out using a print server connected to a network system, it is necessary to send the print server print data described in a print format which a printer to be connected to the server can interpret. For this reason, a local user in the network system has to send print data after confirming the printer format of a printer, which accepts a print processing request. If the print data were sent together with a wrong print format for that printer, the print data might not be printed.

A print server is put forward which converts the print format of received print data to another print format which a printer connected to the print server can interpret when the print data described in a print format which the printer cannot interpret. The print format is a PDL format such as PostScript or Interpress.

Japanese Patent Unexamined Publication No. Hei. 3-251915 discloses a print server, wherein a printer name corresponding to a print command is sent to a print server before the transmission of print data, the print server selects print command converter means corresponding to the received print command, and the thus selected print command converter means control a printer connected to the print server.

However, in the case of the above mentioned conventional print server, the print format of the print data is converted immediately before the printer processes the print data. Hence, the printer comes to a standstill during the conversion of the print format, which in turn deteriorates the throughput of the printer. Particularly in the case of a completion type job, the conversion of a print format is not carried out until all documents are received, and hence the printer stops for a longer period of time.

Similarly, the print server disclosed in Japanese Patent Unexamined Publication No. Hei. 3-251915 converts the print format of print data to a data format of a printer connected to the server immediately before print processing is carried out. Therefore, the printer has to stop during the conversion of the print format.

Still another object of the present invention is to provide a print processing device designed to reduce the idle time of a printer and improve the throughput of the printer by previously converting a job including documents which need conversion processing.

In the scheduling of a conventional one-job multidocument, when it is necessary to process a plurality of documents as one job, an instruction to that effect is sent from terminal equipment together with a schedule attribute. This schedule attribute basically comprises two types of attribute; namely, an after-complete attribute and a before-complete attribute. The after-complete attribute means that a print processing device carries out scheduling in such a way as to execute a job upon receipt of all print documents related to that job. The before-complete attribute means that a print processing device carries out scheduling in such a way as to execute a job with respect to a received print document every time receiving each of print documents of that job.

By the way, document data to be transmitted might be interrupted as a result of a network failure while print requests for a plurality of print documents are being processed as one job. If such a receiving failure arises, the print processing device has to wait until the last document arrives in the case of the after-complete attribute, so that the print processing is interrupted for a long period of time. On the other hand, in the case of the before-complete attribute, previously received print documents are printed one by one, and therefore the printer is occupied for a long period of time until the current print processing is cancelled.

The present invention is conceived to solve these drawbacks in the conventional system, and the object of the invention is to provide print processing device and method wherein if the next document of a job is not received because of a failure, print processing will not be interrupted for a long period of time and a printer will not be occupied for a long period of time.

Generally, in a conventional network system, each of a number of subscriber workstations (client workstations) in the network issues a job processing request to each type of server, and the server which received that job processing request temporarily puts the job in a queue in the form of FIFO (First-In First-Out) and processes jobs in a stand-by state one by one. For example, in a print system, a print server which accepted print jobs from a client workstation stores the print jobs in a printer queue one after another and outputs the jobs in a stand-by state to a printer one by one every time the printer completes print processing. For this reason, a user who wants to quickly obtain a print output has to issue a print request to the print server as soon as possible, which might cause the user to erroneously specify print attributes such as a paper size and a tray number.

In addition, some of the current print systems can effect the print processing of a one-job multidocument in which a plurality of documents are handled as one job, as well as the print processing of a one-job one-document in which one job simply comprises one document. Therefore, an unwanted document often gets mixed in with a job.

In such a case, according to the conventional technology, it is necessary for the user to delete the job held in a queue which corresponds to the print request and to reissue a print request with modified attributes.

However, as a result of the deletion of and re-registration of the job retained in the queue, it takes a long time to obtain a print result, and an increased burden is imposed on the user. Further, the reissue of the print request results in increased network traffic, and might bring about competition for the print server by print requests from a plurality of clients. For this reason, it becomes more important to develop a technology of temporarily interrupting the processing of a job and resuming the job processing after the modification of attributes of a job retained in a queue of a print server and the cancellation of a specific document included in a one-job multidocument have been effected. On the assumption that a job is processed in the order in which the print server accepts a job, if a job which takes a massive amount of time is being processed, it will become impossible to start to process a subsequent job so long as the processing of the current job continues.

Therefore, the manner of implementing a technique for temporarily interrupting the processing of a job and resuming the job processing after the modification of attributes of a job retained in a queue of a print server and the cancellation of a specific document included in a one-job multidocument have been effected, becomes important.

According to the conventional technology, job processing is neither interrupted nor resumed on a job-by-job basis, and only the operation of the print server is interrupted and resumed. For example, Japanese Patent Unexamined Publication No. Sho. 63-276569 discloses an off-line printer, wherein information relating to a print position when printing is terminated during the course of the printing operation is output to a permanent recording medium such as print paper or a non-volatile storing medium such as a magnetic disk, so that printing can be reliably and easily resumed from an accurate print position. Even in this printer, print processing is not interrupted and resumed on a job-by-job basis, but only the printer is interrupted and resumed.

The object of the present invention is to solve the above drawbacks in the conventional technology and to provide a job processor capable of improving processing efficiency by effecting the interruption and resumption of print processing on a job-by-job basis as well as easily modifying attributes of a job retained in a queue and canceling a specific document included in a one-job multidocument.

There is a technology conventionally known as a remedy for a network system failure, wherein information relating to failures occurred with respect to subscribers on the network is temporarily stored in a log file, and causes of the failures are identified based on the information relating to the failures stored in the log file. For example, Japanese Patent Unexamined Publication No. Sho. 61-75463 discloses an information processing system configured in such a way that each information processor collects status information, representing an internal state of the processor itself, under control of an abnormal processing program which is executed in response to the occurrence of an external interruption or the detection of an abnormality, and sends the collected status information to each of the information processors having a display, whereby status information for each information processor is displayed. In other words, this conventional technology makes it easy to increase the speed of identification of failures by collecting status information using the detection of abnormality as a trigger, and displaying the status information on a display.

However, according to this conventional technology, it is necessary to collect information about failures and store the information in a log file. Further, a system manager has to analyze and restore the information held in the log file, and hence it takes a long time to restore the information to its original state immediately before the occurrence of the failure. For example, on the assumption that a plurality of print jobs are received from a plurality of terminals through a network, and that a job scheduling device which prints the plurality of print jobs one after another using a job execution section (a printer) is used, if any failures occurred in the job scheduling device or the printer, the state of the job scheduling device or the printer will be temporarily stored in a log file, and thereafter attempts to recover the job scheduling device or the printer from the failure will be made based on an analysis of the failures by a system manager.

In other words, once such failures have occurred, the failures affect each of the jobs held in the job scheduling device, and therefore it often takes a long time to recover the jobs from the influence of the failures. For example, if a failure arises during the course of deletion of a job held in the job scheduling device, print data relating to that job will be deleted, but attributes of that print data will remain undeleted. For this reason, the system manager has to delete the attributes later.

For these reasons, a degree of improvement in an operating efficiency attained as a result of reducing the influence of failures exerted on a job if the above mentioned failures arise, becomes important. Particularly, in a system which carries out parallel processing such as multiprocessing, one failure affects all other portions in the system.

The object of the present invention is to solve the above mentioned drawbacks in the conventional technology and to provide a job scheduling device capable of reducing the influence of system failures if they arise in a system and executing job processing according to an instruction from a user.

A conventional printing system, such as a so-called print system and a copying system, employs a known technology in which print attributes (hereinafter referred to as attribute information) consisting of a paper size, a tray number, and the availability of double-sided printing are added to print data, and printing is carried out based on the attribute information. For example, when print data or copying data are output, attribute information consisting of, for example, a paper size, the number of pages, and the availability of double-sided printing, necessary for printing is set. As a result of sending the attribute information to an output device together with document data or copying data, the print data or the copying data are output in a desired format. In this way, when a print request is issued, printing is carried out based on the attribute information, and therefore the handling of the attribute information becomes important.

However, according to such a conventional technology, the user who issues a print request or a terminal equipment which the user uses, added the attribute information to print data. For this reason, if a print server, or the like, accepted the print request as a print job, it would not have been allowed to change the attribute information. Hence, if the user erroneously specified the attribute information or if the terminal added the attribute information to the print data because the user had forgot to specify the attribute information, it would have become necessary to temporarily cancel the print job once and to issue a new print request given desired attribute information. This imposes an increased burden on the user, as a result of the re-registration of a print request, and brings about a drop in the efficiency of use of a network. Further, a time lag arises before a print output is obtained. Namely, the increased burden on the user, a drop in the efficiency of use of the network, and a print waiting time becomes important.

The present invention is conceived to solve the above mentioned drawbacks in the conventional technology, and the object of the invention is to provide a job scheduling device capable of easily modifying attribute information by reducing a user's burden, a drop in the efficiency of the use of a network, and a print waiting time.

SUMMARY OF THE INVENTION

A first object of the present invention is to provide a job processing system capable of improving the processing efficiency of a job when a plurality of jobs having the same contents are output.

A second object of the present invention is to provide a job processing system designed so as to be able to continuously output document processing requests without obstructing job control such as a processing start wait.

A third object of the present invention is to provide a print processing equipment designed so as to reduce idle time of a printer and to improve a throughput of the printer by previously converting a job including documents which need conversion.

A fourth object of the present invention is to provide a job processing system which prevents the interruption of processing for a long period of time and the occupying of a printer for a long period of time even if the processing system cannot accept the next document of a job for reasons of failures.

A fifth object of the present invention is to provide a job processing equipment capable of solving the previously mentioned drawbacks in the conventional technology, modifying attributes of a job retained in a queue, easily canceling a specific document included in a one-job multidocument, and improving processing efficiency by effecting the interruption and resumption of processing on a job-by-job basis.

A sixth object of the present invention is to provide a job scheduling device capable of reducing the influence of system failures and carrying out jab processing according to a user's instruction even when failures arise in a system.

A seventh object of the present invention is to provide a job scheduling device capable of easily modifying attribute information by reducing a user's burden, a drop in the efficiency of use of a network, and print waiting time even if the attribute information is erroneously specified.

According to a first aspect of the present invention, there is provided a job processing system comprising a terminal equipment for issuing a job request by handling a plurality of documents as one job, and a job scheduling device which sequentially processes jobs by storing the jobs, received from the terminal equipment through a network, in a queue and sending a job execution section a processing request relating to a document specified by the job stored in the queue, the terminal equipment comprising: attribute information adding means for adding information which specifies a job output method to a job request as attribute information of the job, and the job scheduling device comprising: attribute information setting means for acquiring attribute information included in the received job and sets the attribute information to information which specifies a job and a document; a queue for storing, as a job, a group of items of the information which specify a job and a document; and output result control means which, upon reference to the information items which specify a job and a document with respect to the job stored in the queue, controls the processing request issued to the job execution section in such a way that a specified number of copies of the job are output using the information which specifies a job output method.

According to a second aspect of the present invention, there is provided a job processing system comprising a terminal equipment for issuing a job request by handling a plurality of documents as one job, and a job scheduling device which sequentially processes jobs by storing the jobs, received from the terminal equipment through a network, in a queue and sending a job execution section a processing request relating to a document specified by the job stored in the queue, the terminal equipment comprising: attribute information adding means for adding information relating to the number of copies of the job and information relating to a job output result to the job request as job attribute information, and the job scheduling device comprising: attribute information setting means for acquiring attribute information included in the received job and sets the attribute information to information which specifies a job and a document; a queue for storing, as a job, a group of items of the information for specifying a job and a document; and output result control means which, upon reference to the information for specifying a job and a document with respect to the job stored in the queue, controls the processing request issued to the job execution section in such a way that a specified number of copies of the job are only output in a collated manner if collation processing is specified in the information relating to a job output result to using the information which specifies a job and a document, or in such a way that a specified number of copies of the job are only output in an uncollated manner if uncollation processing is specified in the information relating to the job output result using the information which specifies a job and a document.

According to a third aspect of the present invention, there is provided a job processing system comprising a terminal equipment for issuing a processing request by handling a plurality of documents as one job, a job execution section for printing the documents, and a job scheduling device which accepts a document input from the terminal equipment through a network and issues a processing request relating to that document to the job execution section, the terminal equipment comprising: control information specifying means for specifying a processing start wait for a leading document among the plurality of documents, and the job scheduling device comprising: preparation means for preparing information which specifies a received document; queuing means for storing the prepared information which specifies the document by associating the information on a job-by-job basis; control information setting means which, if a processing start wait is specified for the leading document among a plurality of received documents, sets the processing start wait to information for specifying this leading document; and control state setting means which, if the processing start wait is set to information which specifies the leading document of the job stored in the queuing means, renders that job in a processing start wait state, and wherein the job scheduling device sequentially retrieves jobs stored in the queuing means when the job execution section becomes enabled to accept processing, issues a processing request for a corresponding document when there is information specifying a document to which a processing request can be issued, and when a job is placed in the processing start wait state, prevents the issue of processing requests with respect to a document for that job and documents for subsequent jobs until that job is released from the processing start wait state by a user's instruction or a timeout.

According to a fourth aspect of the present invention, there is provided a job processing system comprising a terminal equipment for issuing a processing request by handling a plurality of documents as one job, a job execution section for printing the documents, and a job scheduling device which accepts a document input from the terminal equipment through a network and issues a processing request relating to that document to the job execution section, the terminal equipment comprising: control information specifying means for specifying a processing completion wait for a leading document among the plurality of documents, and the job scheduling device comprising: preparation means for preparing information which specifies a received document; queuing means for storing the to prepared information which specifies the document by associating the information on a job-by-job basis; control information setting means which, if a processing completion wait is specified for the leading document among a plurality of received documents, sets the processing completion wait to information for specifying this leading document; and control state setting means which, if the processing completion wait is set to information which specifies the leading document of the job stored in the queuing means, renders that job in a processing completion wait state, and wherein the job scheduling device sequentially retrieves jobs stored in the queuing means when the job execution section becomes enabled to accept processing, issues a processing request for a corresponding document when there is information specifying a document to which a processing request can be issued, and when a job is placed in the processing completion wait state, prevents the issue of processing requests with respect to a document for that job and documents for subsequent jobs until that job is released from the processing completion wait state by a user's instruction or a timeout.

According to a fifth aspect of the present invention, there is provided a job processing system comprising a terminal equipment for issuing a processing request by handling a plurality of documents as one job, a job execution section for printing the documents, and a job scheduling device which accepts a document input from the terminal equipment through a network and issues a processing request relating to that document to the job execution section, the terminal equipment comprising: control information setting means for specifying a password input wait for a leading document among the plurality of documents, and the job scheduling device comprising: preparation means for preparing information which specifies a received document; queuing means for storing the information which specifies the document by associating the information on a job-by-job basis; control information setting means which, if a password input wait is set for the leading document among a plurality of received documents, sets the password input wait to information which specifies that leading document; and control state setting means which, if the password input wait state is set to information which specifies the leading document of the job stored in the queuing means, renders that job in a password input wait state, wherein the job scheduling device sequentially retrieves jobs stored in the queuing means when the job execution section becomes enabled to accept processing, issues a processing request for a corresponding document when there is information specifying a document to which a processing request can be issued, and when a job is placed in the password input wait state, prevents the issue of processing requests with respect to a document of that job and documents of subsequent jobs until that job is released from the password input wait state by a user's instruction or a timeout.

According to a sixth aspect of the present invention, there is provided a job processing system comprising a terminal equipment for issuing a processing request, and a job scheduling device which sequentially processes jobs by storing the jobs received from the terminal equipment in a queue and issuing a processing request, relating to a document specified by the job stored in the queue, to a job execution section, the terminal equipment comprising: attribute information adding means for adding information relating to job wait control and message information relating to the wait control to the job request as attribute information, and the scheduling device comprising: job information preparing means for preparing job information which specifies a received job; attribute information setting means for setting attribute information included in the received job in the job information; a queue for storing the prepared job information in order; control state setting means which, if wait control is set to the job information stored in the queue, renders a job associated with that job information in a wait control state when processing of that job is started or completed; and message information informing means which, when the job enters the wait control state, informs the terminal equipment of message information set with respect to that job.

According to a seventh aspect of the present invention, there is provided a print processor which prints a document in response to a job request received through a network, the print processor comprising: job accepting means for accepting the job request; queuing means for storing the accepted jobs in sequential order; output means for printing a document specified by the job stored in the queuing means; converting means for converting the document into a format which the output means can interpret; and conversion control means for causing the converting means to convert a document which needs to be converted when being printed by the output means, wherein the converting means informs the conversion control means that it can carry out conversion when conversion processing becomes available, and wherein the conversion control means retrieves a document in a format which the output means cannot interpret from among the documents specified by the job stored in the queuing means, and causes the converting means to convert the format of that document.

According to an eighth aspect of the present invention, there is provided a print processor which carries out printing upon receipt of a job processing request, including an instruction for processing print requests for a plurality of documents as one job and scheduling attributes, from a plurality of terminals through a network, the print processor comprising: timer means which, upon receipt of a job processing request from the terminal, checks whether or not a next print document was received within a predetermined period of time by monitoring a series of documents included in the job processing request; scheduling attribute judging means which, upon receipt of the job processing request, judges whether the scheduling attributes are after-complete attributes which carry out scheduling in such a way that the execution of a job is started upon receipt of all print documents related to the job or before-complete attributes which carry out scheduling in such a way that a job is executed with respect to a received print document every time each print document is received; final document processing means which, when the timer means has judged that the next print document could not be received within a predetermined period of time during the reception of the job processing request, handles a print document which was received immediately before this judgment as a final document of the current job, if the scheduling attributes are the after-complete attributes; and job completion processing means which, when the timer means has judged that the next print document could not be received within a predetermined period of time during the reception of the job processing request, completes the job by handling a print document which was received immediately before the judgment as the final document of the current job, if the scheduling attributes are the before-complete attributes.

According to a ninth aspect of the present invention, there is provided a print processing method for use in a print processor in the case where a receiving failure arises during receipt of a job processing request, which includes an instruction for processing print requests for a plurality of documents as one job and scheduling attributes, from a plurality of terminals through a network, the print processing method comprising the steps of: judging whether or not a next print document was received within a predetermined period of time by monitoring the time at which the next print document is received while a series of print documents included in the job processing request from the terminal are received; judging, from the received job processing request, whether the scheduling attributes are after-complete attributes which carry out scheduling in such a way that the execution of a received job is started upon receipt of all print documents related to this job or before-complete attributes which carry out scheduling in such a way that a job is executed with respect to a received print document every time a print document is received; executing a job by handling a print document received immediately before the judgment of the reception of the next print document as a final print document of this job when the next print document is not received within a predetermined period of time, if the scheduling attributes are the after-complete attributes; and completing the job by dealing a print document received immediately before the judgment of the reception of the next print document as the final document of this job when the next print document is not received within a predetermined period of time, if the scheduling attributes are the before-complete attributes.

According to a tenth aspect of the present invention, there is provided a job processing device which sequentially executes jobs for which processing requests were accepted, the job processing device comprising: first queuing means for sequentially storing jobs for which processing requests were accepted; second queuing means for sequentially storing jobs whose processing is to be interrupted from among the jobs stored in the first queuing means; queue control means which moves the job stored in the first queuing means from the first queuing means to the second queuing means in response to a job processing interruption request and moves the jobs stored in the second queuing means from the second queuing means to the first queuing means in response to a job resumption request; and job execution means for sequentially executing the jobs stored in the first queuing means.

According to an eleventh aspect of the present invention, there is provided a job scheduling device which sequentially stores jobs, for which processing requests were received from terminals, in a queue and sequentially processes the jobs held in the queue using a job execution section, the job scheduling device comprising: a plurality of queues provided corresponding to states of the jobs; scheduling means for scheduling the jobs using the plurality of queues; and recovery means for recovering previous state of each of the jobs being held in the plurality of queues, at the time of recovery from a failure, if any failure occurred while the jobs are being scheduled by the scheduling means.

According to a twelfth aspect of the present invention, there is provided a job scheduling device for storing, in a queue, print jobs which include print data and attribute information and for which processing requests were received from terminals, and for sequentially printing the print jobs held in the queue based on the attribute information using a job execution section, the job scheduling device comprising: a plurality of queues provided corresponding to print job states; scheduling means for scheduling the print jobs using the plurality of queues; and attribute modifying means for modifying the attribute information only when a print job can be changed at the time that an instruction for modifying the attribute information of the print job is received, and when instruction is free from errors.

BRIEF DESCRIPTION OF THE DRAWINGS

FIG. 10 is a schematic representation showing queue objects in a second embodiment of the present invention;

FIGS. 30a to 30c are schematic representations showing one example of data structure of a document printing request in the fourth embodiment;

FIG. 44 is an explanatory view showing the configuration of job information queued in each of the queues shown in FIG. 42;

DETAILED DESCRIPTION OF THE PREFERRED EMBODIMENTS

With reference to FIGS. 1 to 9, a job processing system according to a first embodiment of the present invention will now be described. The job processing system of the first embodiment efficiently carries out job processing when a plurality of jobs having the same contents is output.

Figure 1:
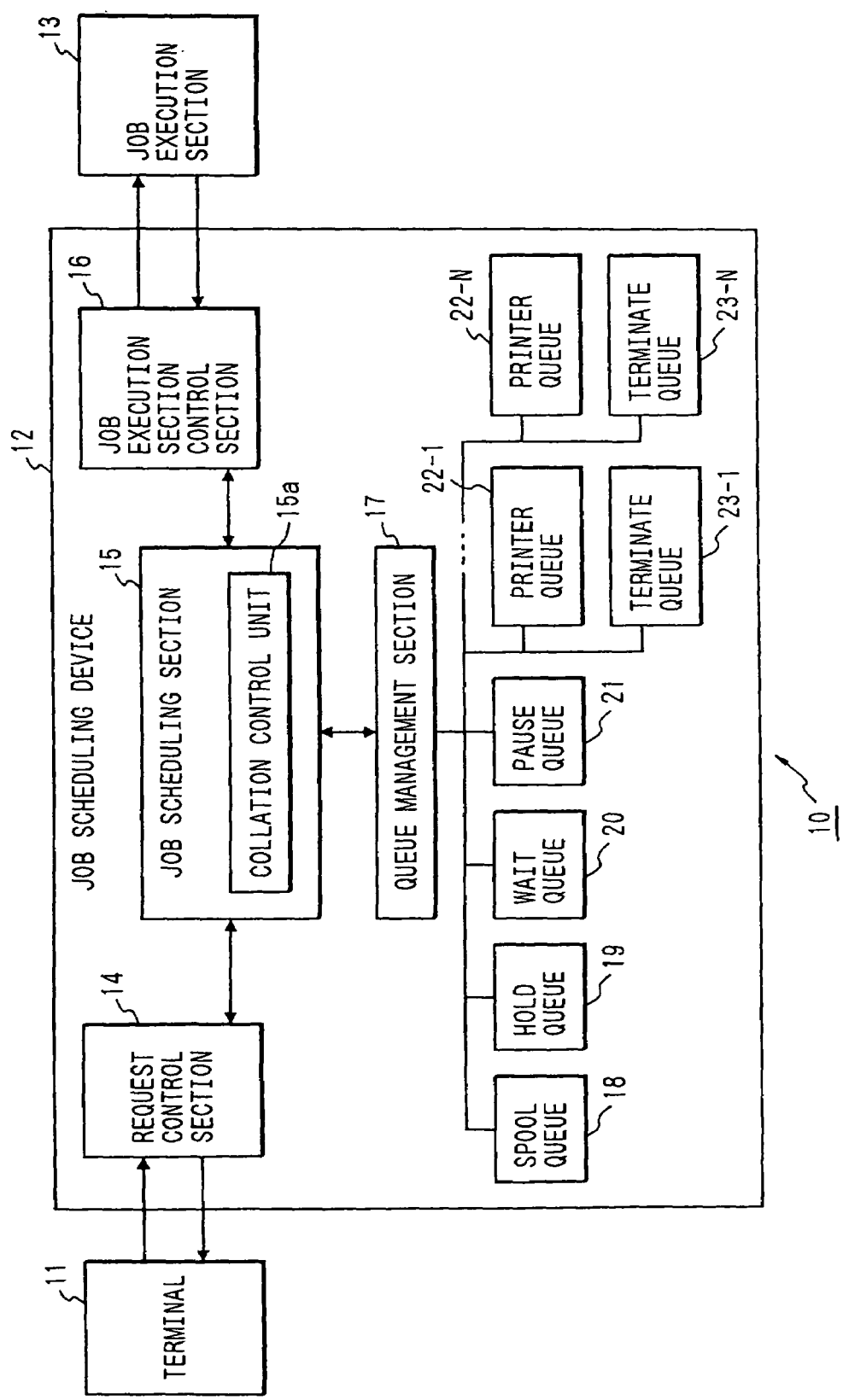
FIG. 1 is a block diagram showing the overall configuration of a job processing system according to a first embodiment of the present invention.

FIG. 1 is a block diagram showing the overall configuration of a job processing system used in this embodiment. A job processing system 10 is made up of a terminal 11, a job scheduling device 12, and a job execution section 13.

The terminal 11 is a user device and is connected to the job scheduling device 12 through a network (not shown). This terminal 11 generates one job as a plurality of documents, and issues a job request and various types of control request including these documents to the job scheduling device 12.

In compliance with an instruction input from a user, the terminal 11 adds various types of attribute values, which include those relating to the number of job outputs and information relating to a job output result, to the job request as job attribute information of the job.

The job scheduling device 12 is a module which sequentially stores job requests delivered from the terminal 11 in a queue, schedules the job requests allowing for an assignment and processing conditions of the job execution section 13, and prints the job by transferring a job stored in the queue to the job execution section 13.

This job scheduling device 12 is made up of a request control section 14, a job scheduling section 15, a job execution section control section 16, and a queue management section 17.

Upon receipt of a job request from the terminal 11, the request control section 14 issues a request for scheduling such as print processing to the job scheduling section 15 by preparing a queue object corresponding to that job, and delivering this queue object to the job scheduling section 15.

Figure 2:
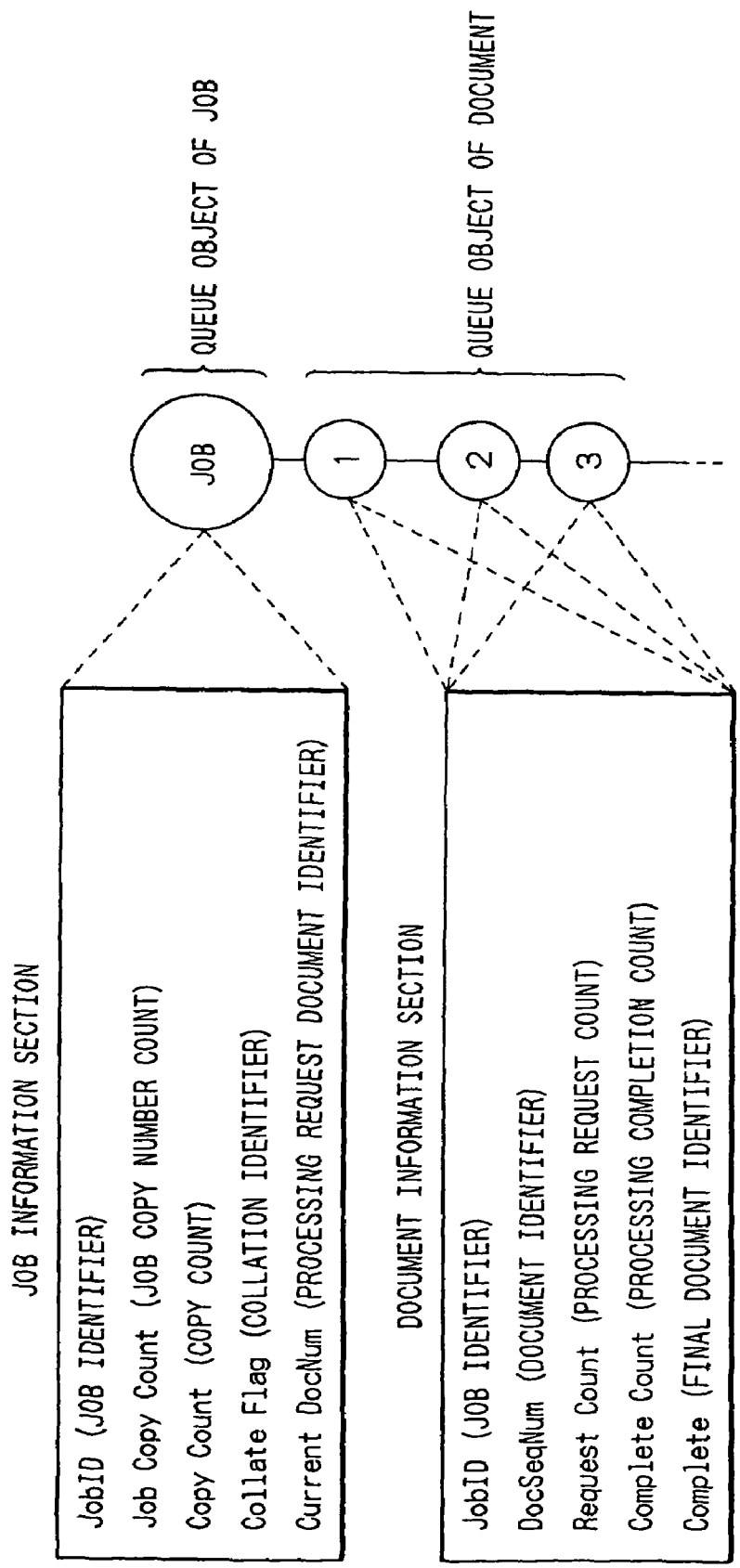
FIG. 2 is a schematic representation showing a queue object prepared in a request control section of the first embodiment.

FIG. 2 is a schematic representation of the queue object prepared by the request control section 14. Upon receipt of the leading job request, the request control section 14 prepares a queue object for that job (which retains information common to all documents) and sets a job information section. In this job information section, information which specifies that job (hereinafter referred to as job information) is prepared on the basis of the attribute information set for the leading job request.

Job ID: Job identifier which is an identifier to identify a job.

Job Copy Count: Job copy number count which designates the number of copies of the current job.

Copy Count: Copy count which shows the number of a page which is currently copied, and an initial value of this count is 0.

Collate Flag: Collation identifier, and collation is available when TRUE, but not available when FALSE.

Current Doc Num: Processing request document identifier which represents a document sequence number, and an initial value is 0.

On the other hand, upon receipt of the leading job request and a following job request, the request control section 14 prepares a queue object of each document (which holds information for each document) and sets the document information section. In this document information section, information which specifies that document (hereinafter referred to as document information) on the basis of the attribute information set to a received document.

Job ID: Job Identifier for identifying a job.

Doc Seq Num: Document identifier which is a number used for identifying documents.

Request Count: Processing request count which represents the number of processing requests issued to the job execution section 13, and the value of the Job Copy Count of the job information is set as an initial value of this request counter. The counter decrements from the initial value by one every time a processing request is issued.

Complete Count: Processing completion count which represents the number of acknowledgements of processing completion output from the job execution section 13. This counter is set to zero when document information of the current job information is prepared.

Complete: Final document identifier which represents the final document when TRUE.

These queue objects are stored in predetermined queues depending on the state of the job. In other words, a queue object of a corresponding job is stored in a queue. Practical documents are stored in memory (not shown) associated with queues. Throughout the following description, queue objects stored in queues are simply called documents.

The job scheduling section 15 transfers the job delivered from the request control section 14 to a queue management section 17, and queues corresponding to the job execution section 13 and queues necessary for scheduling are managed using the queue management section 17. Scheduling is carried out allowing for an assignment and processing conditions of the job execution section 13, and a print processing request is issued to the job execution section 13 by transferring a job stored in the queue management section 17 to the job execution section 13. A queue object of the job transferred from the request control section 14 is stored in a printer queue 22 if the job is a non-acceptance completion type sequential processing job; is stored in a spool queue 18 if the job is an acceptance completion type sequential processing job; and is stored in a hold queue 19 if the job is an unscheduled job. If another document follows that job request, information is set in the document information section of that document upon reference to job information of another job having the same job identifier, and that document is added to a queue object with the same job identifier using the queue management section 17.

Of the jobs stored in queues other than the hold queue 19 and a terminate queue 23, jobs including documents which need conversion are converted at the time when the job execution section 13 which carries out corresponding conversion becomes enabled.

A collation control unit 15$a$ refers to job information and document information of the jobs stored in the printer queue 22 of the queue management section 17. If the collation identifier (Collate Flag) is set to TRUE (collation), a processing request issued to the job execution section 13 is controlled in such a way that the job is output in a specified number in a collated manner using the job information and the document information. If the collation identifier is set to FALSE (uncollation), the processing request issued to the job execution section 13 is controlled in such a way that the job is output in a specified number in an uncollated manner using the job information and the document information. Upon receipt of an acknowledgement representing that the job execution section 13 can accept processing from the job execution section 13, the job scheduling section 15 sequentially fetches jobs from the leading end of the printer queue 22, and issues a document processing request to the job execution section 13 via the job execution section control section 16, with the use of the collation control unit 15$a$, in such a way that the job is output in a collated or uncollated manner as specified by a user. The job scheduling section 15 then receives a status acknowledgement of the document, to which the processing request was issued, from the job execution section 13 via the job execution section control section 16, and executes the scheduling of another job.

The job execution section control section 16 issues a request for print processing to the job execution section 13 by transferring the document processing request obtained from the job scheduling section 15 to the job execution section 13. Further, the job execution section control section 16 transfers a status acknowledgement relating to the job processing which was obtained from the job execution section 13 to the job scheduling section 15.

The queue management section 17 prepares various types of queue in compliance with an instruction from the job scheduling section 15, and stores a series of queue objects having the common job identifier as one job by associating them with each other. The spool queue 18 is a queue in which acceptance-completion type sequential processing jobs are stored, and a job is managed within this queue until all documents of that job are completely obtained. The hold queue 19 temporarily holds a document. If a job hold is specified for a job request, the job request is stored in this hold queue 19 regardless of whether the job is an acceptance-completion type sequential processing job or a nonacceptance-completion type sequential processing job. The job stored in the hold queue 19 is released from its held state according to the user's instruction. If the job is acceptance-completion type sequential processing job, the job is transferred to the spool queue 18. On the other hand, if the job is nonacceptance-completion type sequential processing job, the job is transferred to the printer queue 22. A wait queue 20 is a kind of processing wait queue. When a job waiting for a password input from the user has timed out, the job is transferred from the printer queue 22 to this queue 20. When a password is input by the user, the job returns to the printer queue 22. A pause queue 21 is a queue in which a job subjected to temporal interruption of processing is stored. If a system manager performs a predetermined operation through a server manager (not shown), the job moves to the pause queue 21 from the printer queue 22 or returns from this pause queue 21 to the printer queue 22. The printer queue 22 (1 to N) is provided corresponding to job outputs (not shown) of the job execution section 13. A job waiting for print processing is stored in this queue 22. A terminate queue 23 (1 to N) is provided corresponding to the printer queue 22 (1 to N). The job, the job processing of which was completed with respect to all documents of that job in the job execution section 13, is stored in the terminate queue 23.

The job execution section 13 is made up of more than one job processing sections or job outputs (neither being shown in the drawings). The job processing section is a converter which converts a print format of a job, and the job output section outputs a job. In other words, the job output section is a printer which prints a job on the printer. The job output section and the printer queue 22 (1 to N) are provided in a one-to-one correspondence with each other. A job is stored in the printer queue 22 corresponding to the job output section which was selected by the job scheduling section 15, and is further transferred from this printer queue to a corresponding job output section.

Upon completion of one job, the job execution section 13 issues an acknowledgement of the completion of the processing to the job scheduling section 15 via the job execution section control section 16. When the job execution section 13 becomes enabled, the job execution section 13 issues an acknowledgement of enabled processing to the job scheduling section 15 via the job execution section control section 16.

Figure 3:
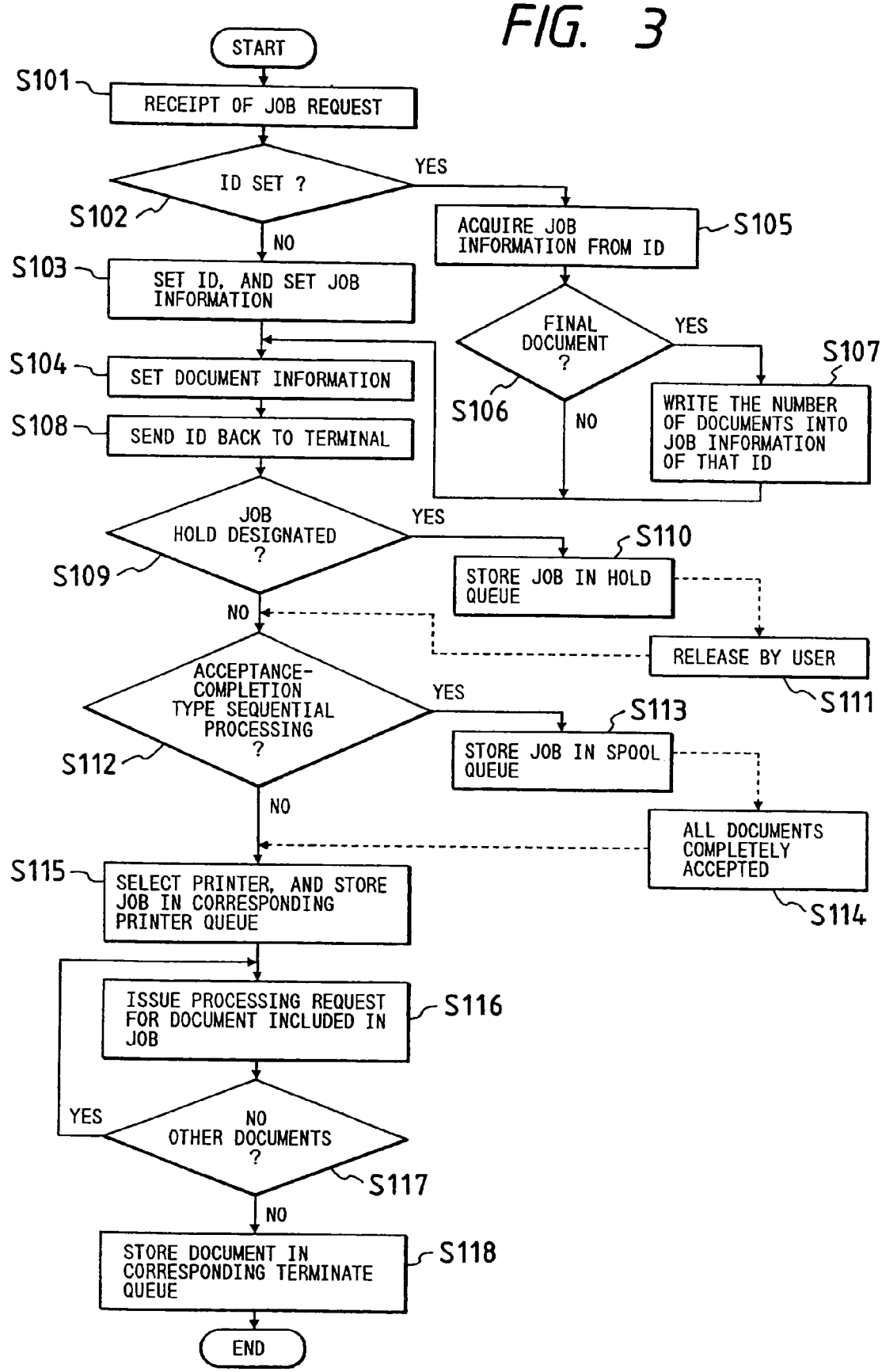
FIG. 3 is a flowchart showing the overall flow of job processing in the job processing system of the first embodiment.

With reference to a flowchart shown in FIG. 3, the overall flow of job processing in the previously mentioned job processing system 10 will be described. An explanation will now be given of the case where a plurality of documents are accepted as one job.

Upon receipt of a job request (step S101), the request control section 14 judges whether or not a job identifier (ID) is set to the job request (step S102). If the job identifier is not set to that job request, that job is judged as the leading job. The job request control section 14 sets a job identifier common to a plurality of job requests from this leading job request to the final job request, and prepares a queue object of the job relating these job requests. Thus, a job information section is set. Simultaneously, the request control section 14 acquires attribute information included in the received job request and sets this attribute information as job information (step S103). Subsequently, queue objects of the document of that job request are prepared, and a document information section is set. Concurrently, the attribute information included in the received job request is acquired, and this attribute information is set as document information (step S104).

On the other hand, when the job identifier is set in the received job request, a series of job requests which have already been received are judged as one job, and the job information is acquired based on the job identifier (step S105). It is judged from the attribute information of that job request whether or not this document is the final document (step S106). If the document is the final document, the number of documents is written into the job information of the job identifier of this final document (step S107).

When the processing in step S104 is completed, a newly provided job identifier is sent back to the terminal 11 which sent that job request (step S108).

The job scheduling section 15 judges whether or not the received job request has the designation of job hold (step S109). When the received job request has the designation of job hold, the document of that job request is stored in the hold queue 19 (step S110). If the job scheduling section received a user's instruction, the document will be released from its stored state (step S111). Further, if the job request has no designation of job hold in step S109, the job scheduling section 15 judges whether or not the job is an acceptance-completion type sequential processing job (step S112). If the job is the acceptance-completion type sequential processing job, the document of that job request is stored in the spool queue 18 (step S113), and the document is retained until all of the other documents are completely received (step S114).

Subsequently, the job scheduling section 15 selects a printer which is suitable for processing in the job execution section 13, and stores the job in a corresponding printer queue 22 (step S115). The job scheduling section 15 issues a processing request for the document included in that job to the job execution section 13 via the job execution section 16 (step S16). When processing requests were issued with respect to all of the documents (step S117), the job is stored in a corresponding terminate queue 23 (step S118).

Figure 4:
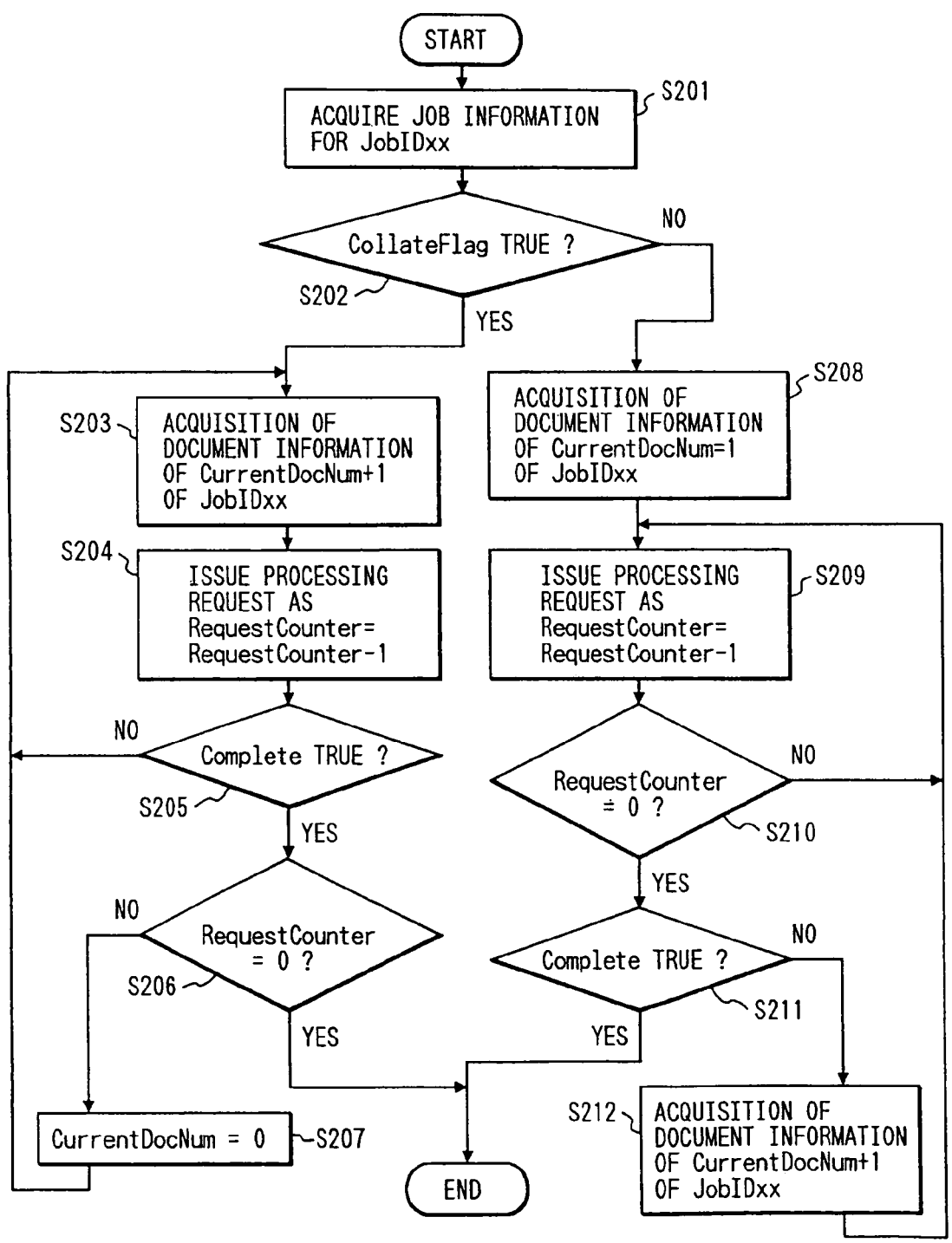
FIG. 4 is a flowchart showing procedures for issue of a processing request when a job is output in a collated or uncollated manner in the first embodiment.

Procedures of the issue of a processing request in the job scheduling section 15 when a job with a job identifier XX is output in a collated or uncollated manner will be explained with reference to the flowchart shown in FIG. 4.

To begin with, the job scheduling section 15 obtains job information with respect to a job identifier XX (Job ID) at the leading end of the printer queue 22 (step S201). The collation control unit 15a judges whether or not the collation identifier (Collate Flag) is TRUE (step S202). When the collation identifier is TRUE (collation is available), the collation control unit 15a acquires document information with respect of a processing request document identifier (Current Doc Num)+1 of the job identifier XX (step S203). Assuming processing request count (Request Count)=processing request count−1, a processing request is issued to the job execution section 13 through the job execution section control section 16 (step S204). Subsequently, it is judged whether or not the final document identifier (Complete) of this document information is TRUE (step S205). If it is not TRUE, the processing returns to step S203. If it is TRUE, it will be judged whether or not the processing request count (Request Count) of the document information is zero (step S206). If the processing request count is not zero, the processing will return to step S203 by resetting the processing request document identifier to zero (step S207).

On the other hand, if the processing request count in step S206 is zero, the issue of the processing request of the job identifier XX will be terminated.

For example, if the number of copies of the job is two, the processing request count will also be set to two. Hence, if the processing request count in step S206 is not zero, the same job processing will be executed from the start. To avoid this, the processing request document identifier is reset to zero, and processing requests are again issued with respect to all of the documents. The processing is repeated until the processing request count becomes zero. It becomes possible to output a specified number of copies of the documents in order by carrying out the above processing in correspondence to the specified number of copies.

If the collation identifier in step S202 is not TRUE (collation is not available), the collation control unit 15 acquires document information with respect to a processing request document identifier (Current Doc Num)=1 of the job identifier XX (step S208). On the assumption that the processing request count (Request Count)=processing request count−1, a processing request is issued to the job execution section 13 through the job execution section control section 16 (step S209). Subsequently, it is judged whether or not the processing request count (Request Count) of the document information is zero (step S210). If the processing request count is not zero, the processing will return to step S209, and a processing request for the same document will be issued. On the other hand, if the processing request count is zero, it is judged whether or not the final document identifier (Complete) of this document information is TRUE (step S211). If the final document identifier is not TRUE, document information with respect to the processing request document identifier+1 of the job identifier XX will be obtained (step S212), and the processing will return to step S209.

If the final document identifier is TRUE in step S211, the issue of the processing request of the job identifier XX will be terminated.

For example, if the number of copies of the job is two, the processing request count will also be set to two. If the processing request count in step S210 is not zero, a processing request will be again issued to the same document. This processing will be repeated with respect to all documents, whereby a specified number of copies of a document will be separately output for each document.

Figure 5:
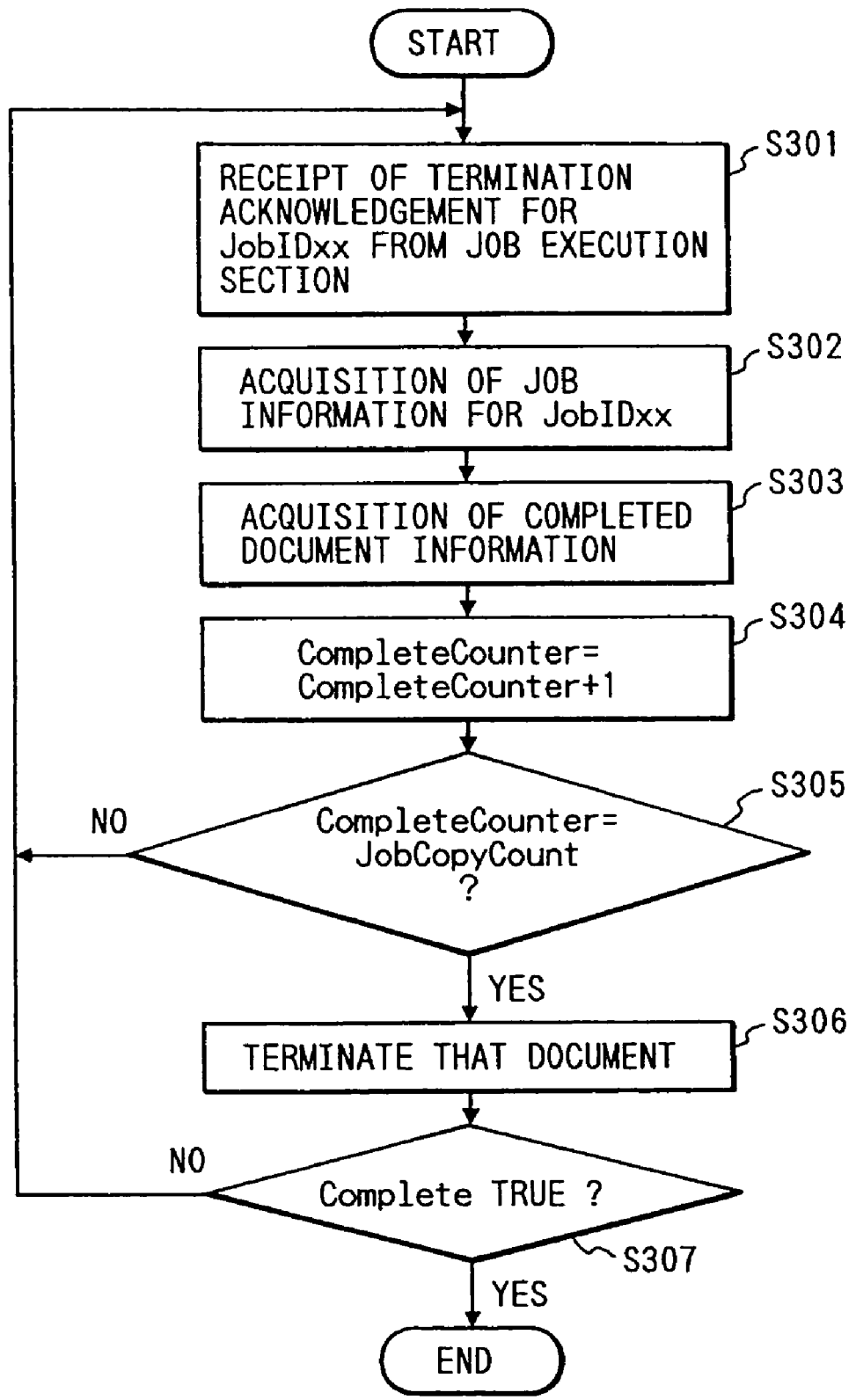
FIG. 5 is a flowchart showing procedures for completion of processing when a job is output in a collated or uncollated manner in the first embodiment.

Processing completion procedures in the job scheduling section 15 when a job with a job identifier XX was output in collated or uncollated manner will be described with reference to a flowchart shown in FIG. 5.

Upon receipt of an acknowledgement of the completion of the processing of a job identifier XX (Job ID) from the job execution section 13 via the job execution section control section 16 (step S301), the job scheduling section 15 acquires document information of the document which was subjected to processing completion (step S303) as well as job information of the job identifier XX (step S302). On the assumption that a processing completion count (Complete Count) is +1 (step S304), it is judged whether or not the processing completion count is equal to a job copy number count (Job Copy Count) (step S305). If these two values are not identical with each other, the processing will return to step S301. On the other hand, if these two values are equal to each other, the processing of that document will be terminated (step S306), and it is judged whether or not the final document identifier is TRUE (step S307). If the final document identifier is not TRUE, the processing will return to step S301. However, if it is TRUE, the processing of the job identifier XX will be terminated.

An explanation will then be given of a specific example where the non-acceptance completion type sequential job is output in collated or uncollated manner. Initially, an explanation will be given of the case where a one-job/two-document job is output in a collated manner with a job copy number 2.

Figure 6:
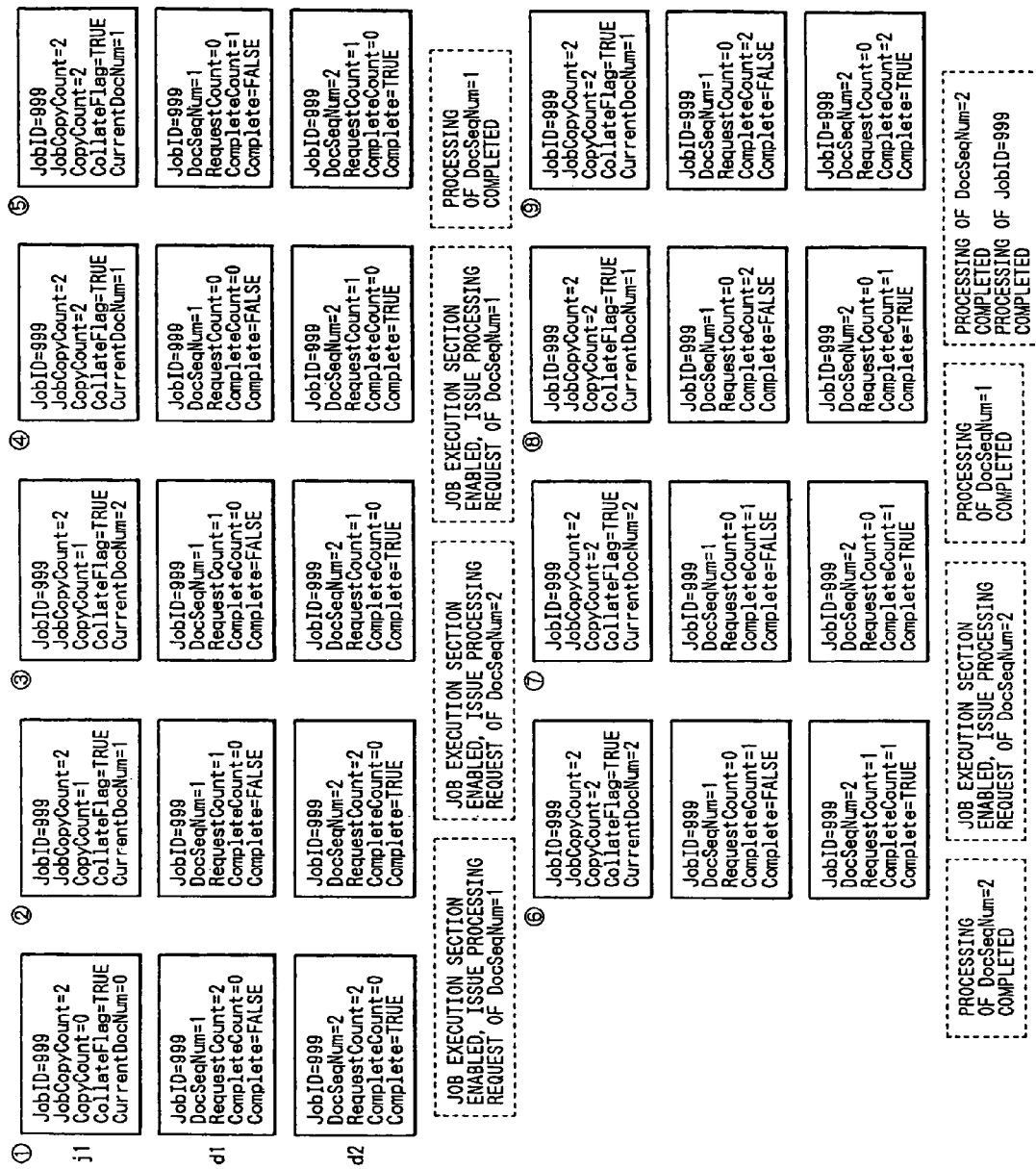
FIG. 6 is a schematic representation showing queue objects stored in a printer queue and information retained within the queue objects (collated) in the first embodiment.

FIG. 6 is a diagrammatic representation showing queue objects stored in a printer queue and information retained therein. Reference symbol j1 designates job information of an object job, d1 is document information of a document identifier (Doc Seq Num), and d2 is document information of a document identifier 2.

In an initial state represented by "1", a copy count (Copy Count) of the job information j1 is zero, and a processing request count (Request Count) of the document identifier (Doc Seq Num) 1 and a job copy number count (Job Copy Count) are equal to each other. This shows that a processing request for the first lap of the first document is not issued yet.

If the job execution section 13 becomes enabled, the collation control unit 15a of the job scheduling section 15 issues a processing request with respect to a document of a job with the document identifier 1 ("2"). At this time, the copy count (Copy Count) of the job information j1 is 1, and hence the job processing request count (Request Count) of the document information d1 becomes 1.

When the job execution section 13 becomes enabled, the collation unit 15a issues a processing request with respect to a document with a document identifier 2 ("3"). A processing request with respect to a document subsequent to the document with the document identifier 2 is issued when a processing request count of document information of this document is larger than the processing request count of the document with the document identifier 1. In "3", the processing request count of the document information d2 changes from 2 to 1, and therefore the processing request document identifier (Current Doc Num)=the document identifier (which is 2 in this example).

A processing request for the second lap of the document (the first document) with the document identifier 1 is issued when the processing request count of the final document (Complete Count=TRUE) is equal to the processing request count of the document (second document) with the document identifier 2. In other words, when the job execution section 13 becomes enabled after "3", the collation control unit 15a issues a processing request for the second lap of the document with the document identifier 1 ("4"). At this time, the copy count of the document identifier 1 becomes two, and the processing request count becomes zero. If the final document of the object job is not in the printer queue, a processing request will not be issued. In subsequent "5", processing for the first lap of the document with the document identifier 1 is completed, and processing for the first lap of the document with the document identifier 2 is completed in "6".

When the job execution section 13 becomes enabled after "6", the collation control unit 15a issues a processing request for the second lap of a document with a document identifier d2 ("7"). Here, the processing request count of the document identifier 2 becomes zero. In subsequent "8", processing for the second lap of the document with the document identifier 1 is completed, and processing for the second lap of the document with the document identifier 2 is completed in "9".

Figure 7:
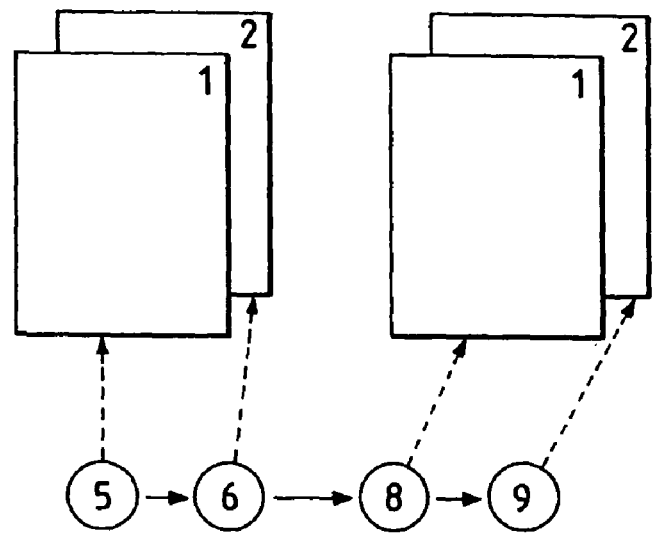
FIG. 7 is an explanatory view showing output results when a job is output in a collated manner in the first embodiment.

In the example shown in FIG. 6, the processing of the documents is completed with the timing of "5"→"6"→"8"→"9". At this time, the copies of the first and second documents are output in a collated manner in the order of 1→2→1→2 as shown in FIG. 7.

An explanation will be given of the case where one-job/two-document job is output in an uncollated manner with a job copy number 2.

Figure 8:
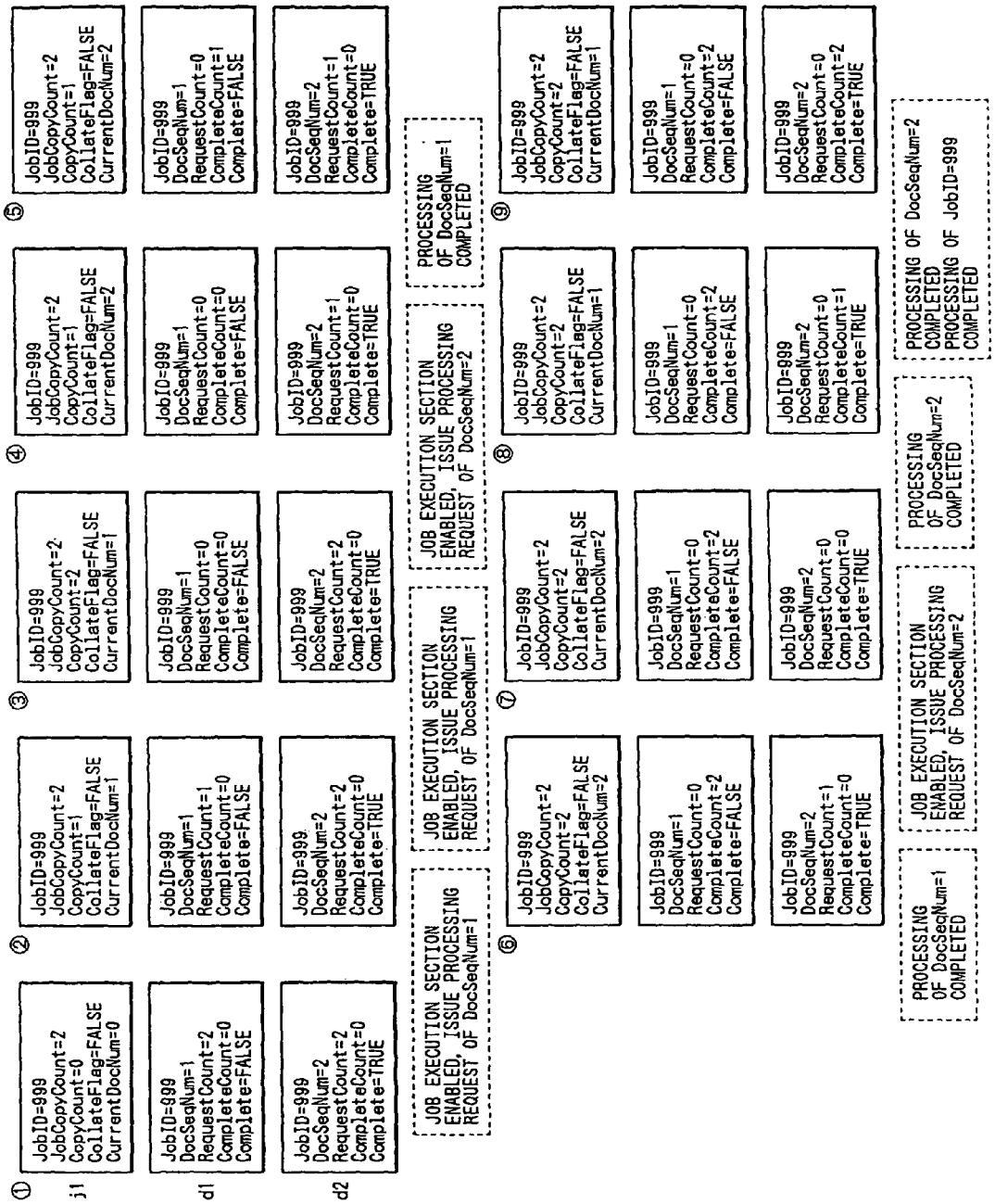
FIG. 8 is a schematic representation showing queue objects stored in a printer queue and information retained therein (uncollated)

FIG. 8 is a diagrammatic representation showing queue objects stored in a printer queue and information held therein. In FIG. 8, J1 designates job information of an object job, d1 designates document information of a document identifier (Doc Seq Num) 1, and d2 designates document information of a document identifier 2 in the same manner as in FIG. 6.

In the initial state "1", if the job execution section 13 becomes enabled, the collation control unit 15a of the job scheduling section 15 issues a processing request with respect to a document of a job with the document identifier 1 ("2"). At this time, the copy count (Copy Count) of the job information J1 is 1, and hence the job processing request count (Request Count) of the document information d1 becomes 1.

When the job execution section 13 becomes enabled, the collation unit 15a also issues a processing request with respect to a document with a document identifier 2 ("3"). As a result of this, processing requests for the first and second laps of the document (the first document) with the document information d1 are issued. In "3", the copy count of the job information J1 becomes two, and the processing request count of the document information d1 becomes zero. On the other hand, the final document identifier (Complete) is not TRUE, the collation control unit 15a issues a processing request for the first lap of the document (the second document) with the document information d2 ("4"). At this time, the copy count of the document identifier 2 becomes one, and the processing request count becomes one. In subsequent "5", processing for the first lap of the document with the document identifier 1 is completed, and processing for the second lap of the document with the same document identifier 1 is completed in "6".

When the job execution section 13 becomes enabled after "6", the collation control unit 15a issues a processing request for the second lap of a document with the document identifier d2 ("7"). Here, the processing request count of the document identifier 2 becomes zero. In subsequent "8", processing for the first lap of the document with the document identifier 2 is completed, and processing for the second lap of the document with the document identifier 2 is completed in "9".

Figure 9:
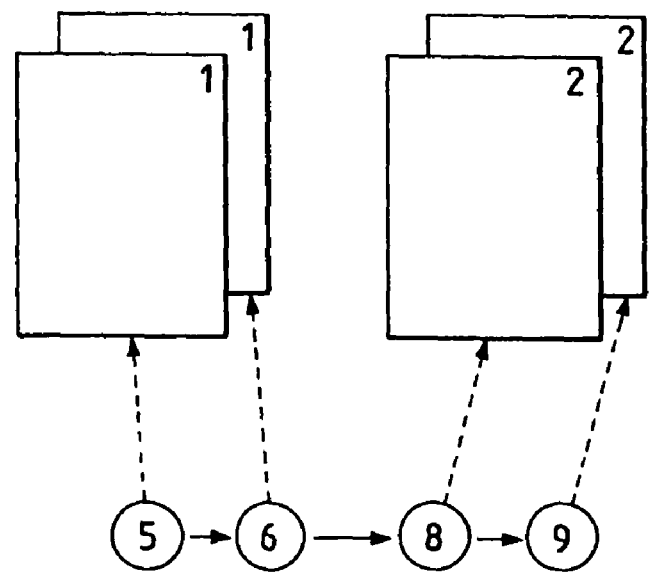
FIG. 9 is an explanatory view showing output results when a job is output in an uncollated manner in the first embodiment.

In the example shown in FIG. 8, the processing of the documents is completed with the timing of "5"→"6"→"8"→"9." At this time, the copies of the first and second documents are output in an uncollated manner in the order of 1→1→2→2 as shown in FIG. 9.

In the case of the acceptance-completion type sequential processing job, the job is transferred to the printer-queue after all documents of that job are completely obtained. Hence, the previously mentioned collated/uncollated output control can be directly applied to the acceptance-completion type sequential processing job.

Further, print results may be collectively output to one sorter or may be divisionally output to a bin-sorter.

As described above, according to the first embodiment of the present invention, information representing the availability of collation is added to a job request issued from a terminal equipment. If a received job has the designation of collation, the job scheduling device controls a processing request issued to the job execution section in such a way that only a specified number of this job is output in a collated manner. On the other hand, if the received job has the designation of uncollation, the job scheduling device controls the processing request issued to the job execution section in such a way that only a specified number of this job is output in an uncollated manner. By virtue of such a configuration, it is possible to output a plurality of jobs having the same contents by the issue of one job request.

According to this embodiment, output results related to a plurality of job requests are not mixed with output results related to job requests of another user, and hence it becomes possible to reduce time required to distinguish the output results of the users.

Moreover, print processing is carried out utilizing print data included in the first job request. For this reason, if a job is divisionally issued, it becomes unnecessary to send print data for each job, which in turn reduces the burden of a memory device such as a disk. Similarly, if a document which needs conversion is included in the job, it is not necessary to carry out conversion more than twice, which makes it possible to carry out efficient processing. For this reason, it is possible to effectively utilize various resources in the system.

Furthermore, the control of collation/uncollation can be applied to non-acceptance completion sequential processing jobs, and therefore the scheduling of jobs can be carried out promptly. This makes it possible to reduce the overall processing time.

Therefore, it becomes possible to improve job processing efficiency when a plurality of jobs having the same contents are output.

With reference to FIG. 1 and FIGS. 22 to 25, a job processing system according to a second embodiment of the present invention will now be described. The job processing system of this embodiment is arranged in such a way that job control, such as a processing start wait, a processing completion wait, and a password input wait, is carried out even in the case of a job other than a job at the leading end of a queue when a one-job multidocument is scheduled. Since the overall configuration of the job processing system is the same as that of the first embodiment (shown in FIG. 1), and hence the explanation thereof will be omitted here for brevity.

In the second embodiment, the terminal 11 adds an undesignated identifier to the leading document among a plurality of documents previously prepared in this terminal. A job identifier delivered to the leading document from the job scheduling device 12 is added to the second and later documents, and the information which represents the end of the plurality of documents is added to the final document. Then, the plurality of documents are sent, and a processing start wait, a processing completion wait, and a password input wait are respectively set to the leading document of the plurality of documents. Further, message information may be set in accordance with the setting of the processing start wait, the processing completion wait, and the password input wait.

During the processing start wait, it is checked whether or not the document is set to a processing start wait when the processing of the job is started. If the document is set to the processing start wait, the processing of a job will not be started. The processing of that job is started when the processing start wait is cancelled by a start instruction from the user or a timeout. The terminal 11 adds the designation of processing start wait to the job request as information relating to the processing start wait control of the job. Further, a message, for example, "Waiting for processing start" or "Replace paper with OHP film" may be added to the job request as the message information relating to wait control.

During the processing completion wait, it is checked whether or not the document is set to a processing completion wait when the processing of the job was completed. If the document is set to the processing completion wait, the job will to not be output. The output of that job is started when the processing completion wait is cancelled by a start instruction from the user or a timeout. The terminal 11 adds the instruction of processing completion wait to the job request as information relating to the processing completion wait control of the job. Further, a message, for example, "Waiting for processing completion" or "Replace tray" may be added to the job request as the message information relating to wait control.

During the password input wait, it is checked whether or not the document is set to a password input wait when the processing of the job was completed. If the document is set to the password input wait, the processing of the job will not be started. The processing of that job is started only when a valid password is input. If a valid password is not input after the passage of a predetermined period of time, that job is transferred to another queue, and the processing of the following job moves up and is started. Further, when the password is input, the previous job is returned to the original queue, and the processing of that job is started subsequent to the job which is currently processed. The terminal 11 adds, the designation of password input wait and password data for use in judging whether or not the input password is valid, to the job request as information relating to the password input wait control of the job. Further, a message, for example, "Waiting for password input" or "Input password" may be added to the job request as the message information relating to wait control.

Information relating to the control wait of a job and the message information can be specified individually or in combination. For example, when a job is output in the form of an OHP film by manually feeding the film, a processing start wait and a processing completion wait are designated. Upon receipt of an acknowledgement of processing start wait, the user inserts paper during the processing of the job is interrupted. Thereafter, upon receipt of an acknowledgement of processing completion wait, the user attaches an ordinary tray to the printer while the printer is in an output wait state after the completion of the job processing.

The job scheduling device 12 is a module which schedules documents sent from the terminal 11 using queues, and sends the documents to the job execution section 13 for print processing. The job scheduling device 12 includes the request control section 14, the job scheduling section 15, the job execution section 16, and the queue management section 17.

The request control section 14 judges, upon receipt of a document including an unspecified identifier from the terminal 11, that the document is the leading document, and judges, upon receipt of a document including information which indicates the final, that the document is the final document among a plurality of documents. Further, the request control section 14 sets a job identifier which is an identifier common to the plurality of documents (from the leading document to the final document), and sends the job identifier back to the terminal 11.

FIG. 10 is a schematic representation showing queue objects which are prepared in the request control section 14. The request control section 14, upon receipt of the leading document, prepares a queue object (which stores information common to all of documents) of a job including the documents, and sets a job information section. In the job information section, information identifying the job (hereinafter referred to as job information) is prepared based on the information set to the leading document.

JobID: Job identifier for identifying a job.
Startwait: Processing start wait in which Start-wait is set when TRUE.
End wait: Processing completion wait in which End-wait is set when TRUE.
Pass word wait: Password input wait in which Password-wait is set when TRUE.

In addition to them, information such as the number of documents which form a job is also prepared in the job information section.

When the leading document or the following document are received, a queue object for each document (which retains information for each document) is prepared, and a document information section is set. In this document. Information section, information which specifies a document (hereinafter referred to as document information) is prepared based on information which was set with respect to a received document.

Job ID: Job identifier for identifying a job.
Doc Seq Num: Document identifier which is a number for identifying a document.
Status: Status (Processing state) in which "pending" represents processing wait, "requesting" represents processing requesting, "printing" represents processing, and "completed" represents processing completed.
Complete: Final document identifier which represents the final document when TRUE.

In addition to them, inherent information is formed for each document in the document information section.

Figure 11:
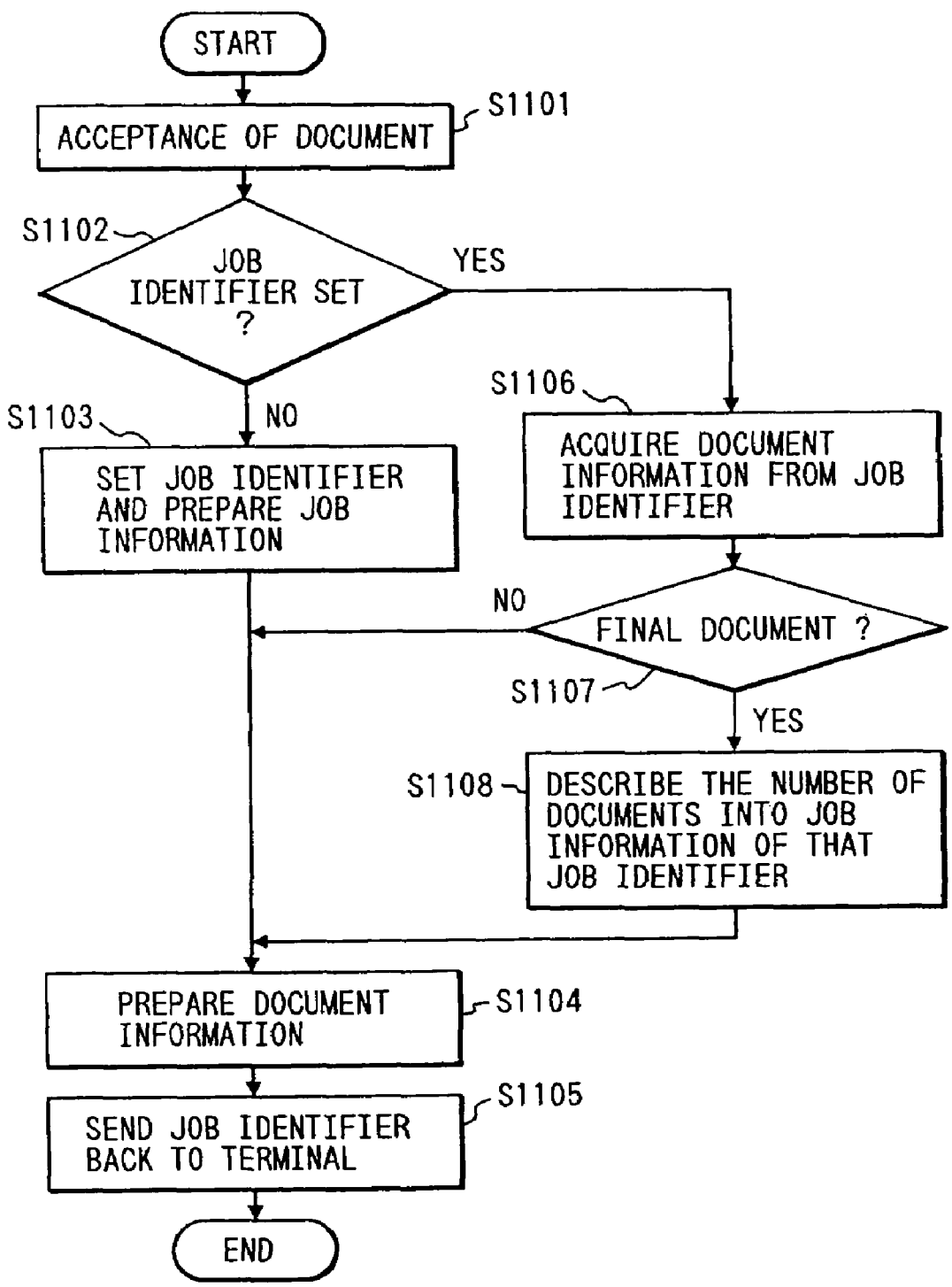
FIG. 11 is flowchart showing processing procedures when a document is accepted in the second embodiment.

With reference to a flowchart shown in FIG. 11, processing procedures in the request control section 14 when the request control section accepts a received document will now be described. An explanation will be given of the case where one job is accepted as a plurality of documents.

Upon receipt of a document (step S1101), the request control section 14 judges whether or not a job identifier is set to that document (step S1102). If the job identifier is not set to that document, the document is judged as the leading document. The job request control section 14 sets a job identifier common to a plurality of documents from this leading document to the final document, and prepares a queue object of the job as shown in FIG. 10. Thus, a job information section is set. Simultaneously, the request control section 14 prepares job information in this job information section (step S1103). Subsequently, queue objects of that document are prepared, and a document information section is set. Concurrently, a document information section is prepared in this document information section (step S1104). A newly provided job identifier is sent back to the terminal 11 which sent the document to the request control section (step S1105).

On the other hand, when the job identifier is set to the received document in step S1102, that document is judged as a document relating to a series of accepted jobs. The queue objects are examined based on a job request (step S1106). It is judged whether or not this document is the final document by examining the setting of the final document identifier (Complete) of the document information (step S1107). If the final document identifier (Complete) is not TRUE, the processing proceeds to step S1104, and queue objects of that document are prepared. On the other hand, if the final document identifier (Complete) is TRUE, that is, if the document is the final document, the number of documents is written as job information of queue objects (step S1108). Thereafter, the processing proceeds to step S1104, and queue objects of that document are prepared.

The job scheduling section 15 manages queues corresponding to the job execution section 13 and queues necessary for scheduling using the queue management section 17. Moreover, the job scheduling section 15 schedules a job made of the documents transferred from the request control section.

Further, upon receipt of an acknowledgement of enabled processing acceptance from the job execution section 13, the job scheduling section 15 sequentially retrieves queue objects of the job queued in the queue management section 17 and examines the contents of each document information. When a document processing wait is set to the queue objects, a processing request for a document which corresponds to the queue objects is issued to the job execution section 13 via the job execution section control section 16. When the processing request was issued, the fact that the document is in the course of issuing a processing request is set to the status of the document information section of the queue objects.

It is judged from the final document identifier (Complete) of the document information section whether or not the document which issued the processing request is the final document of that job. If it is TRUE, the document is considered as the final document. Subsequently, it is judged from the status of the document information section whether or not the processing request has already been issued to the job execution section 13. If the status is not in a processing wait, the processing request has already been issued.

If the final document has already issued the processing request, the processing of the next job will be executed. If the next job has a queue object which can issue a processing request, that is, a queue object in a processing wait state, a processing request for a document which corresponds to that queue object is issued to the job execution section 13. Such processing is executed with respect to all of the jobs queued in the printer queue 22 of the queue management section 17, and a document processing request is continuously issued from one job to another job.

When a document processing request is continuously issued, a processing request is issued even for the next job so long as the job execution section 13 is enabled and there is a document which can issue a processing request. For this reason, it is necessary to control a processing start wait, a processing completion wait, and a password input wait while maintaining the order of jobs. Therefore, the job scheduling section 15 performs the following control with respect to jobs queued in the printer queue of the queue management section 17, that is, a job in a processing start wait state, a job in a processing completion wait state, and a job in a password input wait state.

(1) Job in Processing Start Wait State

It is checked whether or not this job is set to a processing start wait before it is checked whether or not a processing request is issuable with respect to the leading document of that job. If the processing start wait is set in the job information section of queue objects, that job is rendered in a processing start wait state. No processing request is issued with respect to a document of this job and documents of subsequent jobs until the job is released from the processing start wait state by the user's instruction input from the terminal 11 or a timeout.

(2) Job in Processing Completion Wait State

It is checked whether or not the job is set to a processing completion wait before it is checked whether or not a processing request is issuable to the leading document of that job. If the processing completion wait is set in the job information section of queue objects, a job identifier of this job is set to a printer queue. In this case, the job identifier is set in such a way that each printer queue retains a job identifier of the job which is in a job completion wait state. Hereafter, a processing request is issuable only for this job. After the completion of the processing of all documents of this job, this job is rendered in a processing completion wait state. No processing request is issued with respect to documents of subsequent jobs until this current job is released from the processing completion state by a user's instruction input from the terminal 11 or a timeout.

(3) Job in Password Input Wait State

It is checked whether or not the job is set to a password input wait before it is checked whether or not a processing request is issuable to the leading document of that job. If the password input wait is set in the job information section of queue objects, this job is rendered in a password input wait state. No processing request is issued with respect to a document of this job and documents of subsequent jobs until this current job is released from the processing completion state by a user's instruction input from the terminal 11 or a timeout.

The job execution section control section 16 issues a request for print processing to the job execution section 13 by moving the processing request from the job scheduling section 15 to the job execution section 13. Further, the job execution section control section 16 transfers a status acknowledgement relating to the job delivered from the job execution section 13 to the job scheduling section 15.

The queue management section 17 prepares various types of queue in accordance with an instruction from the job scheduling section 15, and queues a series of queue objects having a common job identifier as one job.

The spool queue 18 queues documents of a completion type job, and manages the job until all documents of that job are completely obtained. The completion type job is characterized in that print processing is not started until all documents which form a job are completely obtained. On the other hand, a noncompletion type job is characterized in that print processing is started in the order in which the processing of a received document is accepted.

The hold queue 19 temporarily holds a document. If a document has the designation of job hold, the job is queued by this hold queue 19 regardless of whether the job is of completion or noncompletion type. The document queued in the hold queue 19 is released from the queued state by the user's instruction. If the job is a completion type job, the document is moved to the spool queue 18, whereas if the job is a noncompletion type job, the document is moved to the printer queue 22.

The wait queue 20 is one type of processing wait queue. When the job which is waiting for a user's password input timed out, the job is moved from the printer queue 22 to this wait queue 20. If a password is input by the user, the job returns to the printer queue 22.

The pause queue 21 holds queues subjected to temporal interruption of processing. If the system manager performs predetermined operation through a server manager (not shown), a job will move from the printer queue, which will be described later, to this pause queue 21, and vice versa.

The printer queue 22 (22-1 to 22-N) is provided corresponding to job output sections (not shown) of the, job execution section 13. Jobs waiting for print processing are queued in this queue.

Jobs whose all documents were subjected to processing completion are queued in the terminate queue 23 (23-1 to 23-N).

The job execution section 13 is made up of more than one job processing sections or job output sections (neither being shown in the drawings). The job processing section converts a print format of a job, and the job output section outputs a job, that is, prints a job. The job output section and the printer queue (22-1 to 22-N) are provided in a one-to-one correspondence with each other. A job is queued in the printer queue corresponding to a selected job output section. Further, upon completion of one job, the job execution section 13 issues an acknowledgement of the completion of the processing to the job scheduling device 12. When the job execution section 13 becomes enabled, the job executions section 13 issues an acknowledgment of enabled processing to the job scheduling device 12.

Figure 12:
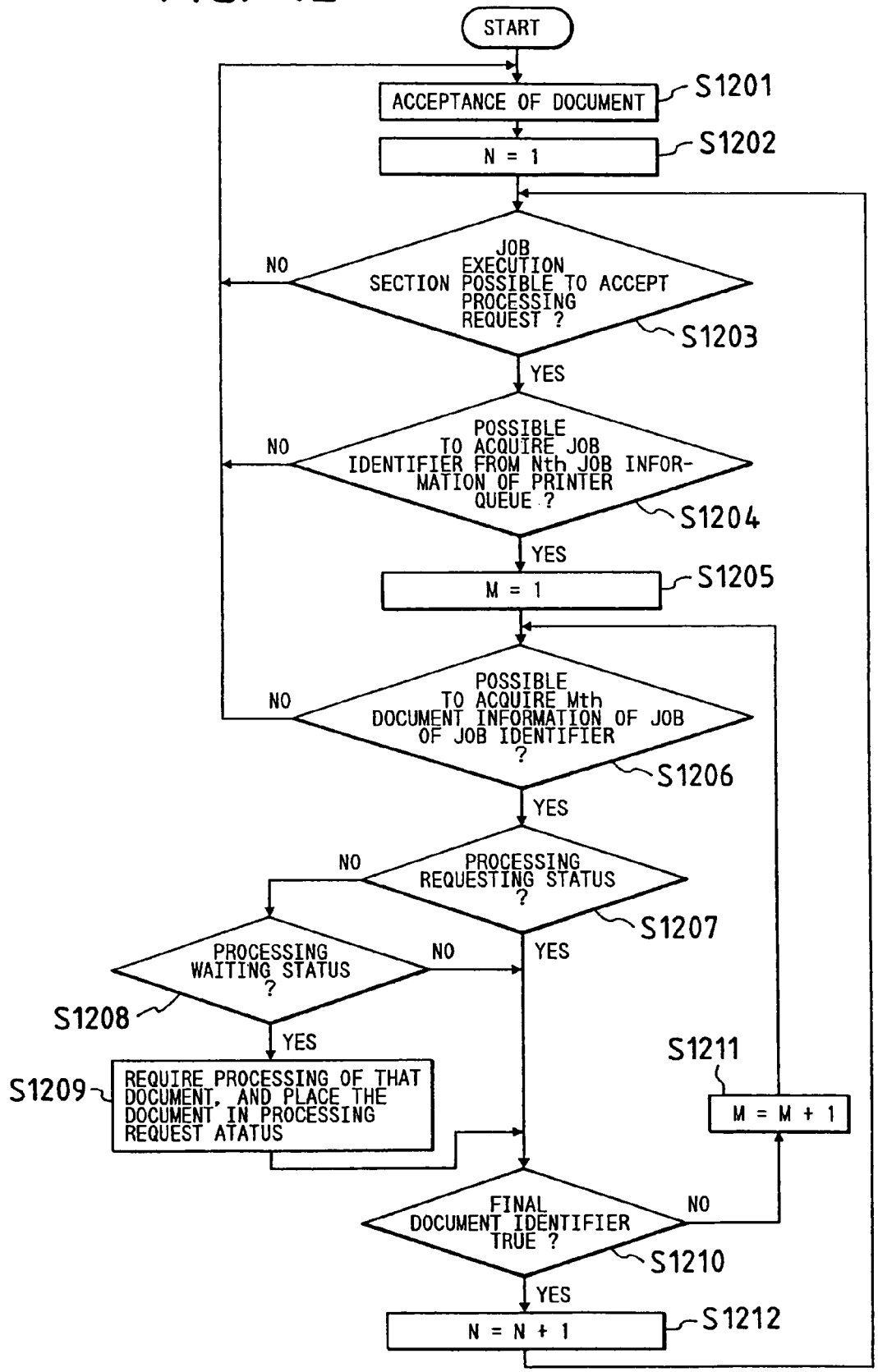
FIG. 12 is a flowchart showing processing procedures when document processing requests are continuously issued in the second embodiment.

With reference to a flowchart shown in FIG. 12, processing procedures in the job scheduling device 12 of this embodiment when document processing requests are continuously issued will be described.

Upon receipt of a document delivered from the terminal 11, the request control section 14 accepts this document (step S1201). In addition to the acceptance of a document which was previously described upon reference to the flowchart shown in FIG. 3, the request control section 14 accepts an acknowledgement of enabled processing issued from the job execution section 13. N representing a printer queue number is set to one (step S1202), and the request control section 14 judges whether or not the job execution section 13 is enabled (step S1203). This judgement is made based on the presence or absence of the acknowledgement of enabled processing from the job execution section 13. If the job execution section 13 becomes enabled, and if a job identifier (a job ID) can be obtained from the job information of an Nth job in the printer queue (step S1204), M representing a document number of that job is set to one (step S1205). It is judged whether or not Mth document information of a job having the job identifier can be obtained (step S1206). If the Mth document information is obtainable, it is judged whether or not the document information is in a state of requesting processing (step S1207). If it is not in that state, it is then judged whether or not the document information is waiting for processing (step S1208). If the document information is waiting for processing, a processing request for that document is issued to the job execution section 13, and the document information is placed in a state of requesting processing (step S11209). If the document information is the state of requesting processing in step S11207, or if the document information is not in the state of waiting for processing in step S1208, it is judged whether or not the final document identifier of the document information is set to TRUE (step S1210). If the final document identifier is not set to TRUE, M=M+1 (step S1211). The processing proceeds to step S1206, and the next document will be processed. If the final document identifier is set to TRUE in step S1210, N=N+1 (step S1211). The processing proceeds to step S1203, and the next job will be processed.

In this way, jobs queued in the printer queue 22 are sequentially examined. If a document to which a processing request is issuable is included in the jobs, a processing request for that document is issued to the job execution section 13. Further, if this processing is executed for all of the jobs queued in the printer queue 22, it becomes possible to continuously issue processing requests for documents from one job to another job without interruption. Therefore, compared with the conventional case where scheduling is effected on a job-by-job basis, scheduling corresponding to the throughput of the job execution section 13 can be carried out. In this case, since it is not necessary to hold the issue of a processing request until one job is completely finished, which eliminates useless idle time and makes it possible to reduce job processing time.

Figure 13:
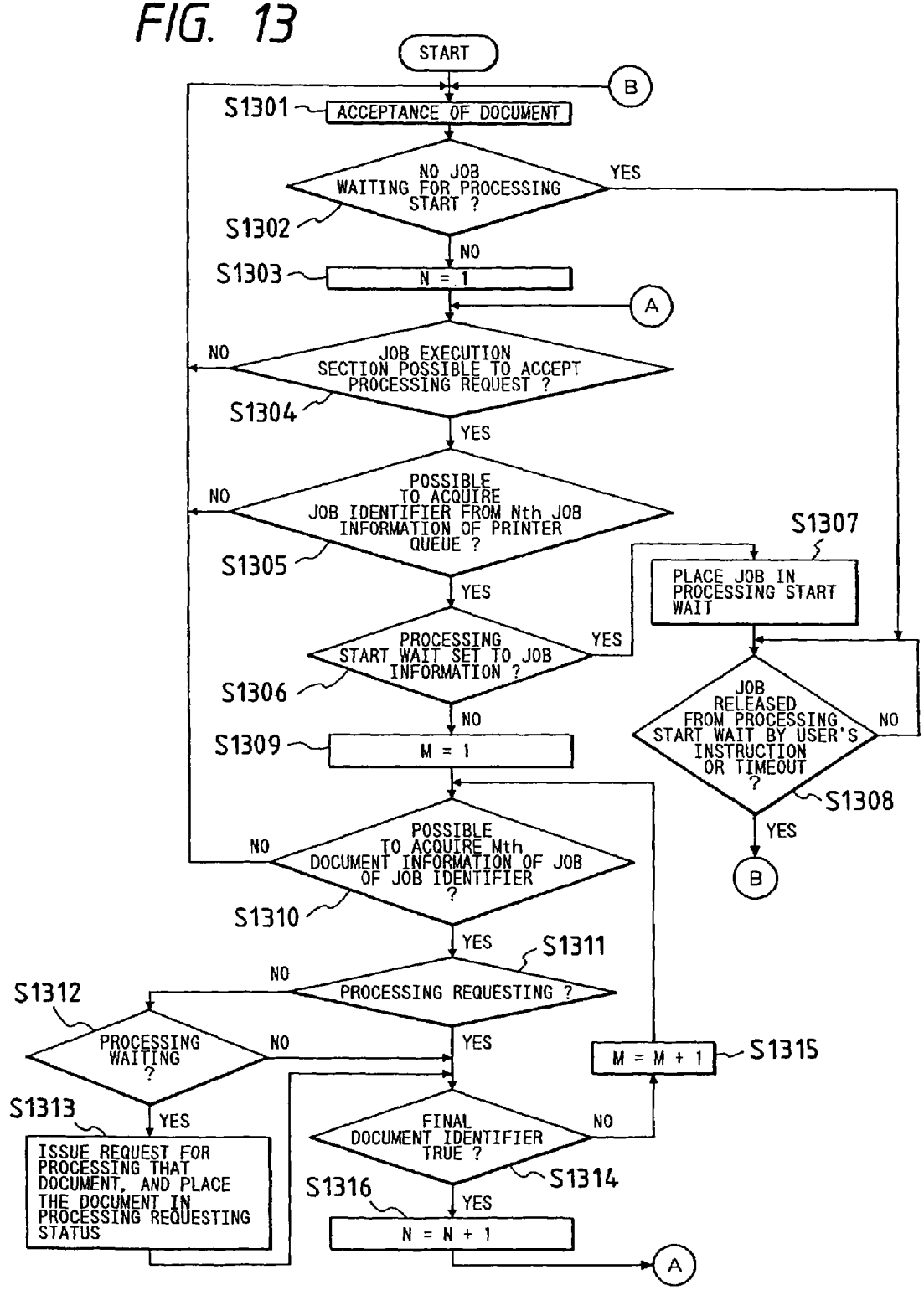
FIG. 13 is a flowchart showing the continuous issue of document processing procedures, and processing procedures when a job processing start wait is controlled in the second embodiment.

In the job scheduling device 12 of the second embodiment, processing procedures for the continuous issue of document processing requests and the control of a job processing start wait will now be described using the flowchart shown in FIG. 13. Here, the explanation of overlaps between this flowchart and the flowchart shown in FIG. 12 will be omitted as needed.

To begin with, upon receipt of a document delivered from the terminal 11, the request control section 14 accepts this document (step S1301). Subsequently, it is judged whether or not the printer queue includes a job waiting for the initiation of processing (step S1302). If the printer queue does not include any job waiting for processing start, N representing a printer queue number is set to one (step S1303), and it is judged whether or not the job execution section 13 becomes enabled (step S1304). If the job execution section 13 is enabled, and if a job identifier (a job ID) can be obtained from the job information of an Nth job in the printer queue (step S1305), it is judged whether or not a processing start wait is set to the job information of that job before it is checked whether or not the leading document of the job can issue a processing request (step S1306). If the processing start wait is set to the job information of that job, the job is rendered in a processing start wait state (step S1307). No processing request is issued to a document of this job and documents of subsequent jobs until the job is released from this wait state.

If another job is still waiting for processing start after step S11307, or if there is a job waiting for processing start in step S1302, the processing returns to step S1301 when the job is released from the processing start wait state by the user's instruction input from the terminal 11 or a timeout (step S1308).

On the other hand, if the processing start wait was not set to the job information of the job in step S1306, M representing a document number of that job is set to one (step S1309), and it is judged whether or not Mth document information of a job having the previously mentioned job identifier is obtainable (step S1310). If the Mth document information is obtainable, it is judged whether or not the document information is in a state of requesting processing (step S1311). If it is not in that state, it is then judged whether or not the document information is waiting for processing (step S1312). If the document information is waiting for processing, a processing request for that document is issued to the job execution section 13, and the document information is placed in the state of requesting processing (step S1313). If the document information is the state of requesting processing in step S1311, or if the document information is not in the state of waiting for processing in step S1313, it is judged whether or not the final document identifier of the document information is set to TRUE (step S1314). If the document identifier is not set to TRUE, M=M+1 (step S1315). The processing proceeds to step S1310, and the next document will be processed. If the final document identifier is set to TRUE in step 1314, N=N+1 (step S1316), the processing proceeds to step S1304, and the next job will be processed.

In this processing, it is checked whether or not the processing start wait is set to a job, before it is checked whether or not the leading document of the job can issue a processing request. If the processing start wait is set to the job, the job is rendered in a processing start wait state. No processing request is issued to a document of that job and documents of subsequent jobs until the job is released from the processing start wait state by the user's instruction or a timeout. As a result of this, it becomes possible to control a job processing start wait in parallel with the continuous issue of document processing requests.

In the job scheduling device 12 of the second embodiment, processing procedures for the continuous issue of document processing requests and the control of a job processing completion wait will now be described using a flowchart shown in FIG. 14. Here, the explanation of overlaps between this flowchart and the flowchart shown in FIG. 12 will be omitted as needed.

To begin with, upon receipt of a document delivered from the terminal 11, the request control section 14 accepts this document (step S1401) and accepts an acknowledgement of processing completion from the job execution section 13 (step S1402).

Figure 15:
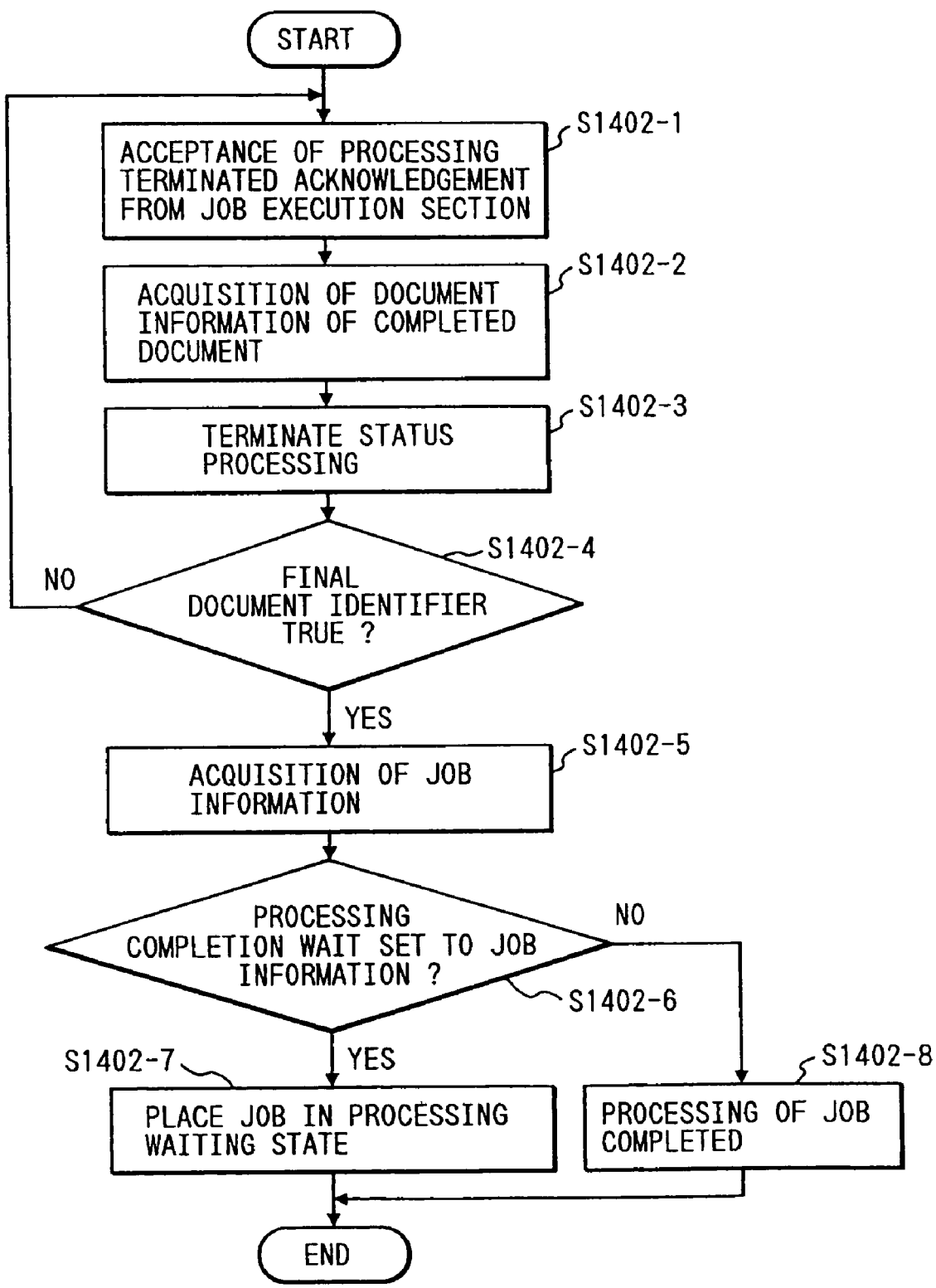
FIG. 15 is a flowchart showing the flow of acceptance of a processing completion acknowledgement from a job execution section in the second embodiment.

The flow of the acceptance of the processing completion acknowledgement issued from the job execution section 13 which is executed in step S1402 will be described using a flowchart shown in FIG. 15.

Upon receipt of an acknowledgement of processing completion from the job execution section 13 (step S1402-1), the job scheduling section 15 acquires document information of a document whose processing was completed (step S1402-2), and the document is placed in a processing completed state (step S1402-3). Subsequently, it is judged whether or not the final document identifier of that document, information is TRUE (step S1402-4). If the final document identifier is not TRUE, the processing returns to step S1402-1. If the final document identifier is TRUE, that is, if the document whose processing was completed is the final document, the job information of that document is obtained (step S1402-5). Then, it is judged whether or not a processing completion wait is set to the job information (step S1402-6). If the processing completion wait is set to the job information, the job is rendered in a processing completion wait state (step S1402-7). On the other hand, the processing completion wait is not set to the job information, the processing of that job is completed (step S1402-8).

Figure 14:
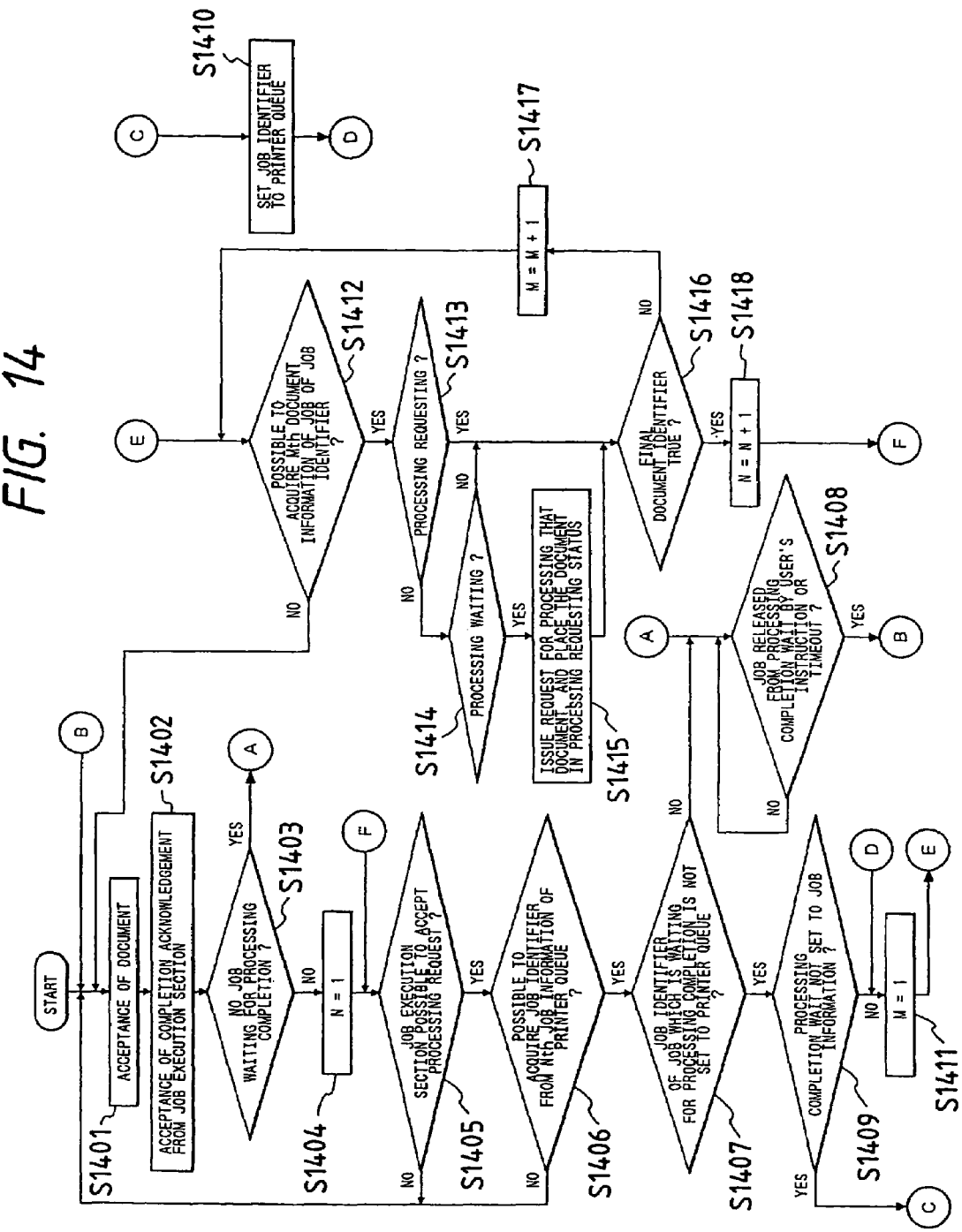
FIG. 14 is a flowchart showing the continuous issue of document processing procedures, and processing procedures when a job processing completion wait is controlled in the second embodiment.

In the flowchart shown in FIG. 14, it is judged whether or not the printer queue includes a job waiting for processing completion (step S1403). If the queue does not include any job waiting for processing completion, N representing a printer queue number is set to one (step S1404), and it is judged whether or not the job execution section 13 becomes enabled (step S1405). If the job execution section 13 is enabled, and if a job identifier (a job ID) is obtainable from the job information of an Nth job in the printer queue (step S1406), it is judged whether or not a job identifier of the job waiting for processing is set to the printer queue (step S1407). If the job identifier of the job waiting for processing is set to the printer queue, or if there is a job waiting for the completion of processing in step S1403, the processing returns to step S1401 when the job is released from the processing completion wait state by the user's instruction delivered from the terminal 11 or a timeout (step S1408).

If the job identifier of the job waiting for processing is not set to the printer queue in step S1407, it is judged whether or not a processing completion wait is set to the job information of that job (step S1409). If the job completion wait is set to the job information, the job is rendered in a processing completion wait state, and the job identifier of this job waiting for the completion of processing is set to the printer queue (step S1410).

On the other hand, if the processing completion wait was not set to the job information of the job in step S1409, or if the job identifier of the job waiting for the completion of processing was set to the printer queue in step S1410, M representing a document number of that job is set to one (step S1411), and it is judged whether or not Mth document information of a job having the previously mentioned job identifier is obtainable (step S1412). If the Mth document information is not obtainable, the processing will return to step S1401. However, if the Mth document information is obtainable, it is judged whether or not the document information is in a state of requesting processing (step S1413). If it is not in that state, it is then judged whether or not the document information is waiting for processing (step S1414). If the document information is waiting for processing, a processing request for that document is issued to the job execution section 13, and the document information is placed in the state of requesting processing (step S1415).

If the document information is the state of requesting processing in step S1413, or if a document processing request was issued in step S1415, it is judged whether or not the final document identifier of the document information is set to TRUE (step S1416). If the document identifier is not set to TRUE, M=M+1 (step S1417), the processing proceeds to step S1412, and the next document will be processed. If the final document identifier is set to TRUE in step S1416, N=N+1 (step S1418). The processing proceeds to step S1405, and the next job will be processed.

In this processing, it is checked whether or not the processing completion wait is set to a job, before it is checked whether or not the leading document of the job can issue a processing request. If the processing completion wait is set to the job, a job identifier of that job is set to the printer queue. Hereafter, a processing request is issued only with respect to this job. When the processing of documents of this job is completely finished, this job is placed in a processing completion state. No processing request is issued to documents of subsequent jobs until the job is released from the processing completion wait state by the user's instruction or a timeout.

As a result of this, it becomes possible to control the job processing completion wait in parallel with the continuous issue of document processing requests.

Figure 16:
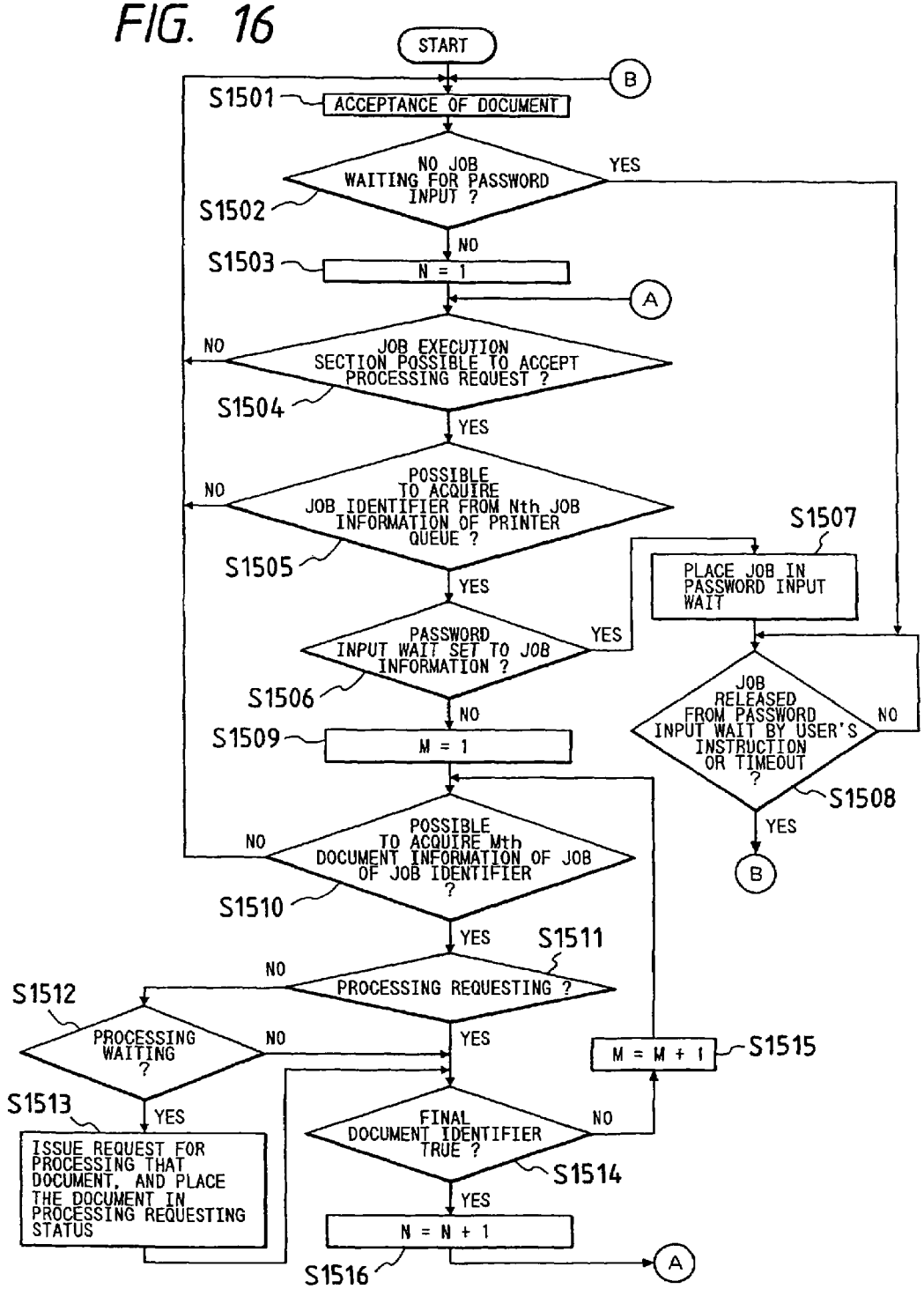
FIG. 16 is a flowchart showing the continuous issue of document processing procedures, and processing procedures when a password input wait is controlled in the second embodiment.

In the job scheduling device 12 of the second embodiment, processing procedures for the continuous issue of document processing requests and the control of a job password input wait will now be described using a flowchart shown in FIG. 16. Here, the explanation of overlaps between this flowchart and the flowchart shown in FIG. 12 will be omitted as needed.

To begin with, upon receipt of a document delivered from the terminal 11, the request control section 14 accepts this document (step S1501). Subsequently, it is judged whether or not the printer queue includes a job waiting for a password input (step S1502). If the printer queue includes a job waiting for a password input, no processing request is issued. On the other hand, if the printer queue does not include any job waiting for a password input, N representing a printer queue number is set to one (step S1503), and it is judged whether or not the job execution section 13 becomes enabled (step S1504). If the job execution section 13 is enabled, and if a job identifier (a job ID) is obtainable from the job information of an Nth job in the printer queue (step S1505), it is judged whether or not a password input wait is set to the job information of that job, before it is checked whether or not the leading document of the job can issue a processing request (step S1506). If the password input wait is set to the job information of that job, the job is rendered in a password input wait state (step S1507). No processing request is issued to a document of this job and documents of subsequent jobs until the job is released from this wait state.

If another job is still waiting for a password input after step S1507, or if there is a job waiting for password input in step S1502, the processing returns to step S1501 when the job is released from the password input wait state by the user's instruction input from the terminal 11 or a timeout (step S1508).

On the other hand, if the password input wait is not set to the job information of the job in step S1506, M representing a document number of that job is set to one (step S1509), and it is judged whether or not Mth document information of a job having the previously mentioned job identifier is obtainable (step S1510). If the Mth document information is obtainable, it is judged whether or not the document information is in a state of requesting processing (step S1511). If it is not in that state, it is then judged whether or not the document information is waiting for processing (step S1512). If the document information is waiting for processing, a processing request for that document is issued to the job execution section 13, and the document information is placed in the state of requesting processing (step S1513). If the document information is the state of requesting processing in step S1511, or if the document information is not in the state of waiting for processing in step S1513, it is judged whether or not the final document identifier of the document information is set to TRUE (step S1514). If the document identifier is not set to TRUE, M=M+1 (step S1515). The processing proceeds to step S1510, and the next document will be processed. If the final document identifier is set to TRUE in step S1514, N=N+1 (step S1516), the processing proceeds to step S1504, and the next job will be processed.

In this processing, it is checked whether or not the password input wait is set to a job, before it is checked whether or not the leading document of the job can issue a processing request. If the password input wait is set to the job, the job is rendered in a password input wait state. No processing request is issued to a document of that job and documents of subsequent jobs until the job is released from the password input wait state by the user's instruction or a timeout. As a result of this, it becomes possible to control the password input wait in parallel with the continuous issue of document processing requests.

Specific examples of the control of a job in a processing start wait state, a job in a processing completion wait state, and a job in a password input wait state when document processing requests are continuously issued will be described.

Figure 17:
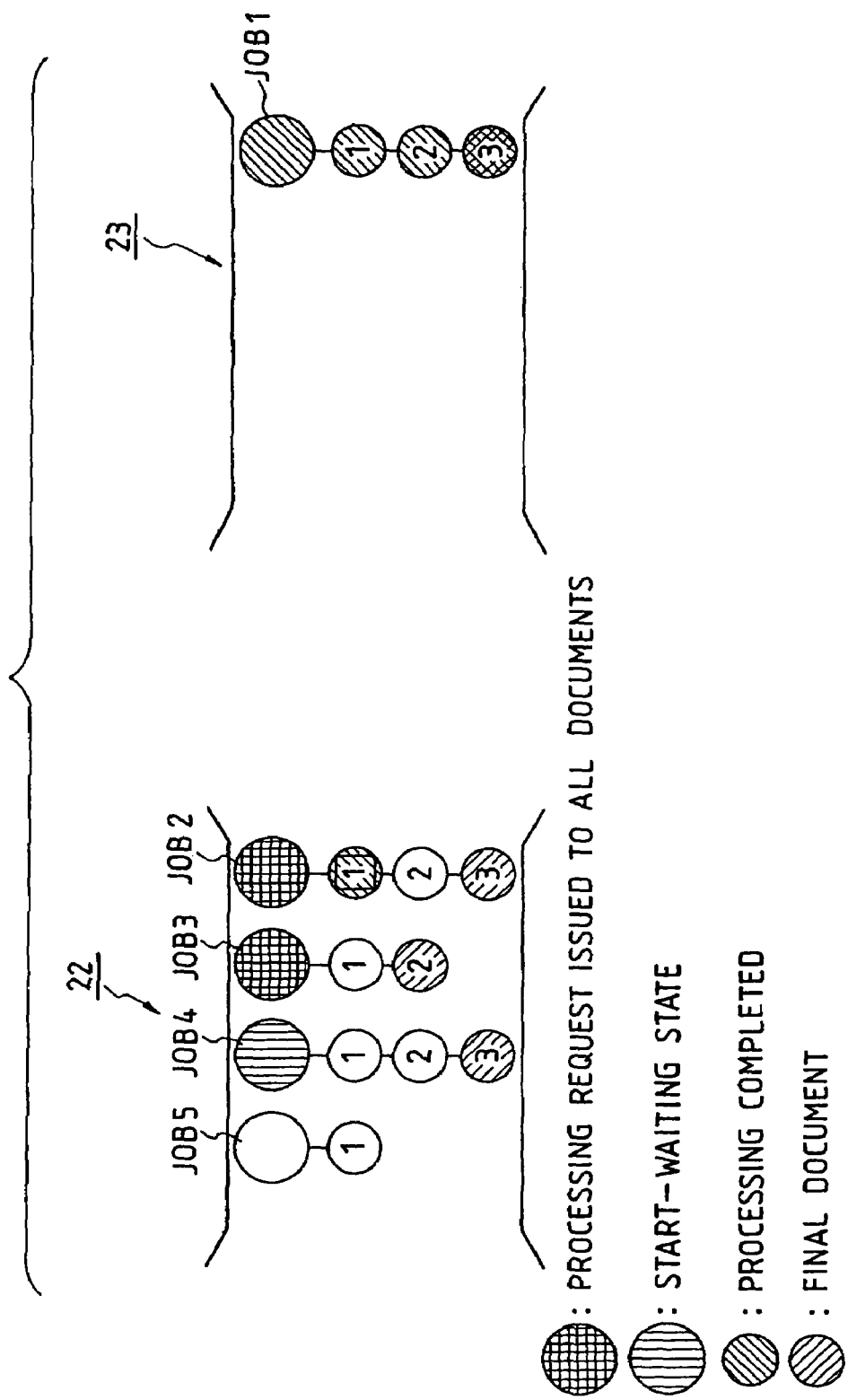
FIG. 17 is an explanatory view showing the relationship between a printer queue and a terminate queue in which jobs waiting for processing start are queued in the second embodiment.

FIG. 17 is an explanatory view showing the relationship between a printer queue, in which jobs waiting for the initiation of processing are queued, and a terminate queue.

Jobs 2-5 are queued in the printer queue 22, and a job 1 the processing of which was completed with respect to all documents of that job is queued in the terminate queue 23. In the case of jobs 2 and 3 in the printer queue 22, processing requests have already been issued to all of the documents of these jobs, but the processing of some of the documents is not completed yet, and hence the documents still remain in the printer queue 22.

In this example, a processing start wait is specified for a job 4, and the job 4 enters a processing start wait state the moment at which a processing request for the document 2 of the job 3 is issued and the job 4 becomes the next object of the processing. A processing request for the next job 5 is not issued until this job 4 is released from the processing start wait state. When the processing of all the documents of the jobs 2 and 3 are completed, the jobs 2 and 3 move to the terminate queue 23. The job 4 is released from the processing start wait state by a user's instruction or a timeout. Thereafter, the job 4 is dealt in the same manner as an ordinary job.

Figure 18:
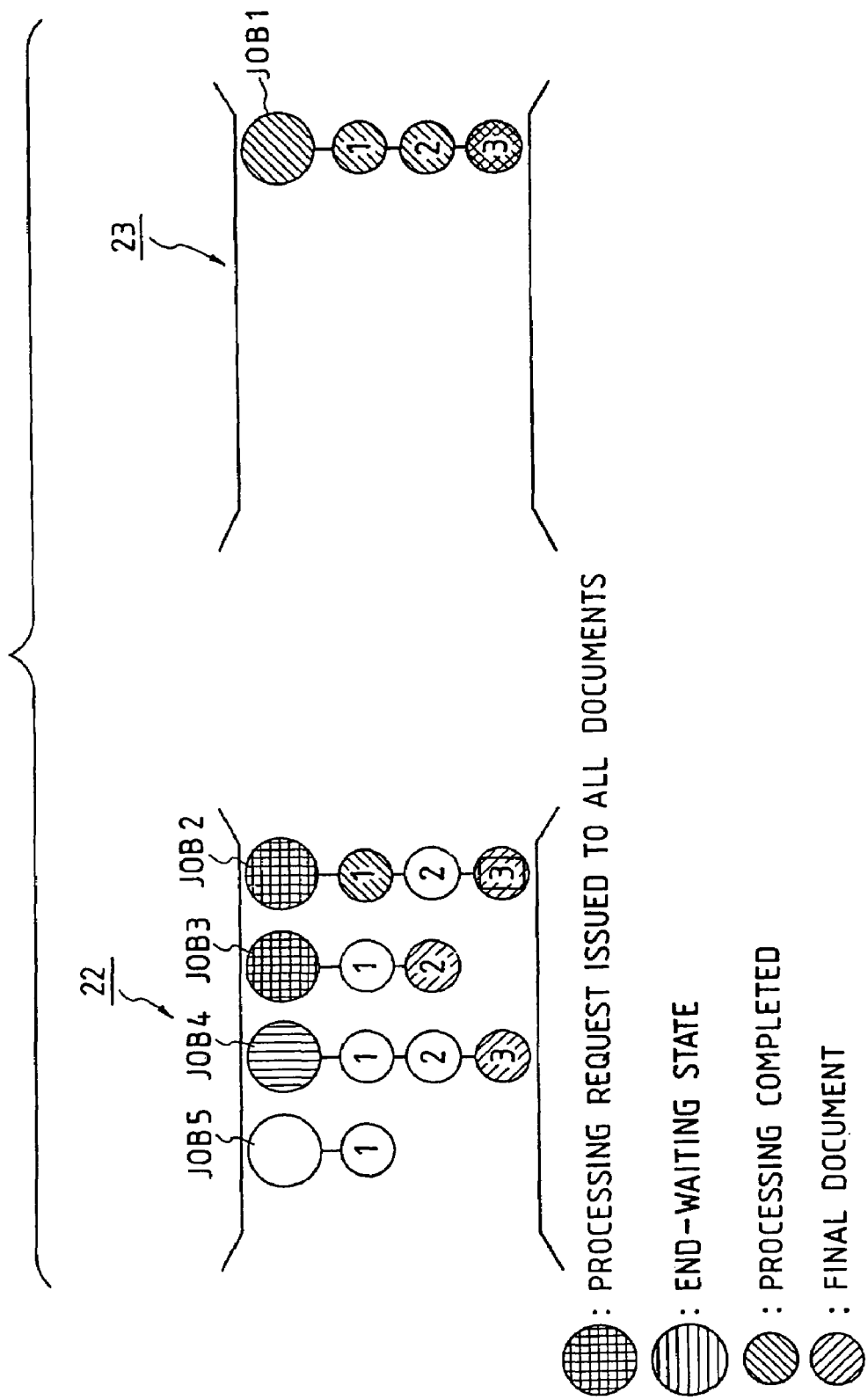
FIG. 18 is an explanatory view showing the relationship between a printer queue and a terminate queue in which jobs waiting for processing completion are queued in the second embodiment (part 1)
Figure 19:
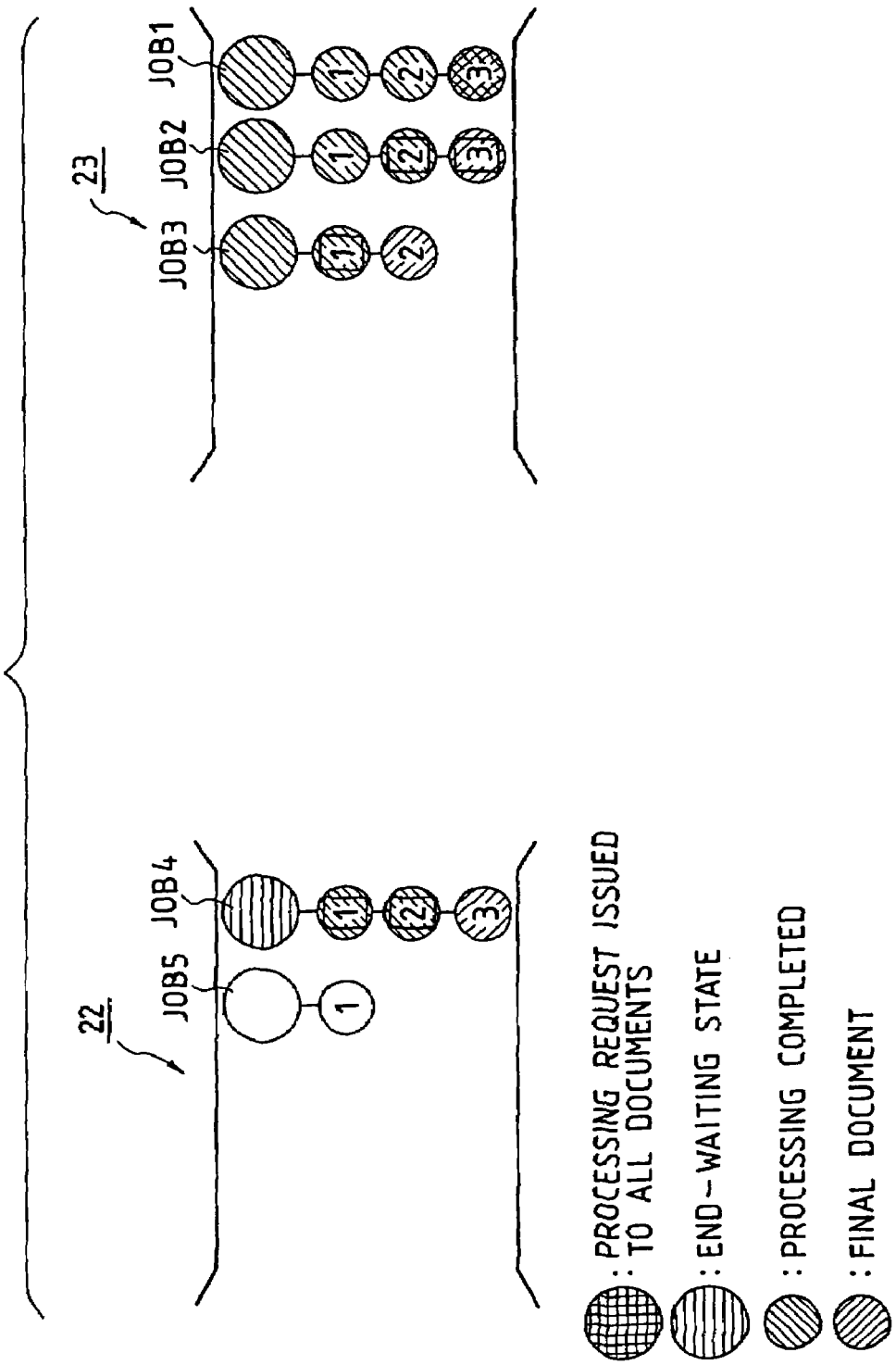
FIG. 19 is an explanatory view showing the relationship between a printer queue and a terminate queue in which jobs waiting for processing completion are queued according to the second embodiment (part 2)

FIGS. 18 and 19 are explanatory views showing the relationship between a printer queue, in which jobs waiting for the completion of processing are queued, and a terminate queue.

In FIG. 17, the jobs 2-5 are queued in the printer queue 22, and the job 1 the processing of which was completed with respect to all documents of that job is queued in the terminate queue 23. In the case of jobs 2 and 3 in the printer queue 22, processing requests have already been issued to all of the documents of these jobs, but the processing of some of the documents is not completed yet, and hence the documents still remain in the printer queue 22.

In this example, a processing completion wait is specified for the job 4, and a job identifier of this job 4 is retained in the printer queue 22. In this case, a processing request is only issuable with respect to documents of the job 4, and no processing request is issued to the next job 5.

When the processing of all the documents of the jobs 2 and 3 are completed, these two jobs move to the terminate queue 23 as shown in FIG. 18. The job 4 is released from the processing start wait state the moment at which the processing of all the documents of the job 4 is completed. Since the job 4 is in the processing completion wait state, a processing request for the job 5 is not issued. After having been released from the processing completion wait state by the user's instruction or a timeout, the job 4 moves to the terminate queue 23.

Figure 20:
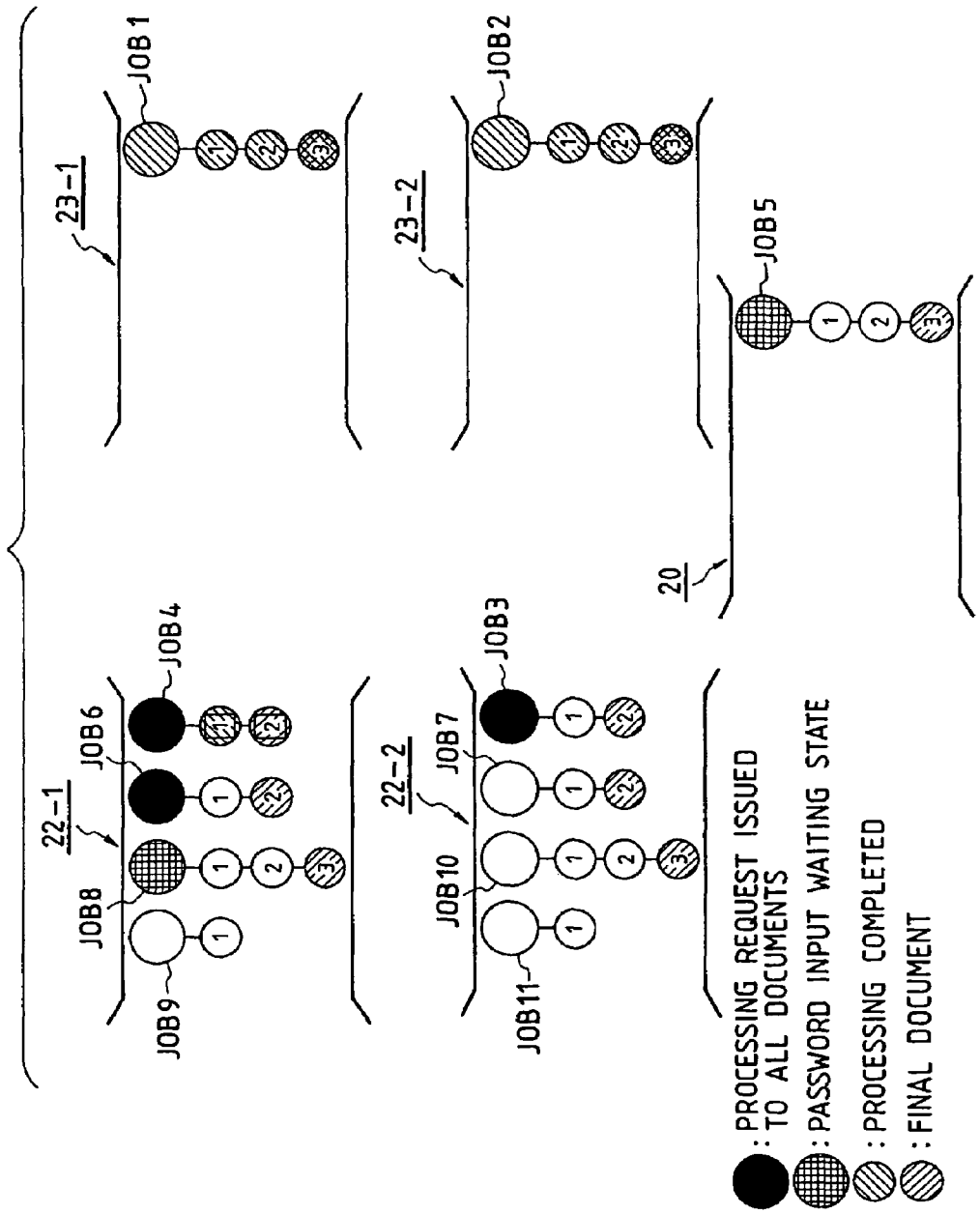
FIG. 20 is an explanatory view showing the relationship between a printer queue, a terminate queue, and a wait queue in which jobs waiting for password input are queued in the second embodiment.
Figure 21:
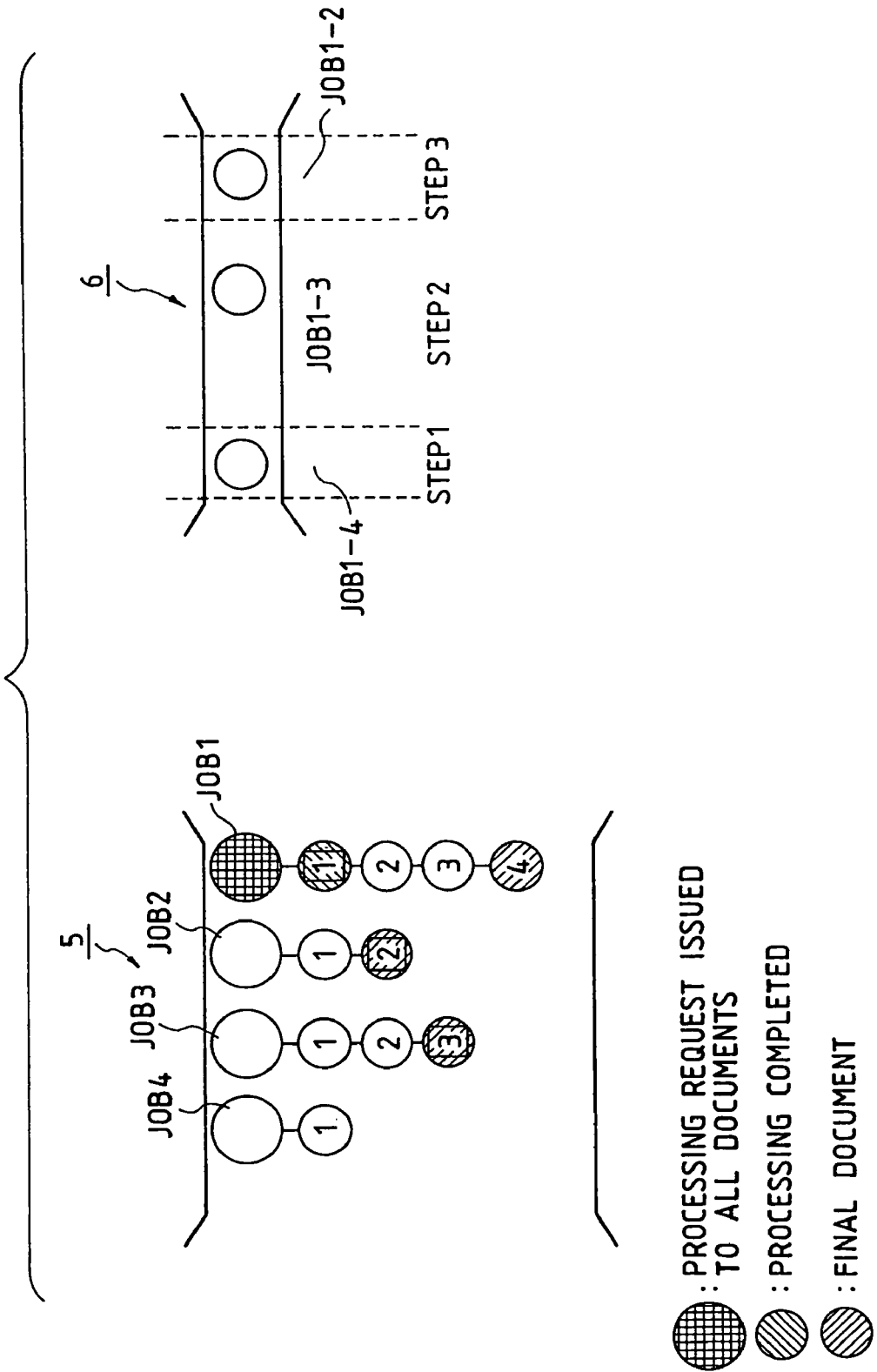
FIG. 21 is an explanatory view showing the relationship between the state of a printer queue and a document to be processed in a job execution section in the second embodiment.

FIG. 20 is an explanatory view showing the relationship between a printer queue, in which jobs waiting for a password input are queued, a terminate queue, and a wait queue.

Jobs 4, 6, 8, and 9 are queued in a printer queue 22-1, and the job 1 the processing of which was completed is queued in a corresponding terminate queue 23-1. Jobs 3, 7, 10, and 11 are queued in a printer queue 22-2, and a job 2 the processing of which was completed is queued in a corresponding terminate queue 23-2. In the case of jobs 4 and 6 in the printer queue 22-1, processing requests have already been issued to all of the documents of these jobs, but the processing of some of the documents is not completed yet, and hence the documents still remain in the printer queue 22-1.

In the printer queue 22-1, a password input wait is specified for the job 8, and the job 8 enters a password input wait state the moment at which a processing request for the document 2 of the job 6 is issued and the job 8 becomes the next object of the processing. When a password is input by the user, the job 8 is released from the password input wait state. However, if a password is not input during a fixed period of time, the job 8 moves to the wait queue 20 as a result of the occurrence of a timeout. During this period, a processing request for a document of the job 9 is not issued. After the processing of the documents of the jobs 4 and 6 has been completed, these two jobs move to the terminate queue 23-1. At this time, if the job 8 is released from the password input wait state, the processing of the job 8 becomes possible. However, if the job 8 remains in the password input wait state, processing requests for the documents of the jobs 8 and 9 are not issued until the job 8 is released from the password input state. Thereafter, if the job 8 moves to the wait queue 20 as a result of the occurrence of a timeout, a processing request for the job 9 becomes issuable.

The printer queue 22-2 shows the manner in which the job 5 in the password input wait state between the jobs 3 and 7 moved to the wait queue 20 as a result of the occurrence of a timeout. In the printer queue 22-2, the job 7 becomes issuable a processing request, because the job 5 moved to the wait queue 20. The job 5 moved to the wait queue 20 is released from the password input wait state resulting from the input of a password by the user, and the job 5 returns to the printer queue 22-2. When the job 5 returns to the printer queue 22-2, the job is queued at the head of the queue or a priority position thereafter.

As previously described, in the second embodiment, when the job execution section becomes enabled, processing requests are sequentially issued for documents if the processing requests are issuable for these documents. If a processing start wait is set to the leading document of a job, the job is rendered in a processing start wait state, and no processing request is issued to documents of that job and subsequent jobs until the job is released from the processing start wait state by the user's instruction or a timeout. By virtue of this configuration, it is possible to control the processing start wait of a job while processing requests for documents are continuously issued.

Secondly, when the job execution section becomes enabled, processing requests for documents are sequentially issued if processing requests are issuable with respect to the documents. If a processing completion wait is set to the leading document of a job, the job is rendered in a processing completion wait state when the processing of that job is completely finished, and no processing request is issued to documents of subsequent jobs until the job is released from the processing completion wait state by the user's instruction or a timeout. By virtue of this configuration, it is possible to control the processing completion wait of a job while processing requests for documents are continuously issued.

Thirdly, when the job execution section becomes enabled, processing requests for documents are sequentially issued if processing requests are issuable with respect to the documents. If a password input wait is set to the leading document of a job, the job is rendered in a password input wait state when the processing of that job is completely finished, and no processing request is issued to documents of subsequent jobs until the job is released from the password input wait state by the user's instruction or a timeout. By virtue of this configuration, it is possible to control the password input wait of a job while processing requests for documents are continuously issued.

As previously described, scheduling is effected on a document-by-document basis in the second embodiment, and processing requests for documents are continuously issued. Hence, compared with the conventional case where scheduling is effected on a job-by-job basis, scheduling corresponding to the throughput of the job execution section can be carried out. As a result of this, useless idle time is eliminated, and job processing time can be reduced. Further, job control, such as a processing start wait, a processing completion wait, a password input wait, cannot be obstructed, and therefore it becomes possible to effectively utilize the throughput of the job execution section while maintaining advantages of the conventional job control.

A print processing system according to a third embodiment of the present invention will now be described with reference to FIGS. 22 to 25. The print processing system of this embodiment searches for a document which needs the conversion of a format by searching through jobs stored in a queue and converts the format of the job prior to print processing, when the format conversion facility becomes available.

Figure 23:
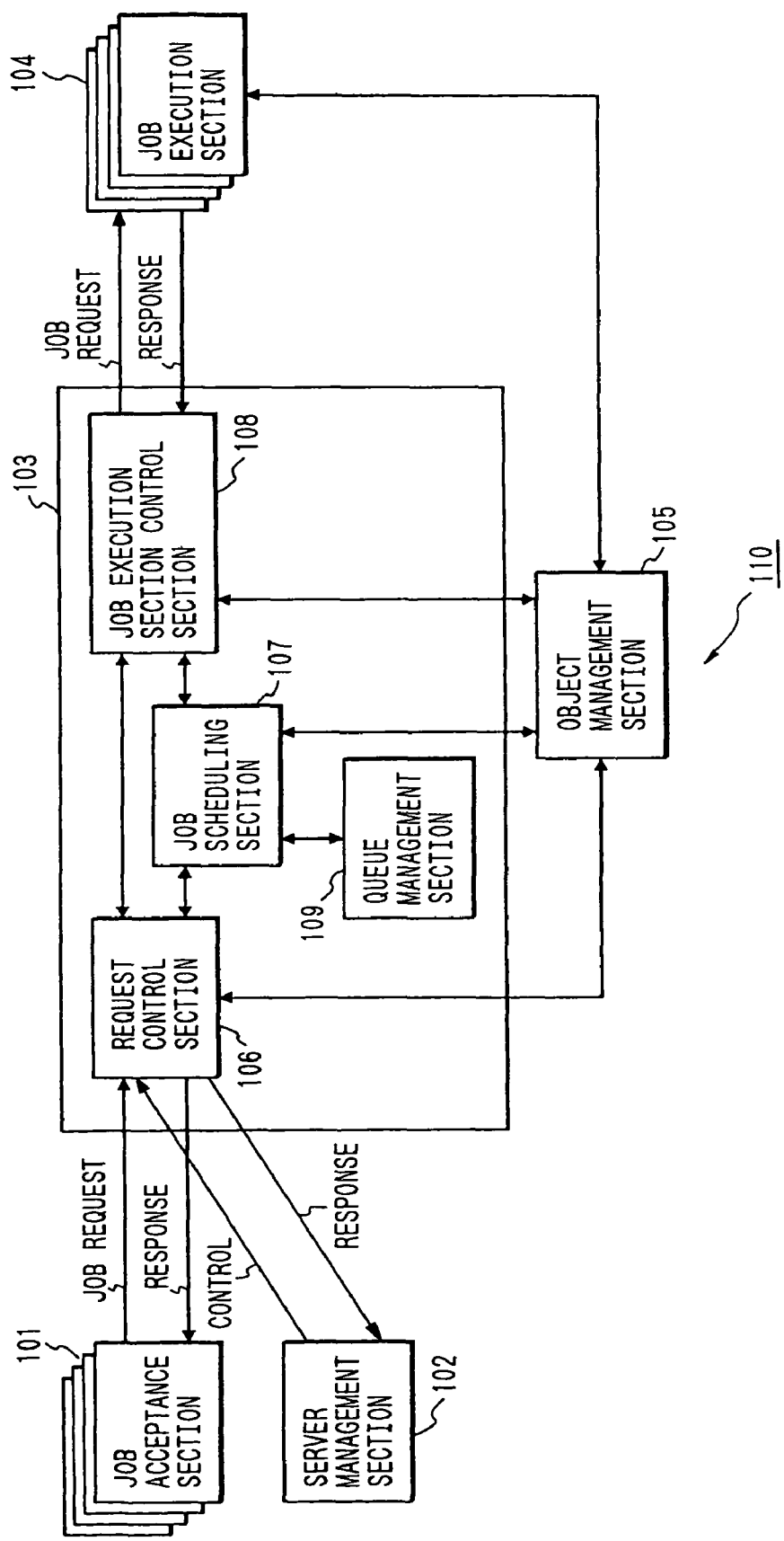
FIG. 23 is a block diagram showing the overview of a print processing system in the third embodiment.

FIG. 23 is a block diagram schematically showing a print processing system 110 according to this embodiment. The print processing system shown in FIG. 23 is made up of a plurality of job acceptance sections 101, a server management section 102, a job control section 103, job execution sections 104, and an object management section 105.

The job acceptance section 101 accepts a job request from a terminal connected to a network (not shown) in compliance with a network protocol, and outputs a job request relating to that job to the job output section 103. The server management section 102 accepts operation input by the system manager, and outputs a control request for managing the job control section 103. The job control section 103 sends response to the processing back to the server control section 102. The job control section 103 inputs the job request from the job acceptance section 101 and the control request from the server management section 102. To execute print processing associated with the job request, the job control section 103 issues a request for processing to a predetermined job execution section 104 by transferring the job to the job execution section. A plurality of jobs simultaneously stay in the job control section 103, spool queues, printer queues, or the like, are managed within the job control section 103. The job execution section 104 is made up of more than one job processing sections and job output sections (neither being shown in the drawings). The job processing sections execution processing such as the conversion of a print format, whereas the job output sections outputs jobs, namely, executes output processing of print. Upon receipt of a job processing request from a job execution section control section 108 which will be described later, the job execution section 104 reads necessary information (such as attribute) from an object management section 105 which will be described later, and executes the thus read information. Variations in state resulting from the progress of processing are reported to the job execution section control section 108 every time the state changes.

The object management section 105 manages various types of objects used in the job execution section 4 as attributes and values. The objects comprise objects of an input job, objects of a printer and a converter of the job execution section 104, and objects of the object control section itself. The job execution section 104 make access to this object management section 105, fetching attributes of jobs for which the job execution section received a request from the job control section 103 and executing processing of each job.

The job control section 103 is made up of a request control section 106, a job scheduling section 107, a job execution section control section 108, and a queue control section 109.

The request control section 106 accepts a job request and a control request from the job acceptance section 101 or the server management section 102, and prepares an object of that job using the object management section 105. The request control section 106 issues a job processing request to the job scheduling section 107 or the job execution section 108. Upon receipt of a job request, the request control section 106 checks whether or not a job ID is set in the document attributes of that job. If the job ID is not set in the document attributes, the job request is considered as a new job request. When received response from the job scheduling section 107 which issued the job processing request, the request control section 106 sends a newly provided job ID back to the user. The user sets this provided ID to a job request which the user continuously attempts to issue. If the job ID is set to a received job request, the request control section 106 judges the job request as being a document associated with a series of job requests which have already been accepted.

The job scheduling section 107 manages queues corresponding to the job execution section 104 and queues necessary for scheduling, and schedules job requests from the request control section 106. The job scheduling section 107 sequentially queues documents of a job in a spool queue when the job received from the request control section 106 is a completion type job which will be described later. When all of the documents of the job are completely obtained, the job scheduling device 107 selects a specified output device, and queues the job in a printer queue corresponding to that output device. On the other hand, if the job is a noncompletion type job which will be described later, the job scheduling device 107 selects the specified output device and then queues the job in a corresponding printer queue. Further, the job scheduling section 107 issues a job processing request relating to the job queued in the printer queue to the corresponding job execution section 104 via the job execution section control section 108.

The job execution section control section 108 transfers a processing request from the request control section 106 or the job scheduling section 107 to the job execution section 104. Further, the job execution section control section 108 transfers a status acknowledgement relating to the job delivered from the job execution section 104 to the job scheduling section 107. For example, when a conversion processing section, which will be described later, becomes enabled, the job execution section control section 108 issues a ready acknowledgement to the job scheduling section 107. Contrary to this, if the conversion processing section is disenabled, the job execution section control section 108 issues a busy acknowledgement to the job scheduling section 107. A status acknowledgement other than a job is transferred to the object management section 105, and the state of an object which is the object of the status acknowledgement is changed.

The queue management section 109 prepares queues, each corresponding to each job execution section 104, according to an instruction from the job scheduling section 107 and queues jobs. In addition to the preparation of queues, the queue management section 109 moves queues and switches the order of documents in the queue in response to a request from the system manager.

Figure 22:
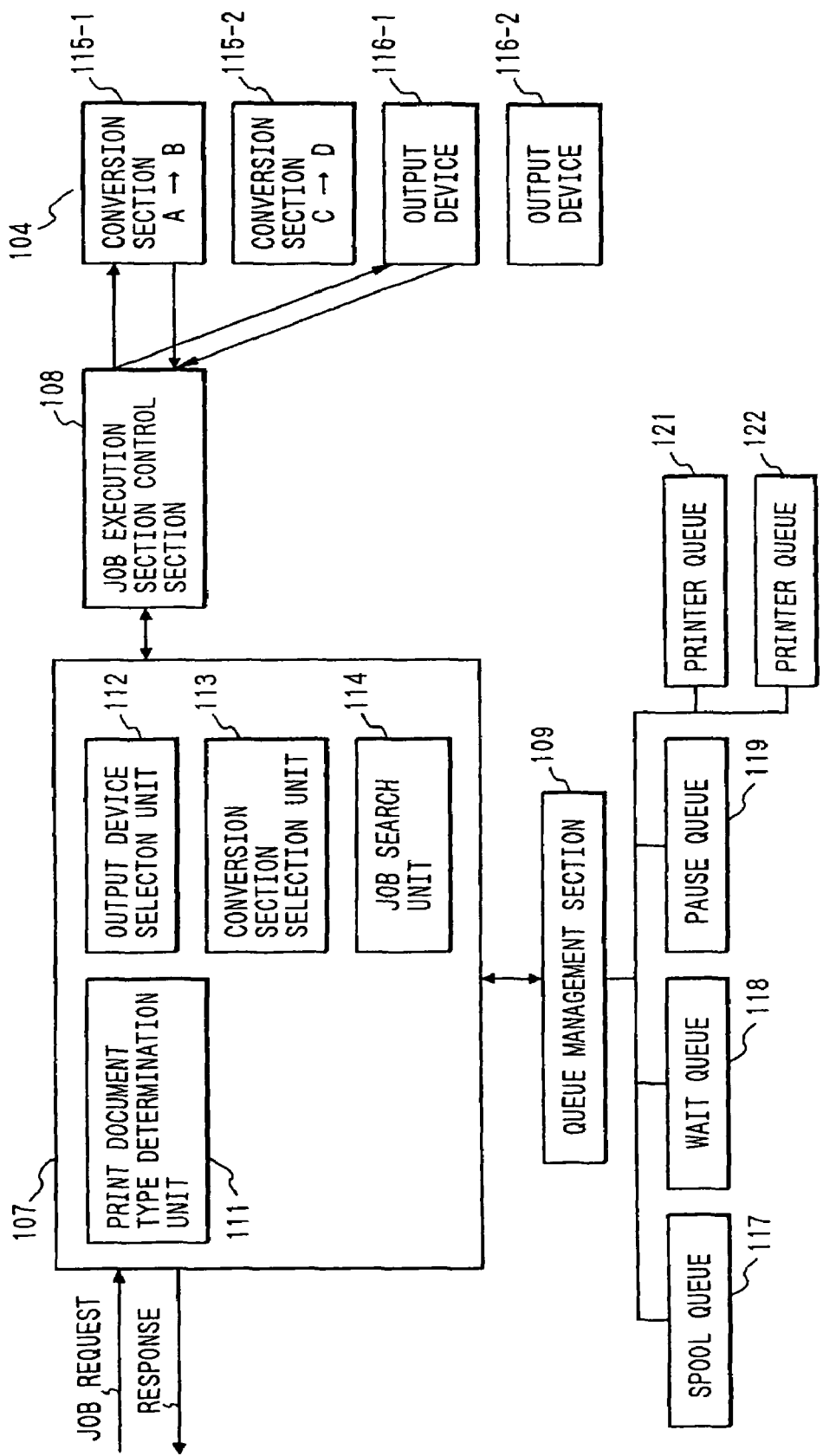
FIG. 22 is a block diagram showing the detailed configuration of a job scheduling section in a third embodiment of the present invention.

FIG. 22 is a block diagram showing the detailed configuration of the job scheduling section 107.

The job scheduling section 107 is provided with a print document type determination unit 111, an output device selection unit 112, a conversion processing section selection unit 113, and a job search unit 114. In addition to the previously mentioned scheduling function, the job scheduling section 107 searches for each queue in the queue management section 109 during a print processing wait, and carries out the conversion of a print format if there is a job which needs the conversion of a print format.

The print document type determination unit 111 determines whether the processing of a job is a completion type or a noncompletion type with reference to a job request transferred from the request control section 106. The completion type job is characterized in that print processing is not started until all documents included in a job are completely obtained. For example, a one-job multidocument type job is mentioned as one example of this type. The noncompletion type job is characterized in that the processing of a received job is sequentially started.

The output device selection unit 112 selects either of output devices 116-1 and 116-2 depending on an output device name specified for the job, for example, a printer name.

The conversion processing section selection unit 113 judges whether or not the conversion of a print format is necessary by comparing formats of documents included in a job with print formats which the output devices 116-1 and 116-2 can interpret. If the conversion of a print format is necessary, the conversion processing section selection unit 113 selects a conversion processing section suitable for that conversion from conversion sections 115-1 and 115-2.

The job search unit 114 searches spool queues and printer queues using a queue management section 109 which will be described later, and judges whether or not there is a job including documents which need the conversion of a print format at the job execution section 104.

The job execution section 104 is made up of a conversion processing section (a converter) for converting a print format, and an output device (a printer) which outputs a document on a printer in compliance with a print format. The conversion section 115-1 converts a print format A to a print format B, whereas the conversion section 115-2 converts a print format C to a print format D. The output device 116-1 corresponds to the print format B, and the output device 116-2 corresponds to the print format D.

The queue management section 109 prepares various types of queue which the job scheduling section 107 uses. Documents of a completion type job are queued in a spool queue 117, and the job is managed within this queue until all documents of that job are completely obtained. A wait queue 118 is one type of processing wait queue, and jobs waiting for a password input by the user are stored in this queue. A pause queue 119 is a queue in which temporarily interrupted jobs are stored. When a pause button (not shown) of the server management section 102 is pressed, a job moves from a printer queue, which will be described later, to the pause queue 119, or the job returns to the printer queue when a resume button is pressed. Printer queues 121 and 122 correspond to the output devices 116-1 and 116-2, jobs waiting for print processing are queued in these printer queues.

The operation of each section associated with the flow of processing, from the receipt of a document for which a job requested is issued to the queuing of the job in a printer queue, in the previously mentioned print processing system 110 will be described with reference to a flowchart of FIG. 24 and FIGS. 22 and 23.

To begin with, the job acceptance section 101 accepts a job request from a terminal connected to a network (not shown) and transfers the thus accepted job request to the job control section 103.

Upon receipt of the job request (step S2101), the request control section 106 of the job control section 103 prepares an object associated with the job request using the object management section 105, and issues a request for job processing to the job scheduling section 107 or the job execution section control section 108. The object prepared by the object management section 105 is used later when conversion or output processing is carried out in the job execution section 104.

When the job request is transferred to the job scheduling section 107, the print document type determination unit 111 determines whether the processing of the job is a completion type job or a noncompletion type job (step S2102). If the job is a completion type job, the job scheduling section 107 accepts the processing of a completion type job (step S2103) and queues a document in the spool queue 117 using the queue management section 109 (step S2104).

On the other hand, the request control section 106 checked whether or not a job ID is set to the document when received the job request in step S2101, and informed the job scheduling section 107 whether the job is the leading document of the job.

Depending on the acknowledgment received from the request control section 106, the job scheduling section 107 selects an output specified as one of the attributes of the document using the output device selection unit 112 (step S2106), when the document is the leading document of the job (step S2105). In this case, assume that the output device 116-1 is selected.

Subsequently, the job scheduling section 107 judges whether or not the document needs the conversion of a print format by comparing a print format of the document queued in the spool queue 117 with a print format of the output device 116-1 (step S2107). If the document needs the conversion of the print format, either of the conversion sections 115-1 and 115-2 is selected (step S2108). In this case, the print format of the document is A, and hence assume that the conversion section 115-1 which converts a print format A to a print format B is selected.

If a conversion section for converting a print format of a received document to a print format of a specified output device is not available, a request for print processing is issued to the specified output device. Thereafter, the output device carries out processing in response to errors. In addition, the output device may be arranged so as to issue an error acknowledgement to the user who issued the job request, or the job may be redirected to another print processing device in the network.

The job scheduling section 107 judges whether or not the conversion section 115-1 is enabled depending on the status acknowledgement from the selected conversion section 115-1 (step S2109). If the conversion section 115-1 is enabled, a request for the conversion of the document is issued to the conversion section 115-1 via the job execution section control section 108 (step S2110). The conversion section 115-1 which received the conversion request reads information necessary for conversion processing from the object management section 105, and converts a print format A included in the job into a print format B. At this time, the conversion section 115-1 issues a busy acknowledgement to the job execution section control section 108 when conversion processing is started, and issues a ready acknowledgement to the job execution section control section 108 when the conversion is completed.

If the selected conversion section 115-1 is not enabled, the job scheduling section 107 leaves the received document queued in the spool queue 117.

If the received document is not the final document of the job (step S2111), the processing returns to step S2101 and the next document is accepted. If the received document is the final document of the job, the queue management section 109 moves the job from the spool queue 117 to a printer queue 121 corresponding to the output device 116-1 (step S2112).

In this way, if the job is a completion type job, the received document is temporarily queued in the spool queue 117. After all of the documents of that job have been obtained, the documents are queued in the printer queue 122. Depending on the state of the conversion section 115-1 when each document is queued, some documents may be queued in the printer queue 122 while they remain unconverted. However, an attempt is again made to convert these unconverted documents while the documents are queued in the printer queue 122. This processing will be described with reference to a flowchart shown in FIG. 25.

If the processing of a job is judged as a noncompletion type job in step S2102, the job scheduling section 107 accepts the processing a noncompletion type job (step S2113). Depending on the acknowledgement from the request control section 106, the job scheduling section 107 selects an output device specified for the leading document using the output device selection section 112 (step S2115), when the document is the leading document of the job (step S2114). Further, the job scheduling section 107 queues the document in the printer queue corresponding to the selected output device using the queue management section 109 (step S2116). In this case, assume that the output device 116-2 is selected and the document is queued in the printer queue 122.

Subsequently, the conversion processing section selection unit judges whether or not the received document needs the conversion of a print format by comparing a print format of the received document with a print format of the output device 116-2 (step S2117). If the document needs the conversion of the print format, either of the conversion sections 115-1 and 115-2 is selected (step S2118). In this case, the print format of the document is C, and hence assume that the conversion section 115-2 which converts a print format C to a print format D is selected.

If a conversion section for converting a print format of a received document to a print format of a specified output device is not available, a request for print processing is issued to the specified output device as in the case of the completion type job.

The job scheduling section 107 judges whether or not the conversion section 115-2 is enabled depending on the status acknowledgement from the selected conversion section 115-2 (step S2119). If the conversion section 115-2 is enabled, a request for the conversion of the document is issued to the conversion section 115-2 via the job execution section control section 108 (step S2120). The conversion section 115-2 which received the conversion request reads information necessary for conversion processing from the object management section 105, and converts a print format C included in the job into a print format D. At this time, the conversion section 115-2 issues a busy acknowledgement to the job execution section control section 108 when conversion processing is started, and issues a ready acknowledgement to the job execution section control section 108 when the conversion is completed.

If the selected conversion section 115-2 is not enabled, the job scheduling section 107 leaves the received document queued in the printer queue 122.

If the received document is not the final document of the job (step S2121), the processing returns to step S2101 and the next document is accepted. If the received document is the final document of the job, the processing is terminated.

If the job is a noncompletion type job, documents are sequentially queued in the printer queue 122 from the first document. Depending on the state of the conversion section 115-2 at that time, some documents may be queued in the printer queue 122 while they remain unconverted. However, an attempt is again made to convert these unconverted documents while the documents are queued in the printer queue 122. This processing will be described with reference to the flowchart shown in FIG. 25.

Figure 24:
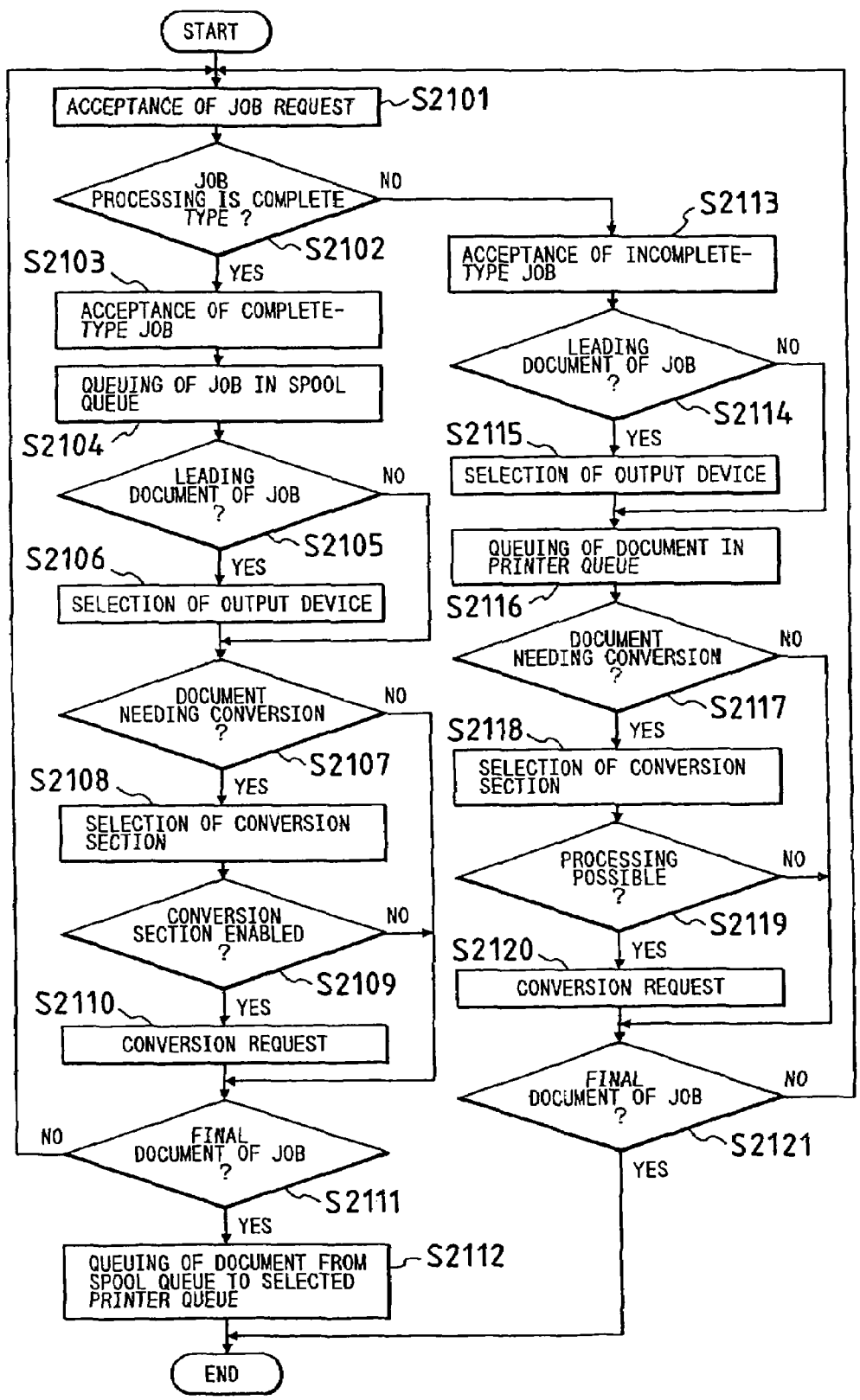
FIG. 24 is a flowchart showing the flow of processing from the receipt of a document to the queuing of the document in a printer queue in the third embodiment.

Upon receipt of a ready acknowledgement from the conversion processing section which was not possible to process the job in step S2109 or step S2119 shown in FIG. 24 via the job execution section control section 108, the job scheduling section 107 retrieves a job including a document which needs conversion and makes again an attempt to convert the document. This processing is carried out in parallel with the previously mentioned processing defined by the flowchart shown in FIG. 24.

Figure 25:
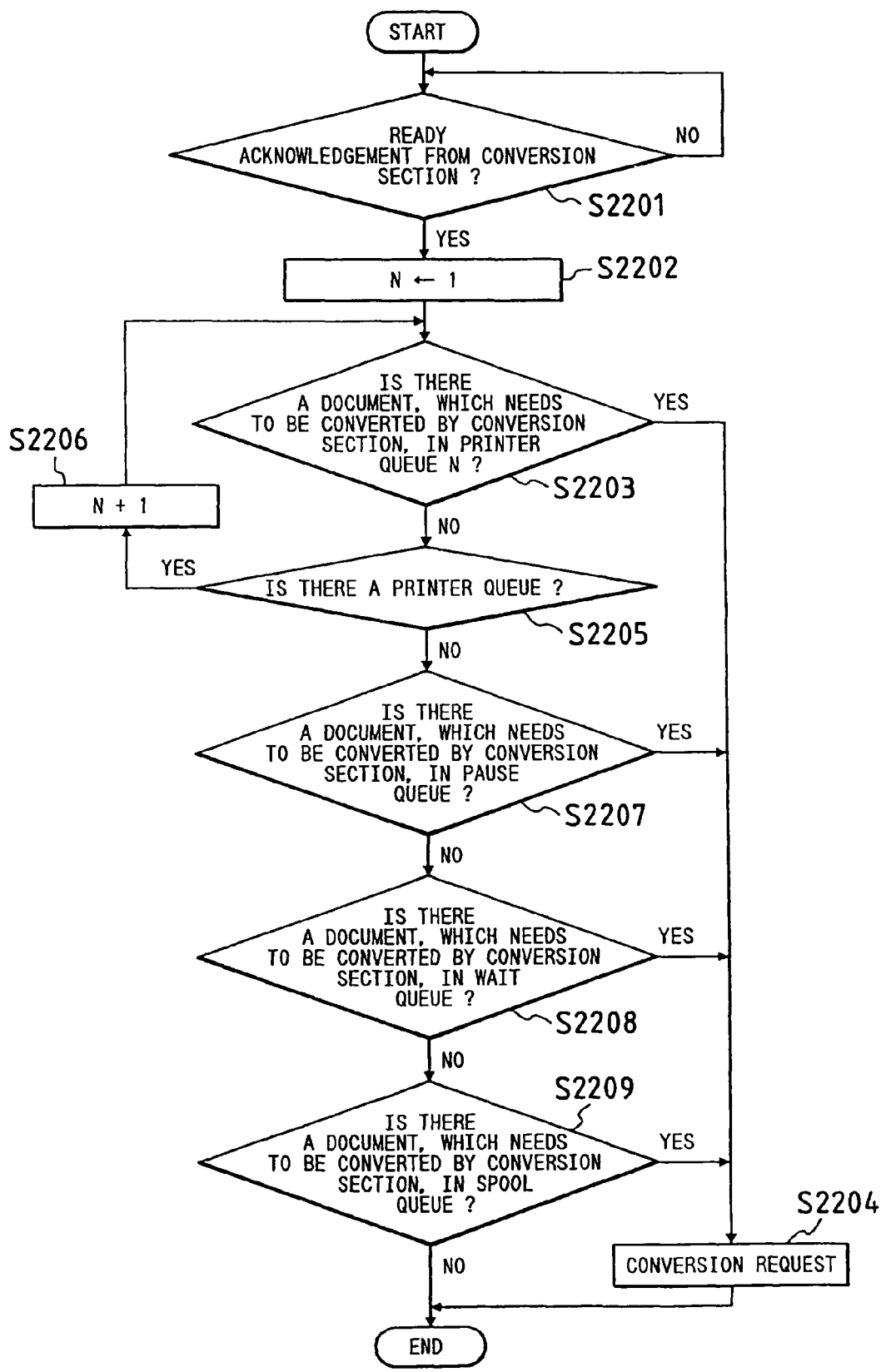
FIG. 25 is a flowchart showing the flow of conversion processing when a conversion section becomes possible to process in the third embodiment.

The flow of conversion processing when the conversion processing section becomes enabled will be described using a flowchart shown in FIG. 25, and the operation of each section will also be described with reference to FIGS. 22 and 23.

Upon receipt of a ready acknowledgement from the conversion section 115-1 or 115-2 via the job execution section control section 108 (step S2201), the job scheduling section 107 searches each queue managed by the queue management section 109 using the job search section 114 and retrieves a job including a document which needs conversion processing carried out in the conversion processing section.

Initially, the job search unit 114 sets a count N to one (step S2202), and retrieves a job, including a document which need the conversion of a print format executed by the conversion processing section, from a printer queue N (step S2203).

In other words, jobs stored in a queue to be retrieved are sequentially searched, and it is judged whether or not the searched job includes a document which needs the conversion of a print format. For example, when the output device 116-1 is selected with respect to the searched job, it is judged whether or not this job includes a document in a format other than a print format B, because the output device 116-1 can process the print format B. If the output device 116-2 is selected with respect to the searched job, it is judged whether or not the job includes a document in a format other than a print format D, because the output device 116-2 can process a print format D.

If the job including a document which needs conversion is found, a conversion processing section which carries out necessary conversion is selected, and a request for the conversion of the document is issued to the selected conversion processing section via the job execution section control section 108 (step S2204). The conversion processing section reads information necessary for conversion processing from the object management section 105 and converts a print format included in the job. The conversion processing section issues a busy acknowledgement to the job execution section control section 108 when the conversion processing is carried out and also issues a ready acknowledgement to the job execution section control section 108 when the conversion is terminated.

If the job including a document which needs conversion is not found in the printer queue N, it is judged whether or not there is another printer queue (step S2205). If there is another printer queue, N+1 is reset to N (step S2206), and the processing returns to step S2203. If there is no printer queue to be searched in step S2205, the pause queue 119 will be searched to find a job including a document which needs the conversion of a print format executed in the conversion processing section (step S2207). If a job including a document which needs conversion is found, a conversion processing section which carries out necessary conversion processing is selected, and a request for the conversion of the document is issued to the selected conversion processing section via the job execution section control section 108 (step S2204).

If a job including a document which needs conversion is not included in the pause queue 119, the wait queue 118 will be searched to find a job including a document which needs the conversion of a print format executed in the conversion processing section (step S2208). If a job including a document which needs conversion is found, a request for the conversion of the document is issued to a conversion processing section via the job execution section control section 108 (step S2204).

If a job including a document which needs conversion is not included in the wait queue 118, the spool queue 117 will be searched to find a job including a document which needs the conversion of a print format executed in the conversion processing section (step S2209). If a job including a document which needs conversion is found, a request for the conversion of the document is issued to a conversion processing section via the job execution section control section 108 (step S2204).

The order of the retrieval of queues is not limited to the above described order. However, it is most efficient to retrieve queues in order from the queue closest to the print processing, namely, in the order of the printer queue, the wait queue, the pause queue, and the spool queue.

After the conversion processing has been terminated in step S2204, the job scheduling section 107 newly sets the print data produced after the conversion as print data of this document. When either of the output devices 116-1 and 116-2 becomes enabled, the leading job in the printer queue 121 or the printer queue 122 is fetched, and a request for print processing is issued to a corresponding output device via the job execution section control section 108.

If the conversion processing section does not become enabled while the job is queued in the printer queue, the job will be sent to the output device while including the document which needs conversion. In this case, the print format of the document is converted when the conversion processing section becomes enabled immediately before print processing is carried out.

According to the print processing system 110 of this embodiment, even if a job including a document which needs conversion is stored in any of queues including the spool queue, each queue is retrieved the instant when the conversion processing section which carries out necessary conversion becomes enabled, and the necessary conversion is effected. When a job at the leading end of the printer queue is fetched, there is a considerably increased possibility that the conversion has previously been completed. For this reason, compared with a conventional method in which a print format is converted immediately before a printer processes print data, this processing system makes it possible to reduce idle time of the printer and improve print throughput. Particularly, in the case of the completion type job, a job which needs conversion is retrieved while it is queued in the spool queue as well as in the printer queue, and therefore improved throughput is achieved in the case of the print processing of the one-job multidocument.

As described above, according to the third embodiment, while a received job is stored in queue unit, a job including a document which needs the conversion of a print format is retrieved when the conversion unit becomes enabled, and the document included in the job is converted. By virtue of such a configuration, compared with the conventional method in which a print format is converted immediately before the processing of a document, the print processing system of this embodiment makes it possible to reduce idle time of a printer and improve print throughput.

Further, while a received job is stored in a spool queue or a printer queue, a job including a document which needs the conversion of a print format is retrieved when the conversion unit becomes enabled, and the document included in the job is converted. In parallel with this, when the conversion processing section becomes enabled, a job including a document which needs the conversion of a print format is retrieved in the printer queue, and the document included in the job is converted. Therefore, when a job including a document which needs conversion is fetched from the head of the printer queue for print processing, there is an increased possibility that the conversion of the document has previously been completed. Hence, the idle time of the printer can be reduced to a much greater extent, and therefore the print throughput can be improved further.

Not only jobs stored in the spool queue are retrieved, but also jobs are retrieved while they are stored in the printer queue after having moved from the printer queue from the spool queue. For this reason, particularly in the case of a one-job multidocument, throughput is considerably improved.

A print processing device according to a fourth embodiment of the present invention will be described with reference to FIGS. 26 to 33. This embodiment is directed to solve problems such as a long period of standby time which likely occurs as a result of a receiving failure, or the occupation of a printer for a long period of time when a before-complete attribute or an after-complete attribute is specified at the time of scheduling a one-job multidocument.

Figure 27:
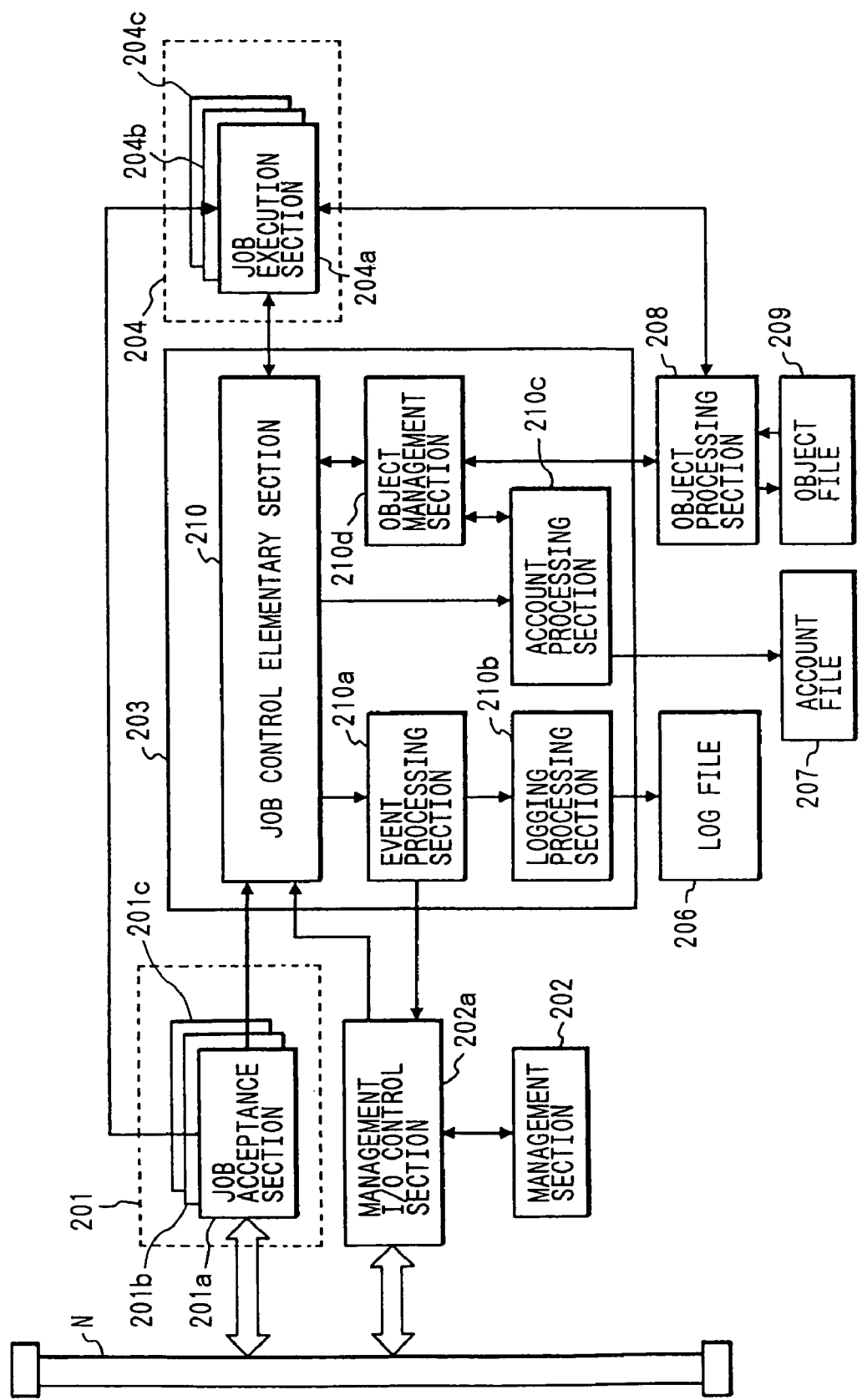
FIG. 27 is a block diagram showing one example of the configuration of a print processing device of the fourth embodiment.

FIG. 27 is a block diagram showing one example of the configuration of the print processing device of the fourth embodiment of the present invention.

In FIG. 27, the print processing device is made up of a job acceptance section 201, a management section 202, a management I/O control section 202a, a job control section 203, a job execution section 204, a log file 206, an account file 207, an object processing section 208, and an object file 209.

The job control section 203 has a job control elementary section 210, an event processing section 210a, a logging processing section 210b, an accounting processing section 210c, and an object management section 210d.

The job acceptance section 201 accepts a job input from a client workstation through a network N and unifies various types of format of received jobs into a job format defined by this print processing device. The job acceptance section 201 then feeds this unified format to the job control elementary section 210 of the job control section 203. Several types of job acceptance sections are prepared as the job acceptance section 201 so that they can cope with several protocols employed in several types of client workstation. In the illustrated example, there are three types of job acceptances 201a, 201b, and 201c. Each job acceptance section 201 has its own spool and holds document data of a printed document included in a received job.

The management section 202 accepts operation delivered from the system manager and issues a request for management control processing to the job control section 203 through the management I/O control section 202a which is an interface. The management I/O control section 202a is also connected to the network N, and it is also possible for the client to issue a request for the acquisition of necessary information, for example, printing completion to the management I/O control section.

The job control section 203 receives a print processing job from the job acceptance section 201 and analyzes the contents of the job. The job control section issues a request for the execution of that job to the job execution section 204. The job control section 203 also receives a control request for management from the management section 202 through the management I/O control section 202a and executes processing corresponding to the contents of the request.

The job execution section 204 is a printer to execute a job such as printing or a converter which executes a job for converting the format of the print document, with respect to which the client issued a print request, to a page description language supported by the printer, for example, PostScript. Accordingly, an execution instruction is not necessarily issued once to the job execution section 204 from the job control section 203 depending on the contents of the job. The execution instruction is repeatedly issued a necessary number of times. A device which executes the job may be a various types of printer or converter. In the illustrated embodiment, as one example, three job execution sections 204a, 204b, and 204c are shown.

The event processing section 210a issues an acknowledgement to the management section 202 via the management I/O control section 202a with respect to various types of event such as the completion of a job and the cancellation of a job issued from the job control section 203. The history of issue of various event is written into the log file 206 through the logging processing section 210b. The accounting processing section 210c collects setting formation relating to jobs such as what kind of function was utilized. Account information relating to, for example, the number of pages of a printed document requested through the object management section 210d and the object processing section 208 is collected from the object file 209, and the thus collected information is written into the account file 207.

The object management section 210d manages jobs accepted by the job acceptance section 201 as one object. The object management section 210d writes attribute information relating to a job requested by the client into the object file 209 using the object processing section 208, and reads information of a necessary object from the object file 209 through the object processing section 208 as needed. When the job execution section 204, which is a printer, fetches document data of a print document from the spool of the job acceptance section 201 to print the document, the object processing section 208 also reads document attribute, such as the location of document data and paper size on which the data are printed, from the object file 209 and sends that document attribute to the job execution section 204.

Figure 28:
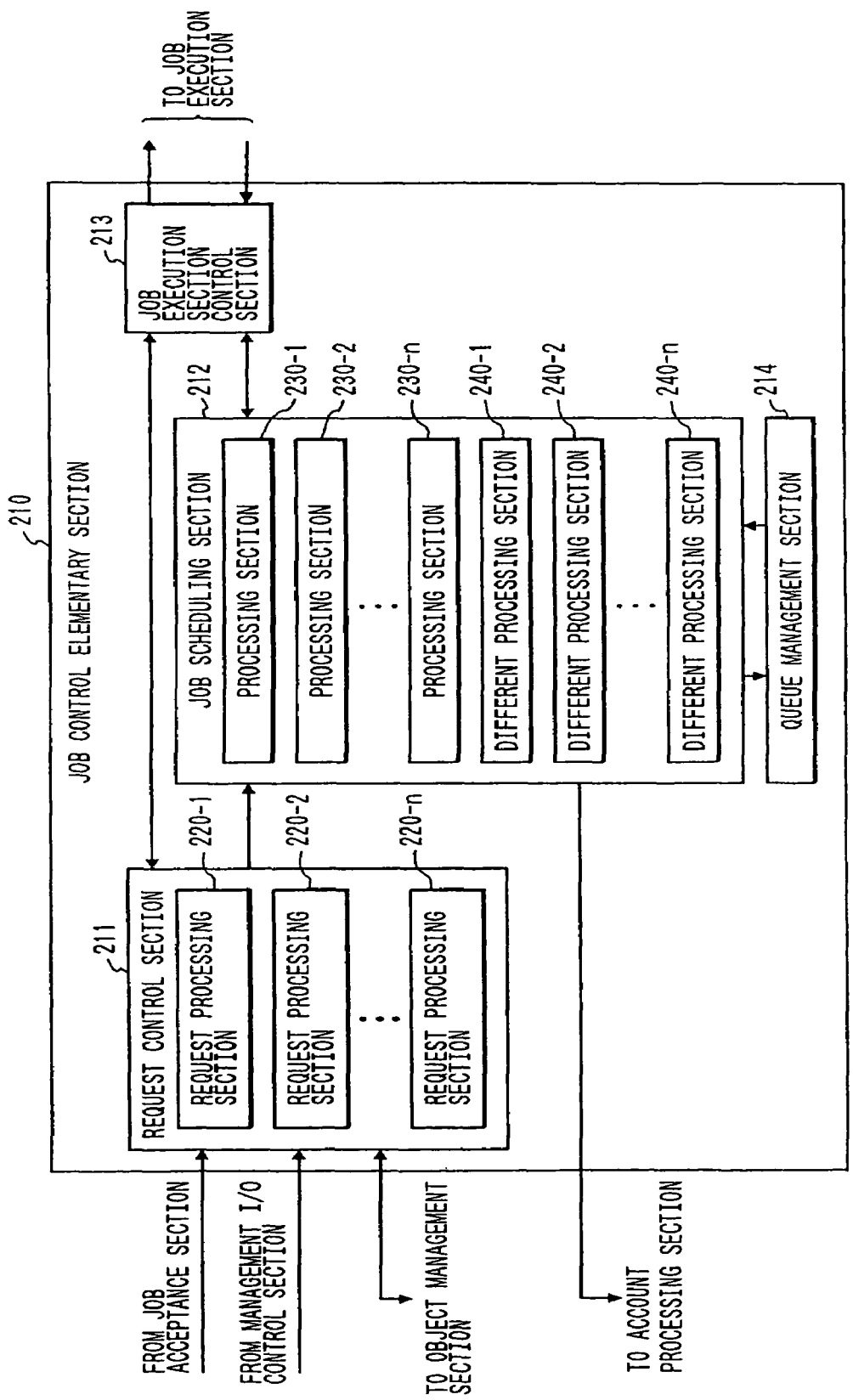
FIG. 28 is a block diagram showing one example of a job control elementary section in the fourth embodiment.

FIG. 28 is a block diagram showing one example of the configuration of the job control elementary section 210.

In FIG. 28, the job control elementary section 210 is further provided with a request control section 211, a job scheduling section 212, a job execution section control section 213, and a queuing management section 214. The request control section 211 executes processing between the request control section 211 and the job acceptance section 201, between the request control section 211 and the management section 202 through the management I/O control section 202a, and between the request control section 211 and the object management section 210d. The job execution section control section 213 executes processing between the job execution section control section 213 and the job execution section 204.

The request control section 211 accepts a job request from the job acceptance section 201 and analyzes the job request. If the job request is recognized as job information, the request control section 211 issues a request for the generation of job information to the object management section 210d. Based on the thus generated information, the request control section issues a request for scheduling to the job scheduling section 212. Further, the request control section 211 transfers a request from the management section 202 which is irrelevant to the job, for example, the interruption of a printer, to the job execution section control section 213, and sends back response from the job execution section 204 which is received from the job execution section control section 213 to the management section 202.

The job scheduling section 212 fetches a corresponding job and an object of the associated job execution section 204 from the object management section 210d. The job scheduling section 212 schedules the job, and carries out the queuing of the job, such as the preparation of a specialized queue corresponding to each of the job execution sections 204, using the queue management section 214. The job scheduling section 212 issues a job processing request to the job execution section 204 through the job execution section control section 213. The queue management section 214 queues the job in compliance with an instruction from the job scheduling section 212, and sends information necessary for accounting processing to the accounting processing section 210c.

Corresponding to the acceptance of the jobs, the request control section 211 generates a plurality of request processing sections 220-1, 220-2, ... 220-n. Similarly, the job scheduling section 212 generates a plurality of processing sections 230-1, 230-2, ... 230-n which carry out processing in response to a request from the request control section 211 and a plurality of different processing sections 240-1, 240-2, ... 240-n which carry out processing with respect to the job execution section control section 213. The processing is efficiently carried out in a parallel manner.

Figure 26:
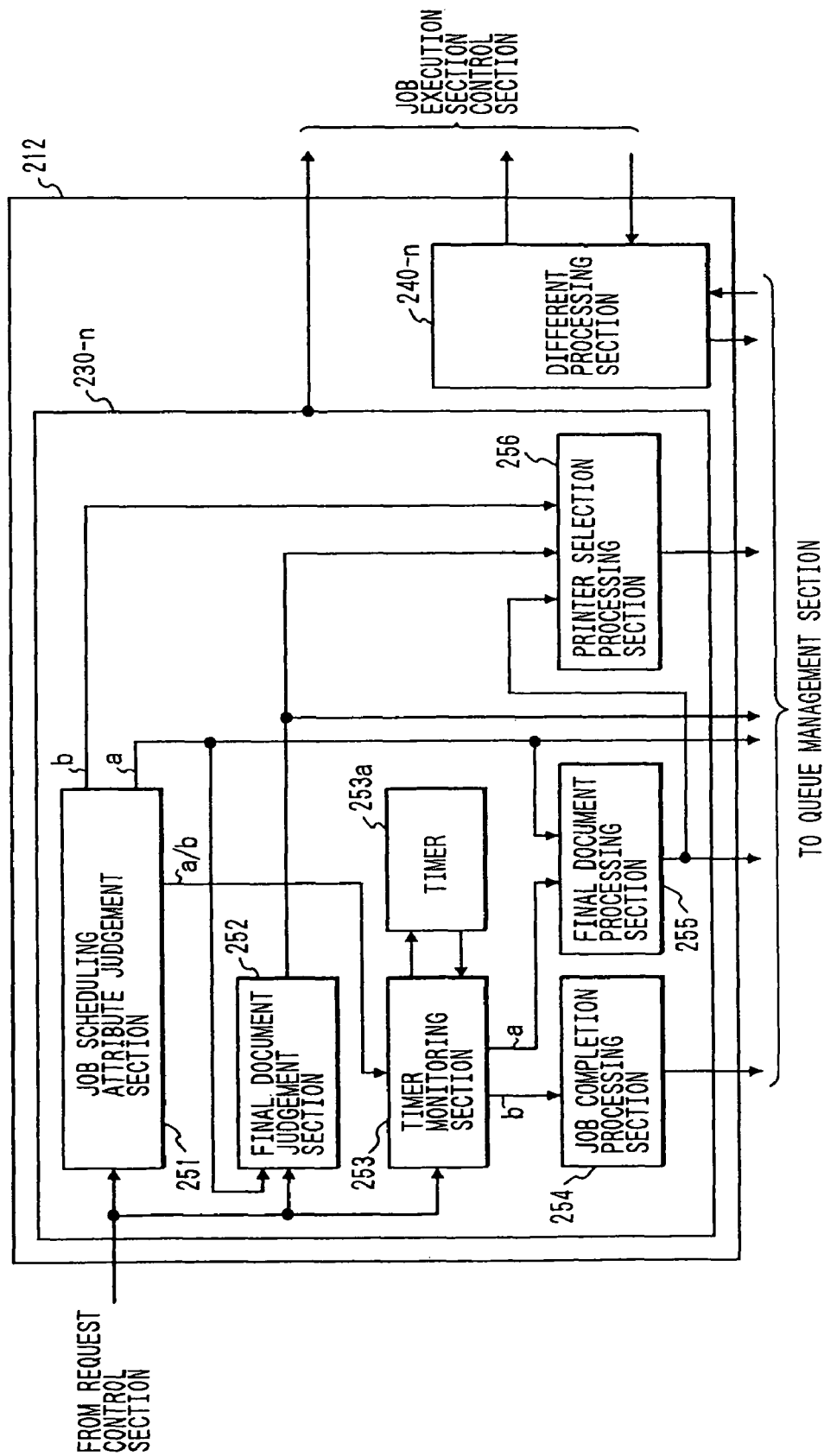
FIG. 26 is a functional block diagram showing one example of configuration of a job scheduling section used in a fourth embodiment of the present invention.

FIG. 26 is a functional block diagram showing one example of the configuration of the job scheduling section.

FIG. 26 only shows, as representative examples, a processing section 230-n and a different processing section 240-n which are generated corresponding to the acceptance of, for example, an Nth job. The processing section 230-n is provided with a scheduling attribute judgment section 251, a final document judgment section 252, a timer monitoring section 253 and a timer 253a, a job completion processing section 254, a final document processing section 255, and a printer selection processing section 256.

The scheduling attribute judgment section 251 judges whether the processing mode instructed by the client is after-complete processing or before-complete processing. Depending on the result of this judgment, in the case of the after-complete processing, the printer selection processing section 256 selects a printer after all of print documents relating to this job have been completely received, namely, after the final document judgment section 252 has judged a received print document as the final document. In the case of the before-complete processing, the printer selection processing section 256 immediately selects a printer upon receipt of the first print document.

The timer monitoring section 253 monitors a series of print documents delivered from the client and also monitors whether or not the next print document was received within a predetermined period of time. Although a plurality of print documents are delivered from the client for one job, the present print processing device is designed to receive the next document after having confirmed that one document was properly received. For example, if the print processing device became impossible to receive the next document because of a network failure, the print processing device will have to wait to receive the next document in an unlimited manner. To prevent this, if a predetermined period of time lapsed after the receipt of a document has been checked and if the next document was not received after the timer 253a has timed out, the final document processing section 255 deals a previously received document as the final document of this job in the case of the after-complete processing, whereas the job completion processing section 254 terminates the job by dealing the previously received document as the end of the job in the case of the before-complete processing. When a document is normally received, the timer 253a is set at the moment. If the next document is received within a predetermined period of time after the receipt of the previous document, that is, before the timer 253a timed out, the timer 253a will be reset, and therefore normal processing corresponding to the schedule attribute is carried out.

When executing a received job, the different processing section 240-n sends, back to the job execution section 204, information relating to the order of jobs queued in the queue management section 214 and print documents corresponding to the request from the job execution section 204.

Figure 29:
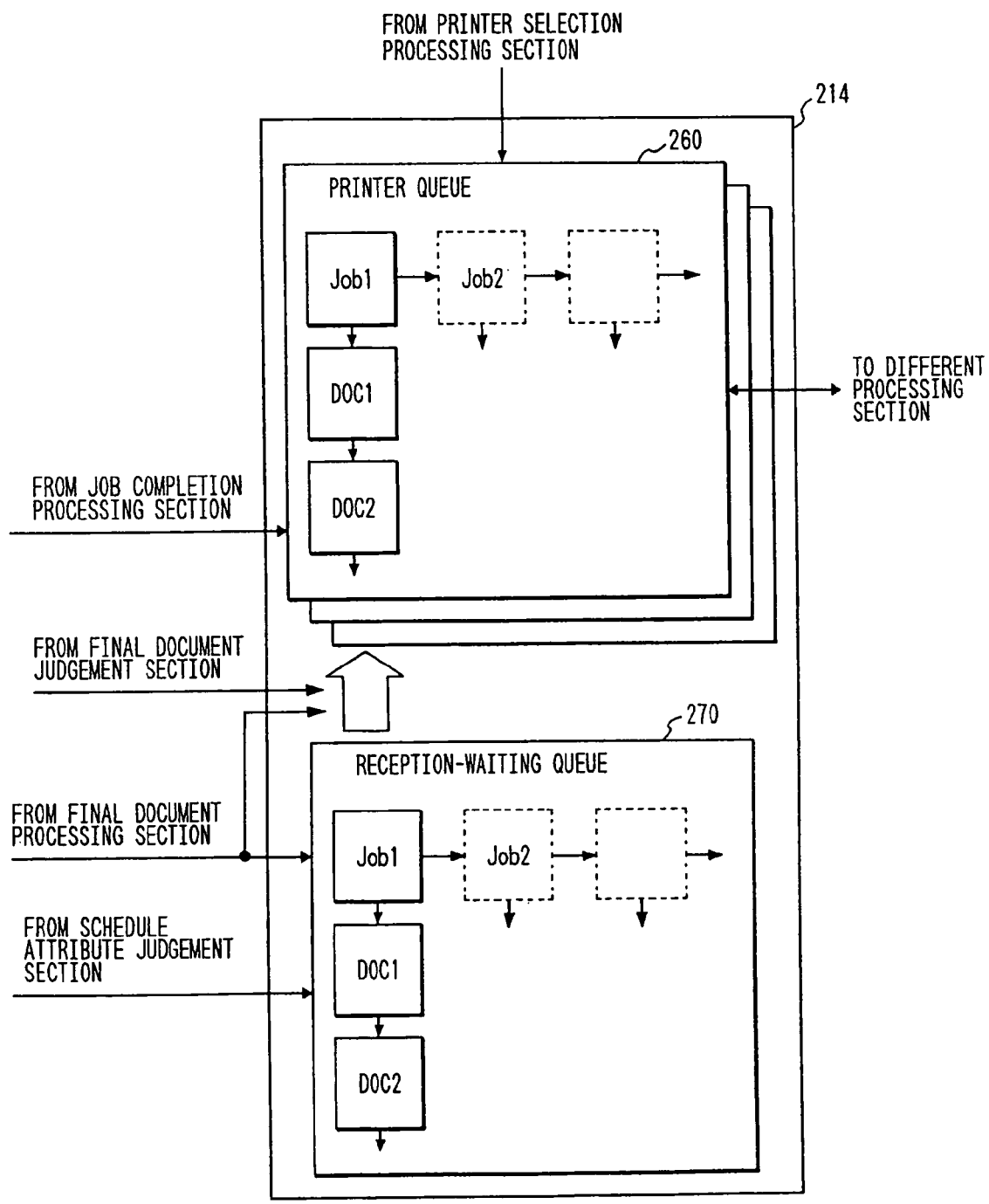
FIG. 29 is a block diagram showing one example of a queuing management section in the fourth embodiment.

FIG. 29 is a block diagram showing one example of the queue management section.

The queue management section 214 has a printer queue 260 and a reception-waiting queue 270. The printer queue 260 is prepared for each printer. The printer queue 260 and the receipt-waiting queue 270 have the same structure. If a certain job processing request is received, a job block Job 1 and a document block DOC 1 will be placed in the printer queue 260. If the next document is received, a document block DOC 2 will be positioned below the document block DOC 1. If the next job processing request is received, a job block Job 2 will be placed subsequent to the job block Job 1. In the case of the before-complete processing, the document is directly queued in the printer queue 260. On the other hand, in the case of the after-complete processing, the document is first queued in the reception-waiting queue 270, and the document is moved to the printer queue 260 if the document is judged as the final document. Then, the job, that is, printing is executed. If it is judged that the job was completed, the leading job block and all of the other document blocks linked to the leading job block will be removed from the printer queue 260.

FIGS. 30a to 30c show one example of a data structure of a document print request.

As shown in FIG. 30a, data 280 delivered from the client is made up of a job attribute 281 which serves as a header of the data, and a number of document data items (n) 282-1, 282-2, . . . 282-n which serve as a data portion of the data. A document attribute is added to substance of each of the document data items 282-2, 282-2, . . . 282-n.

As shown in FIGS. 30b and 30c, the data 280 received by the print processing device is divided into an attribute data item 280a and a document data item 280b. The document data item 280b is stored in the spool of the job acceptance section 201, whilst the attribute data item 280a is stored in the object file 209 after a file path name of a spool of each document data has been added to it.

One example of the job attribute comprises:
a job name "job-name";
a client of a job "job-owner" "user-name";
a printer name which the user wants to use "printer-name-requested"; and
a schedule attribute "job-scheduling".

The schedule attribute can be designated as either the after-complete processing or the before-complete processing. Further, the schedule attribute can be designated so as to follow the schedule attribute specified by the print processing device.

The document attribute comprises:
the description of a document "document-description";
the designation of a page description language "document-format";
the designation of an output bin "output-bin-name";
the designation of paper size "media-used";
the designation of a paper feeder "feeder-used"; and
the designation of single/double-sided printing "sides".

These attribute elements can be specified for each document.

For the data 280 sent from the client, since there a plurality of document data items in the data portion of the data 280, it can be understood that print requests for a plurality of documents must be processed as one job.

The processing of the job scheduling section 212 when a print request was properly accepted from the client without a failure will be described.

Figure 31:
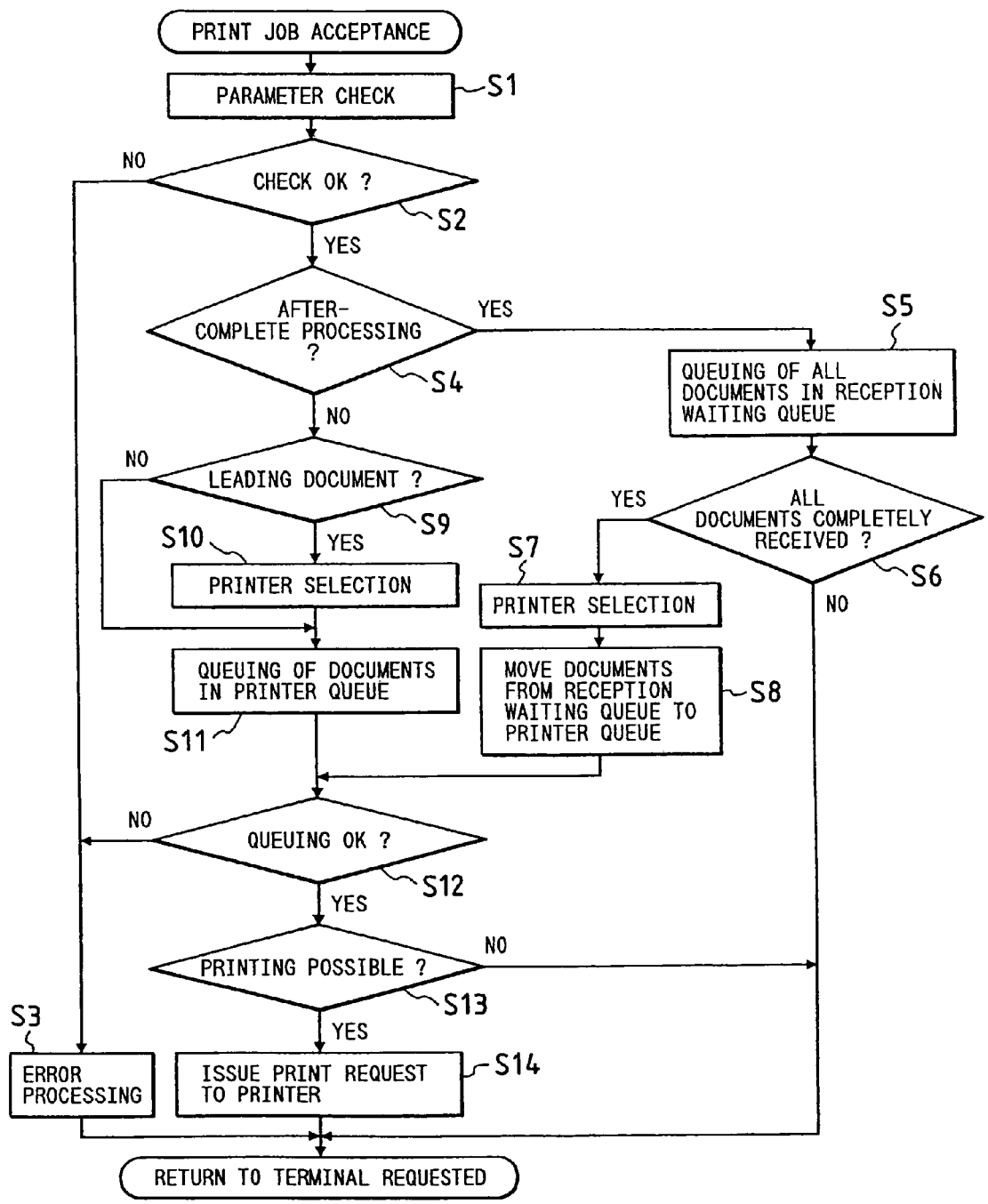
FIG. 31 is a flowchart showing the flow of processing of a job scheduling section in the fourth embodiment.

FIG. 31 is a flowchart showing the flow of the processing of the job scheduling section.

This flowchart shows processing carried out when a print request is normally received without any failures during timeout monitoring practiced by the time monitoring section 253 between received documents.

When the request control section 211 accepted a job, it is checked whether or not the attributes, i.e., parameters of the job and a document of that job are valid before the job is processed by the job scheduling section 212 (step S1). Subsequently, it is checked whether or not the check is valid (step S2). If it is judged that the job includes invalid parameters, the processing will proceed to error processing (step S3).

The schedule attribute judgement section 251 judges whether the scheduling attribute is the after-complete processing or the before-complete processing (step S4). If the scheduling attribute is judged as the after-complete processing, the job scheduling section 212 queues the received document in the reception-waiting queue 270 of the queue management section 214 (step S5). Then, the final document judgement section 252 judges whether or not the received document is the final document and all documents have been received (step S6). If all documents were not received yet, the final document judgement section waits for the reception of the next document. If the reception of the document has been completed, the processing proceeds to the selection of a printer by the printer selection processing section 256 (step S7). The document is moved from the reception-waiting queue 270 to the printer queue 260 (step S8).

If the scheduling attribute is judged as the before-complete processing as a result of the judgment in step S4, it is checked whether or not the received document is the leading document (step S9). If the received document is the leading document, the printer selection processing section 256 selects a printer (step S10). If the received document is not the leading document, printer selection is omitted because the printer has already been selected, and the document is queued in the printer queue 260 (step S11).

It is then checked whether or not the queuing of the document has properly been performed (step S12), and it is also checked whether or not the selected printer is ready for printing (step S13). If the printer is read for printing, a print request is issued to the printer by way of the job execution section control section 213 (step S14). On the other hand, if the printer is occupied and disenabled, the processing enters a standby state until the printer becomes enabled.

Figure 32:
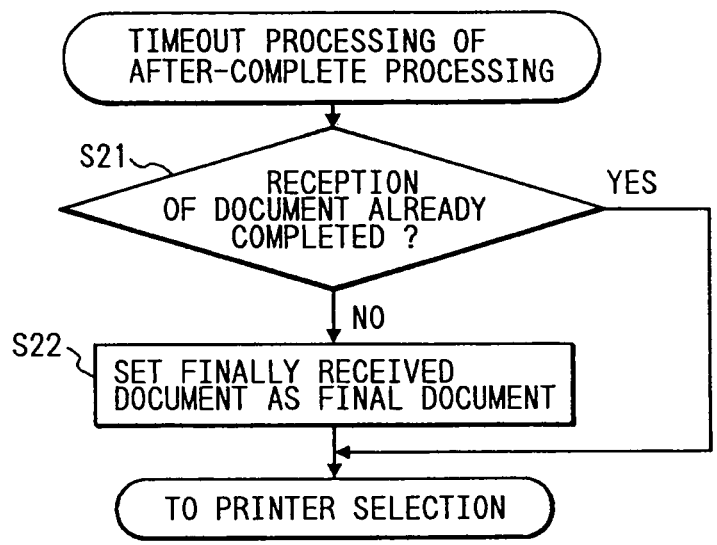
FIG. 32 is a flowchart showing the flow of timeout processing at the time of after-complete processing in the fourth embodiment.

FIG. 32 is a flowchart showing the flow of timeout processing in the case of the after-complete processing.

According to this flowchart, if a receiving failure arises during timeout monitoring practiced between received documents, it is checked whether or not the accepted job has the attribute of after-complete processing. The final document judgement section 252 judges whether or not a document received before the occurrence of the receiving failure is the final document, that is, whether or not all of the documents have already been received (step S21). If all of the documents have already been received, the processing proceeds to the selection of a printer. If it is judged that some documents are not received yet in step S21, the final document processing section 255 sets the finally received document queued in the reception-waiting queue 270 to the final document of this job, namely, the final document processing section sets final document information with respect to the finally received document (step S22), and the processing proceeds to the selection of a printer.

Figure 33:
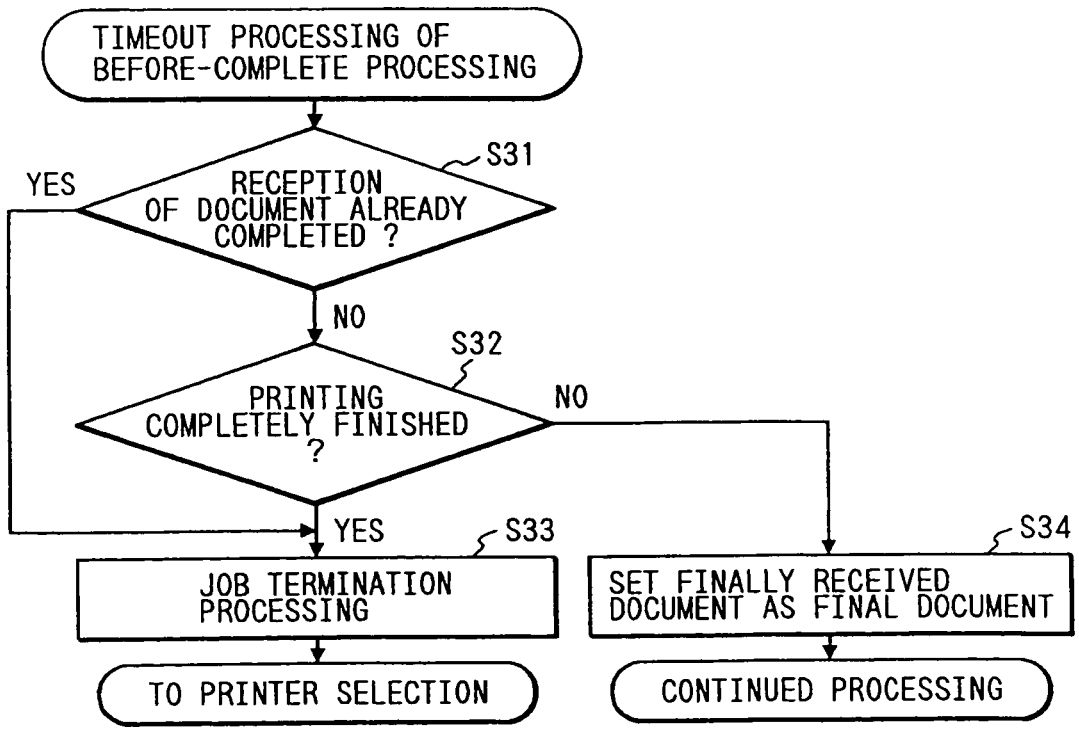
FIG. 33 is a flowchart showing the flow of timeout processing at the time of before-complete processing in the fourth embodiment.

FIG. 33 is a flowchart showing the flow of timeout processing at the time of before-complete processing.

If a receiving failure arises during timeout monitoring practiced between received documents, the schedule attribute judgment section 251 checks that the received job has the attribute of before-complete processing. To begin with, it is checked whether or not the reception of the job has been completed (step S31). If it is checked that the reception of the job has already been completed, the job will be completed. However, if the reception of the job has not been completed yet, it will be checked whether or not the printing of all documents received by that time has been completed (step S32). If the printing of all the documents has already been completed, the job will be completed. Hence, the job completion processing section 254 carries out the completion processing of the job, that is, removes the leading job block from the printer queue 260 (step S33). In step S32, if it is judged that the printing of all the documents is not completed yet and some documents are waiting for printing, the job completion processing section 254 sets the final document which is queued in the printer queue 260 and is waiting for printing as the final document of this job (step S34), and the processing continues.

As described above, according to the fourth embodiment, even if a part of a document of a job is not received due to a receiving failure, the after-complete processing will be forcibly started, and the before-complete processing will be forcibly terminated. Hence, it becomes possible to eliminate a long period of idle time of a printer and prevent a printer from being occupied for a long period of time.

With reference to FIGS. 34 to 41, a job processing execution system according to a fifth embodiment of the present invention will now be described. The job processing execution system of the fifth embodiment is directed to smoothly effect the pausing and resumption of a job by moving a job from a printer queue to a pause queue when a job pause request is issued, and by returning the job from the pause queue to the printer queue when a resumption request is issued later.

In this embodiment, an explanation will be given of the case where the present invention is applied to a job processing execution system capable of printing a job using a plurality of job execution sections.

Figure 35:
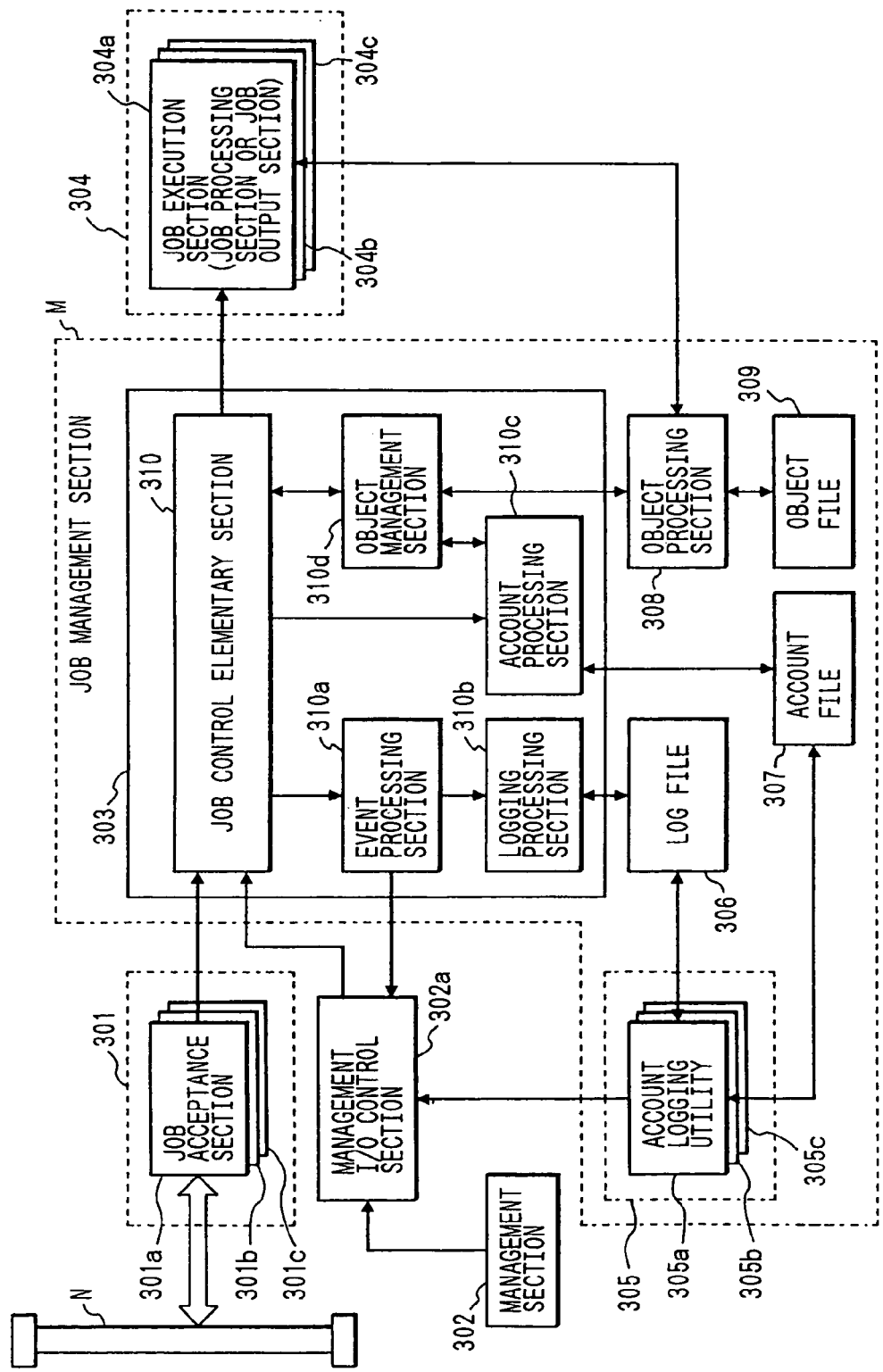
FIG. 35 is a schematic representation showing the configuration of a job processing system of the fifth embodiment.

FIG. 35 is a block diagram showing the configuration of the job processing execution system used in this embodiment.

As shown in FIG. 35, this job processing execution system is made up of a plurality of job acceptance sections 301a to 301c connected to the network N, a management section 302, a management I/O control section 302a, a job control section 303, a plurality of job execution sections 304a to 304c, account logging utilities 305a to 305c, a log file 306, an accounting file 307, an object processing section 308, and an object file 309. Hereinafter, the plurality of job acceptance sections 301a to 301c and the plurality of job execution sections 304a to 304c are collectively designated as a job acceptance section 301 and a job execution section 304.

The job acceptance section 301 accepts a job input through the network, and feeds the job to a job control elementary section 310 of the job control section 303 after having normalized the job. Here, normalization is to unify various types of formats of received jobs into a job format defined by this system. In FIG. 35, the job acceptance section comprising the three job acceptance sections 301a to 301c is employed in order to show one example of a system comprising a plurality of sections. Further, the job acceptance section comprising the plurality of acceptance sections is employed to allow the system to cope with various types of job formats sent through the network.

The management section 302 receives operation from the system manager, and issues a processing request relating to management control to the job control section 303 via the management I/O control section 302a which acts as an interface. In FIG. 35, the management section 302 is connected to the management I/O control section 302a and local terminals. This management section can also be connected to remote terminals using the network N or the like.

The job execution section 304 is either a job processing section or a job output section. The job processing section carries out the conversion of a document format, image processing, processing such as notification, whilst the job output section executes the output of a job, that is, the recording of an output medium, or redirecting of a job. When received a pause instruction from a pausing section 312e which will be described later, the job execution section 304 pauses processing, and writes a document number, a page number, and an instructed number of copies obtained when the job paused as check points into the object file 309. This writing operation is to make it possible to resume the processing of the job from an unprocessed portion thereof upon receipt of a resumption instruction from a resuming section 312f.

The job control section 303 analyzes the contents of a job input from the management section 302 through the job acceptance section 301 or the management I/O control section 302a, and causes the job execution section 304 to execute the processing of that job. This job control section 303 is made up of the job control elementary section 310, an event processing section 310a, a logging processing section 301b, an accounting processing section 310c, and an object processing section 310d.

The job control elementary section 310 is a processing section which executes command processing in response to an input command, scheduling or queuing corresponding to a job processing request, and the issue of a job processing request to the job execution section 304. This job control elementary section 310 effects the pausing and resumption of job processing. The event processing section 310a processes an event occurred in the job control section 303, and notifies the management section 320 of the event through the management I/O control section 302a. The logging processing section 310b stores the contents of processing of the event processing section 310a as a history into the log file 306. The accounting processing section 310c collects account information relating to a job from the object file 309 by way of the object processing section 308 and the object management section 310d, and stores the thus collected information into an account file 7. The object management section 310d reads and writes, various types of object used in the job control section 303, from and into the object file 309 using memory 310e or the object processing section 308.

The detailed configuration of the job control elementary section 310 which carries out the pausing and resumption of job processing will be described.

Figure 34:
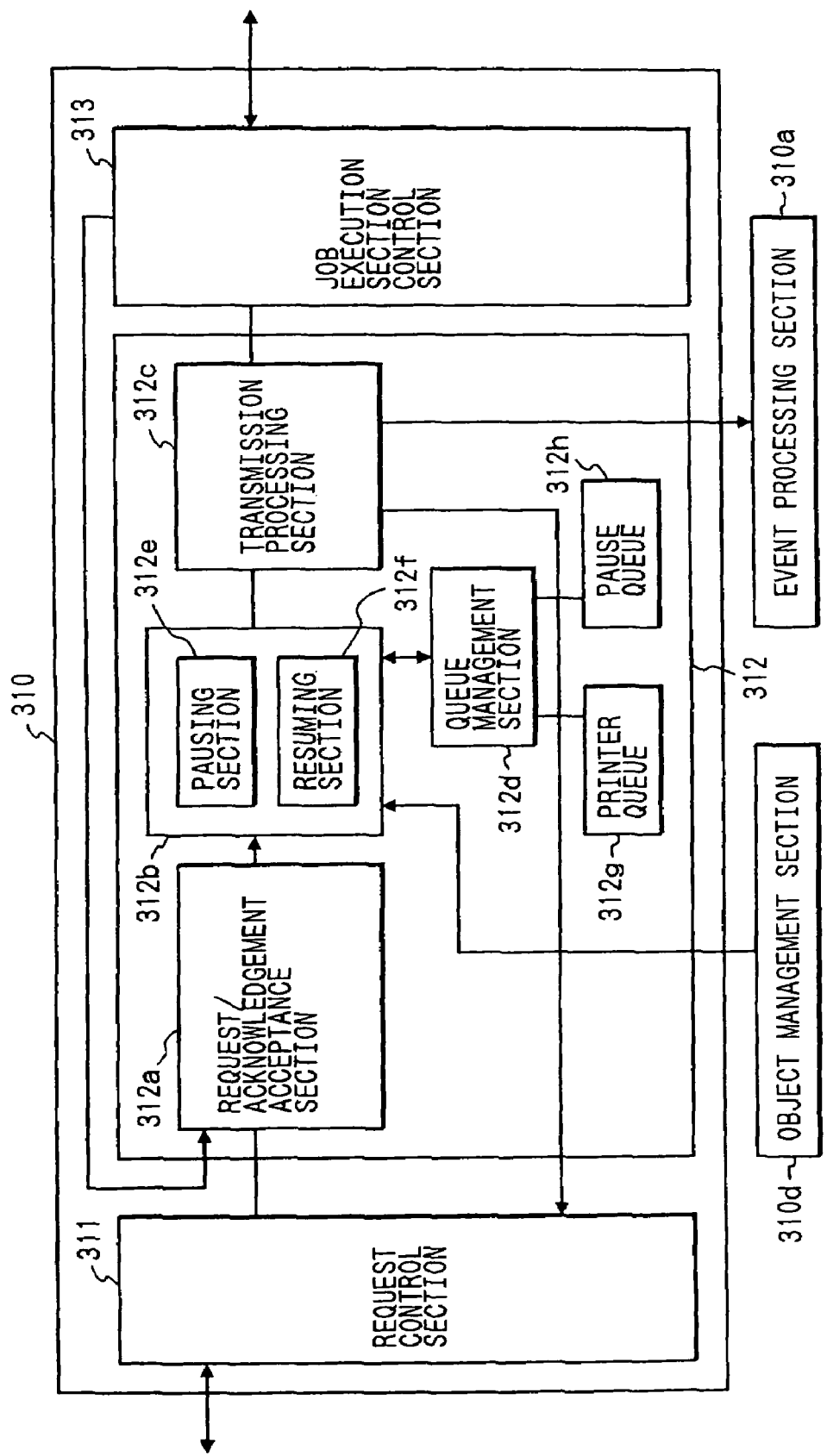
FIG. 34 is a block diagram showing the configuration of a job control elementary section in a fifth embodiment of the present invention.

FIG. 34 is a block diagram showing the detailed configuration of the job control elementary section 310. As shown in FIG. 34, the job control elementary section 310 is made up of a request control section 311, a job scheduling section 312, a job execution section control section 313, and a queue control section 314.

The request control section 311 accepts a job received from the management section 302 via the job acceptance section 301 or the management I/O control section 302a, and prepares a job object using the object management section 310d. The request control section 311 also issues a request for processing to the job scheduling section 312. The job execution section control section 313 transfers a processing request from the request control section 311 or the job scheduling section 312 to the job execution section 304.

When received a job request via the request/acknowledgement acceptance section 312a, the job scheduling section 312 executes the processing of a command by activating a command processing section 3012b corresponding to a command included in the job request. The job scheduling section 312 is a processing section which issues a job execution instruction to the job execution section control section 313 via a transmission processing section 312c, and also executes the queuing of a job using a queue management section 312d. It is possible to make such a job request include a pause command and a resumption command. When the pause command is received, a command processing section (hereinafter referred to as a pausing section 312e) for the pause command is activated. On the other hand, when the resumption command is received, a command processing section (hereinafter referred to as a resuming section 312f) for the resumption command is activated.

The queue management section 312d manages a printer queue 312g and a pause queue 312h. The printer queue 312g is provided corresponding to a printer so as to queue job information of jobs waiting for printing. A job assigned to each printer is queued in a corresponding printer queue. In other words, the printer queue 312g is provided corresponding to physical printers included in the job execution section 313. A pause queue 312h queues jobs paused according to a user's instruction. Jobs held in the pause queue 312h are retained in this queue until a resumption instruction is issued by the user. When the user issues the resumption instruction, the job information will be moved to the assigned printer.

For convenience of explanation, only the printer queue 312g and the pause queue 312h are illustrated in this embodiment. However, it is also possible to use a spool queue for retaining a job until all documents included in that job are accepted, a hold queue for queuing unscheduled jobs which are not subjected to scheduling, a wait queue for queuing jobs which timed out as a result of waiting for a password input, and a terminate queue provided corresponding to printers in order to queue only printed jobs.

The configuration and processing procedures of the pausing section 312e and the resuming section 312f will be described more detail with reference to FIGS. 36 to 39.

Figure 36:
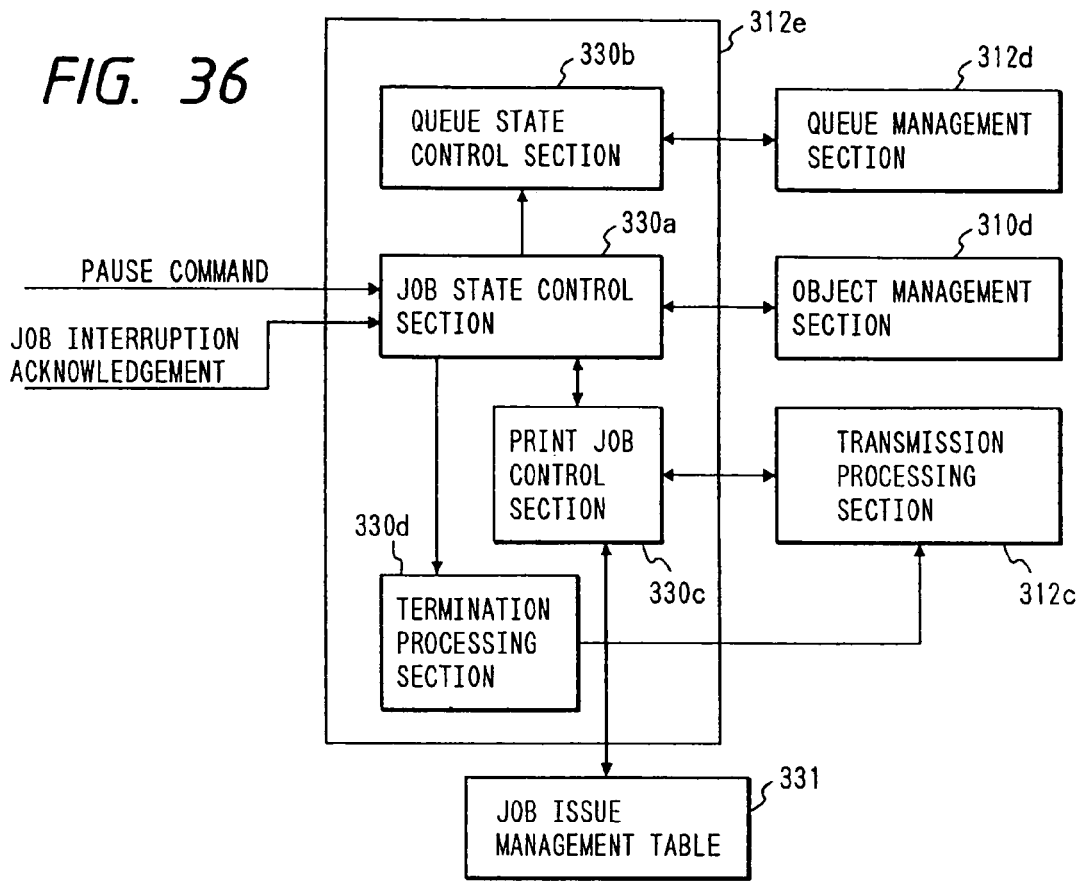
FIG. 36 is a schematic diagram showing the configuration of a pausing section shown in FIG. 34.

FIG. 36 shows the configuration of the pausing section 312e shown in FIG. 34. As shown in FIG. 36, the pausing section 312e is made up of a job state control section 330a, a queue state control section 330b, a printing job control section 330c, and a termination processing section 330d. The pausing section 312e temporarily interrupts a job which is being printed and a job waiting for printing.

The job state control section 330a controls the state of a job and the entire pausing section 312e. Specifically, when a pause command is received, it is checked whether or not the specified job is being printed or waits for printing. Only when the job is being printed, the job state control section 330a issues a printing interruption instruction to the printing job control section 330c. Upon receipt of a job interruption acknowledgement from the job execution section 304, the job state control section 330a carries out the modification of a job status, the issue of an queue status modification instruction to the queue state control section 330b, and the issue of a completion instruction to the completion processing section 330d. When the modification of the states of a job and a queue has been completed, the job state control section 330a prepares recovery information and affords the thus prepared recovery information to the completion processing section 330d. This recovery information includes the check points which the job execution section 304 wrote into the object file 309. The queue state control section 330b carries out the modification of the state of the queue associated with the pausing of the job. Specifically, the queue state control section 330b moves the job from the printer queue 312g to the pause queue 312h in response to the modification instruction from the job state control section 330a.

Upon receipt of a job interruption instruction from the job state control section 330a, the print job control section 330c issues an instruction for the interruption of job processing to the job execution section 304 via the transmission processing section 312c. When issuing an interruption instruction to the job execution section 4, the printing job control section 330c issues that instruction based on conditions of the issue of jobs. Specifically, when a one job multidocument is processed, print processing requests for a plurality of documents are issued to the job execution section 304. The order of the issue of these requests is retained in a job issue management table 331, and the documents which issued the print processing requests later are subjected to an interruption instruction prior to other documents. This is intended to avoid the situations in which the documents to which the interruption instruction was issued have already been printed as much as possible, and it is also intended to prevent a subsequent document from proceeding to the next processing phase and from being printed before the next interruption instruction is notified.

The termination processing section 330d notifies a workstation, which issued the pause request, of a processing result showing whether or not the specified job paused.

The use of the pausing section 312e having the previously mentioned configuration allows each job to pause.

The processing procedures of the pausing section 312e will now be described.

Figure 37:
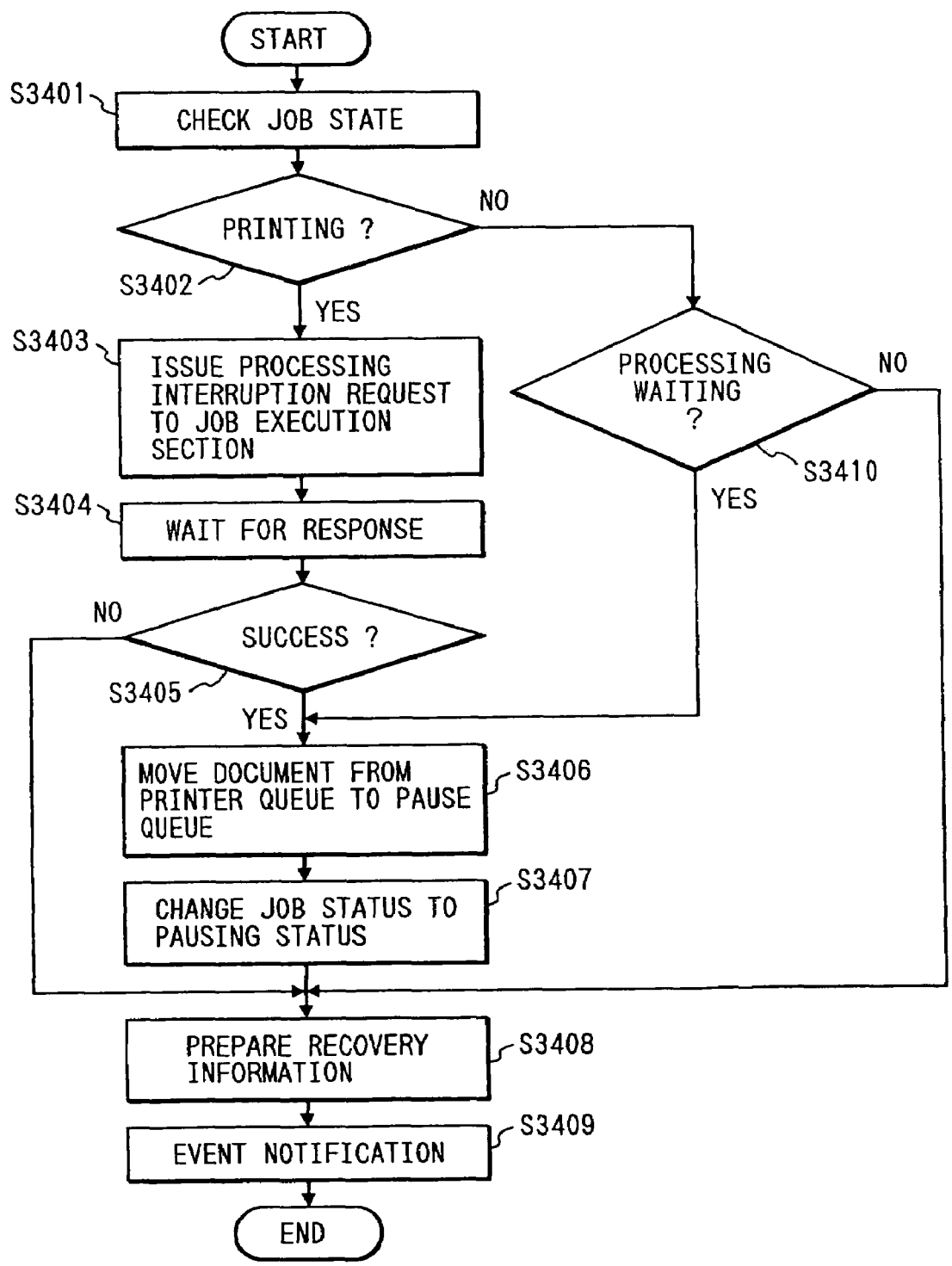
FIG. 37 is a flowchart showing processing procedures carried out by the pausing section shown in FIG. 36.

FIG. 37 is a flowchart showing the processing procedures which the pausing section 312e shown in FIG. 36 executes. As shown in FIG. 37, if the job state control section 330a of the pausing section 312e accepts the pause command, the job state control section 330a checks whether or not the job is being printed or waiting for printing (step S3401). As a result of this, if the job is being printed (step S3402), the printing job control section 330c issues a processing interruption request to the job execution section 304 (step S3403), and waits for response representing whether or not the interruption succeeded (step S3404). When the printing job control section 330c accepts an acknowledgement of a pausing job (step S3405), the queue state control section 350b causes the job to pause (step S3407), as well as moving the job positioned in the printer queue 312g to the pause queue 312h (step 3406). Thereafter, the job state control section 330a fetches the check points from the object file 309, and prepares recovery information which includes the check points and represents the success of the pause (step S3408). The completion processing section 330d notifies the workstation, which issued the pause request, of a success of the pause using an event and terminates the processing (step S3409).

On the other hand, if the printing job control section 330c received response which represents a failure of the pause (step S3405), the processing proceeds to step S3408 and recovery information which represents the pause failure is prepared (step S3408). The workstation which issued that pause request is notified of the failure of the pause by means of an event (step S3409), and the processing is terminated.

If the job is not being printed in step S3402, it is further checked whether or not the job is waiting for printing (step S3410). If the job is waiting for printing, the processing proceeds to step S3406. On the other hand, if the job is not waiting for printing, the processing proceeds to step S3408, and recovery information which represents the failure of the pause is prepared (step S3408). The workstation which issued the pause request is notified of the failure of the pause by means of an event (step S3409), and the processing is terminated.

As a result of execution of a series of the above mentioned processing, it becomes possible to prepare recovery information by temporarily interrupting the processing of a job depending on the state of the job, and modifying the states of a queue and the job.

The configuration of the resuming section 312f will now be described.

Figure 38:
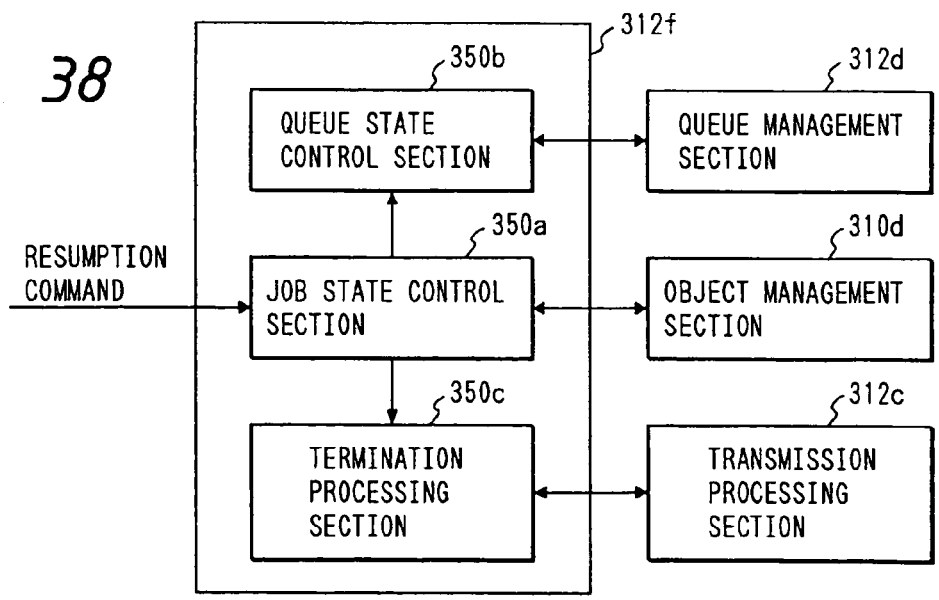
FIG. 38 is a schematic representation showing the configuration of a resuming section shown in FIG. 34.

FIG. 38 is a block diagram showing the configuration of the resuming section 312f shown in FIG. 34. As shown in FIG. 38, the resuming section 312f is made up of a job state control section 350a, a queue state control section 350b, and a termination processing section 350c.

The job state control section 350a controls the state of a job and the overall resuming section 312f. Specifically, when accepted a resumption command, the job state control section 350a checks whether or not check points are provided as parameters of the resumption command. Further, the job state control section 350a provides the attribute of a pausing job with the check points and modifies the state of the job. This job state control section 350a issues a queue state modification instruction to the queue state control section 350b and a termination instruction to the termination processing section 350c.

The queue state control section 350b modifies the state of a queue associated with the resumption of the processing of the job. Specifically, the queue state control section 350b moves the job from the pause queue 312h to the printer queue 312g in response to a modification instruction from the job state control section 350a. The termination processing section 350c notifies the workstation, which issued the resumption request, of the processing result representing whether or not the resumption of the specified job succeeded.

The use of the resuming section 312f having the above mentioned configuration enables the resumption of the pausing job.

When a job of a one-job multidocument is dealt, a check point differing from the check points which were obtained at the time of interruption is set as a parameter for the resumption command. As a result of this, it becomes possible to omit the processing of a specific document included in the one-job multidocument.

The processing procedures of the resuming section 312f will be described.

Figure 39:
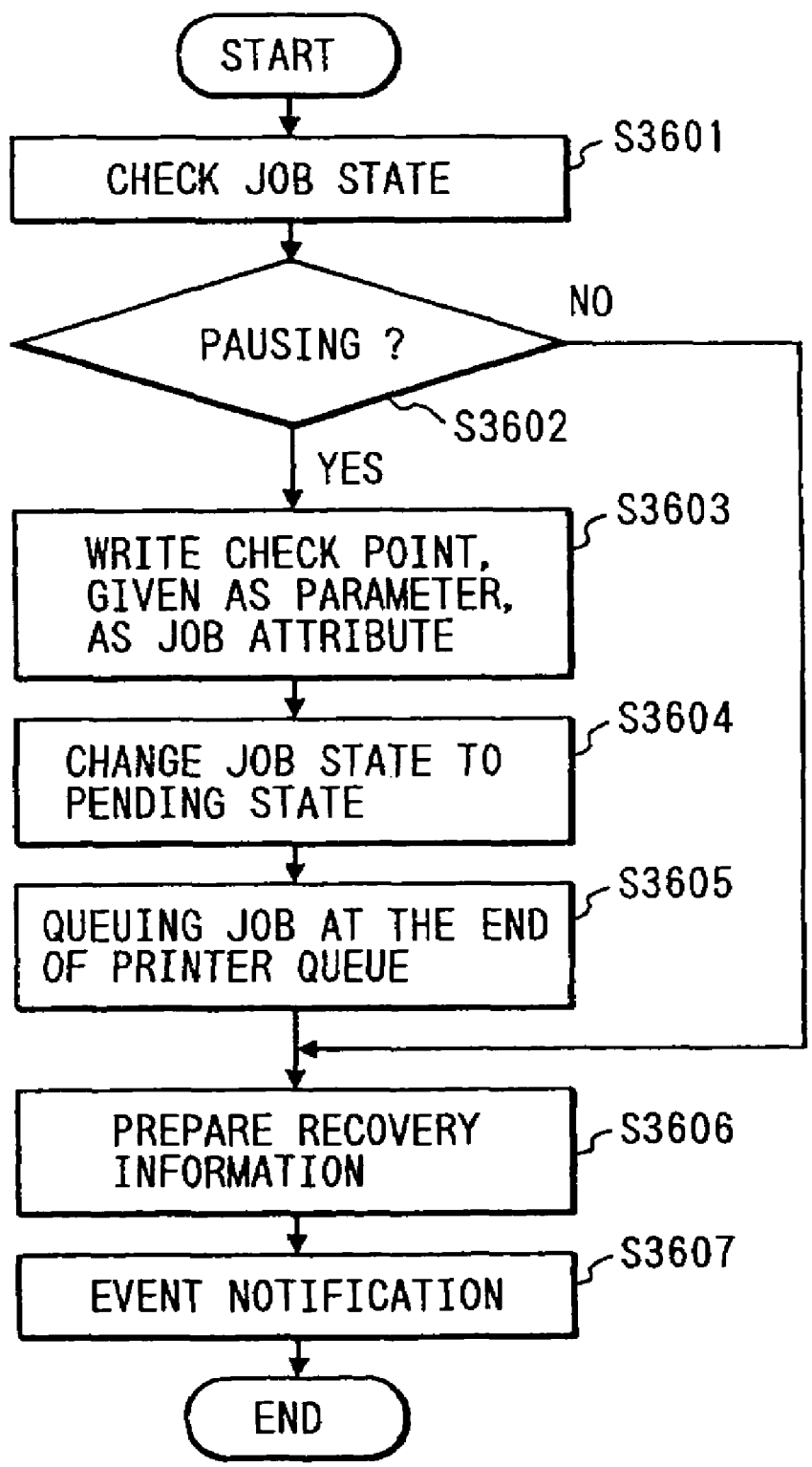
FIG. 39 is a flowchart showing processing procedures executed by the resuming section shown in FIG. 38.

FIG. 39 is a flowchart showing resuming procedures of the resuming section 312f shown in FIG. 38. In this flowchart, the resumption command is provided with a check point as a parameter. As shown in FIG. 39, upon receipt of the resumption command, the job state control section 350a checks whether or not a job to be resumed paused (step S3601). If the job paused (step S3602), the check point provided as the parameter is written into the job as a job attribute (step S3603). The state of the job is rendered in a pending state (step S3604), and the job is queued to the end of the printer queue 312g (step S3605). Thereafter, the job state control section 350a prepares recovery information which represents success when the resumption succeeded or an error when the job did not pause (step S3606). The termination processing section 350c notifies the workstation, which issued the resumption request, of the result of the resumption by means of an event (step S3607), and the processing is terminated.

As a result of execution of a series of the previously mentioned processing, it becomes possible to resume the pausing job by the pause command. Although the job is queued to the end of the printer queue 312g when the job is resumed in the to above processing procedures, the job can be queued to an arbitrary position in the printer queue 312g.

A specific example of the states of the printer queue 312g and the pause queue 312h associated with the previously mentioned pausing and resuming processing will be described.

Figure 40A:
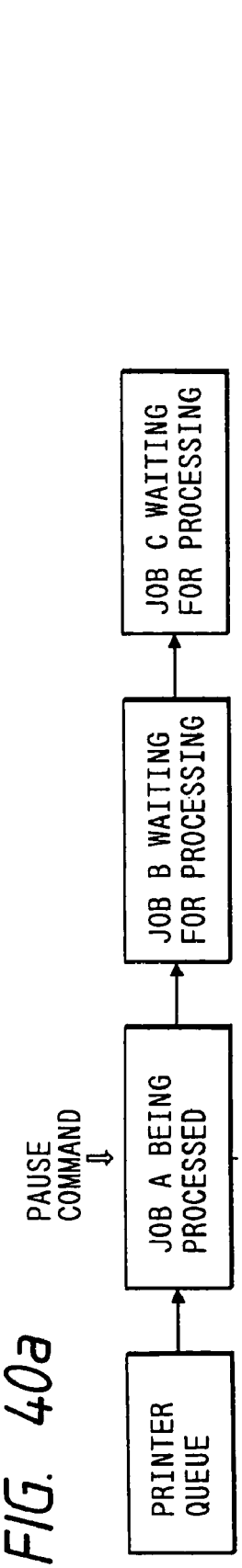
FIGS. 40a to 40c are schematic representations showing one example of the states of a printer queue and a pause queue when pausing processing and resuming processing are executed in the fifth embodiment.
Figure 40B:
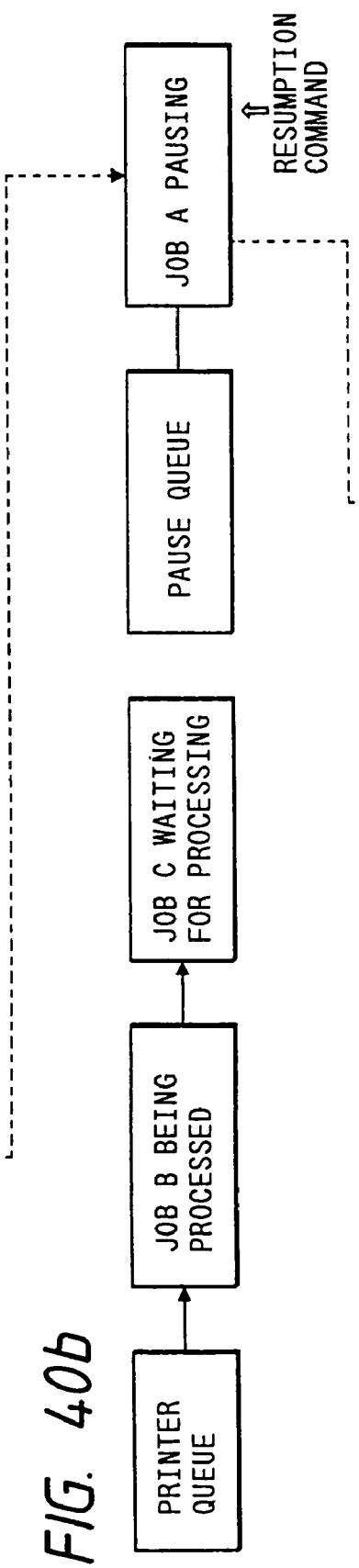
Figure 40C:
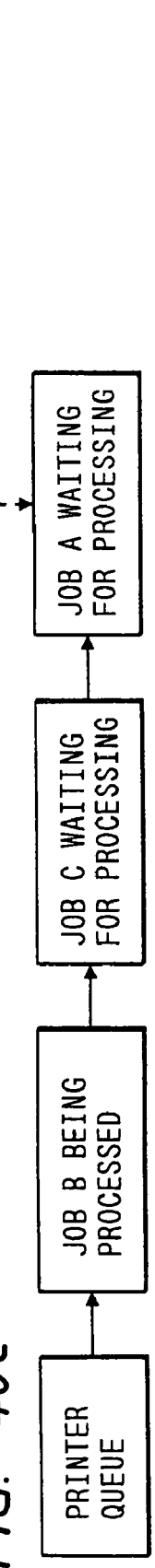

FIGS. 40a to 40c show one example of the states of the printer queue 312g and the pause queue 312h when pausing and resuming processing are carried out. In this illustrative embodiment, an explanation will be given of the pause and resumption of a job A which is being processed based on the assumption that jobs A, B, and C are originally included in the printer queue 312g.

As shown in FIG. 40a, on the assumption that the printer queue 312g retains the job A (which is being processed) and pending jobs B and C, when the pause command is issued with respect to the job A, the job A is passed to the pause queue 312h as shown in FIG. 40b, and the printer queue 312g starts to process the next job B. When a resumption command is issued in this state, the pausing job A retained in the pause queue 312h is queued to the end of the printer queue 312g, as shown in FIG. 40c. In this way, the pausing job is moved between the printer queue 312g and the pause queue 312h, whereby it becomes possible to cause each job to pause or resume.

A processing sequence mutually executed between the job scheduling section 312 and the job execution section 304 will be described.

Figure 41:
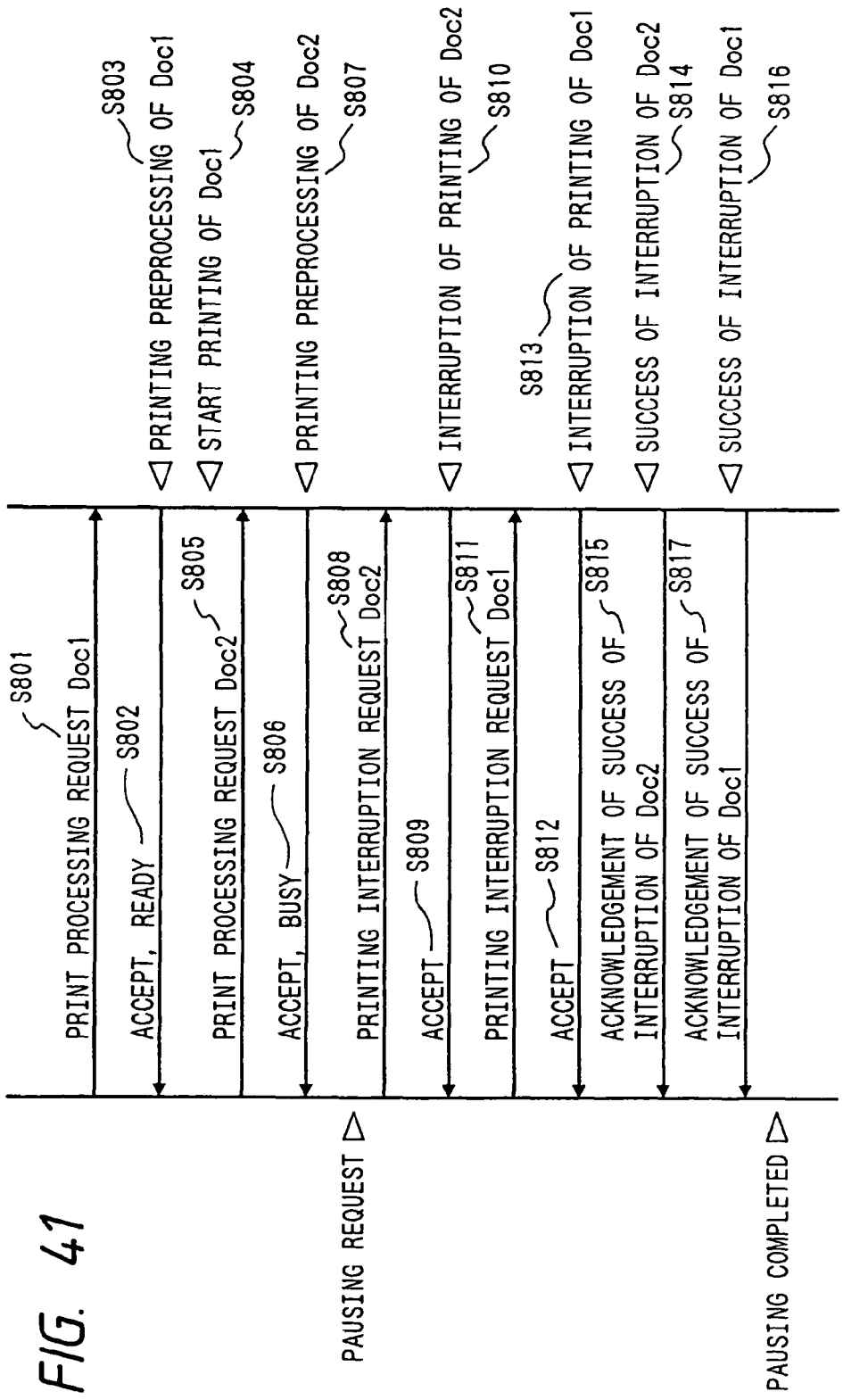
FIG. 41 is a view showing a processing sequence between the job scheduling section and the job execution section shown in FIG. 34.

FIG. 41 is a schematic representation showing a processing sequence executed between the job scheduling section 312 and the job execution section 304. Hereinbelow, an explanation will be given of the processing of a one-job multidocument in which a job consists of a document 1 (hereinafter referred to as Doc 1) and a document 2 (hereinafter referred to as Doc 2).

As shown in FIG. 41, when the job scheduling section 312 issues a request for printing Doc 1 to the job execution section 304 (step S801), the job execution section 304 sends back an acceptance acknowledgement, representing the acceptance of the request together with a ready acknowledgement, representing that it can accept the print processing request, to the job scheduling section 312 (step S802). The printing preprocessing of Doc 1 is carried out (step S803), and the printing of Doc 1 is then started after the preprocessing has been completed (step S804).

Thereafter, when the job scheduling section 312 issues a request for printing Doc 2 to the job execution section (step S805), the job execution section 304 sends back the acceptance acknowledgement together with a busy acknowledgement which represents that it cannot accept a print request to the job scheduling section 312 (step S806). The printing preprocessing of Doc 2 is started (step S807).

If the job scheduling section 312 accepted the pause command, the job scheduling section recognizes that it should issue a printing interruption request for the documents in the order of Doc 2 and Doc 1 upon reference to the job issue management table 331.

When the job scheduling section 312 issues the printing interruption request for Doc 2 toward the job execution section 304 (step S808), the job execution section 304 sends the acceptance acknowledgement back to the job scheduling section 312 (step S809) and interrupts the printing preprocessing of Doc 2 (step S810).

The job scheduling section 312 which received the acceptance acknowledgement issues-a printing interruption request for Doc 1 toward the job execution section 304 (step S811). In response to this, the job execution section 304 sends an acceptance acknowledgement back to the job scheduling section 312 (step S812), and terminates the printing of Doc 1.

Upon recognition of the success of the interruption of Doc 2 (step S814), the job execution section 304 notifies the job scheduling section 312 of the success of the interruption of Doc 2 (step S815). Further, upon recognition of the success of the interruption of Doc 1 (step S816), the job execution section 304 notifies the job scheduling section 312 of the success of the interruption of Doc 1 (step S517).

Through the above mentioned processing sequence, the job scheduling sequence 312 can confirm that Doc 1 and Doc 2 included in the job paused.

As has been described above, in this, embodiment, the pausing section 312e moves a job stored in the printer queue 312g from the printer queue 312g to the pause queue 312h in response to the pause command for that job. Further, the resuming section 312h moves the job stored in the pause queue 312h to the printer queue 312g in response to a resumption command for that job. The job execution section 304 sequentially executes jobs stored in the printer queue 312g. Such a configuration results in the following advantages:

1) It becomes possible to easily change the attribute of a job retained in the printer queue 312g.

2) It becomes possible to improve the processing efficiency of a job through interruption and resumption executed on a job-by-job basis.

Furthermore, according to this embodiment, the provision of a new check point as a parameter for a resumption command allows the resumption of the processing of an arbitrary document by removing the processing of a specific document.

In this embodiment, the job execution section 304 received a pause instruction is arranged so as to store a document number, a page number and a designated number of copies as check points into the object file 309. However, the present invention is not limited to such a configuration, and information necessary to resume an availability of collation can be stored as a check point in the object file.

Moreover, although the resuming section 312f queues a job to the end of the printer queue 312g when processing a resumption command in this embodiment, the job may be queued to an arbitrary position in the printer queue 312g.

Figure 42:
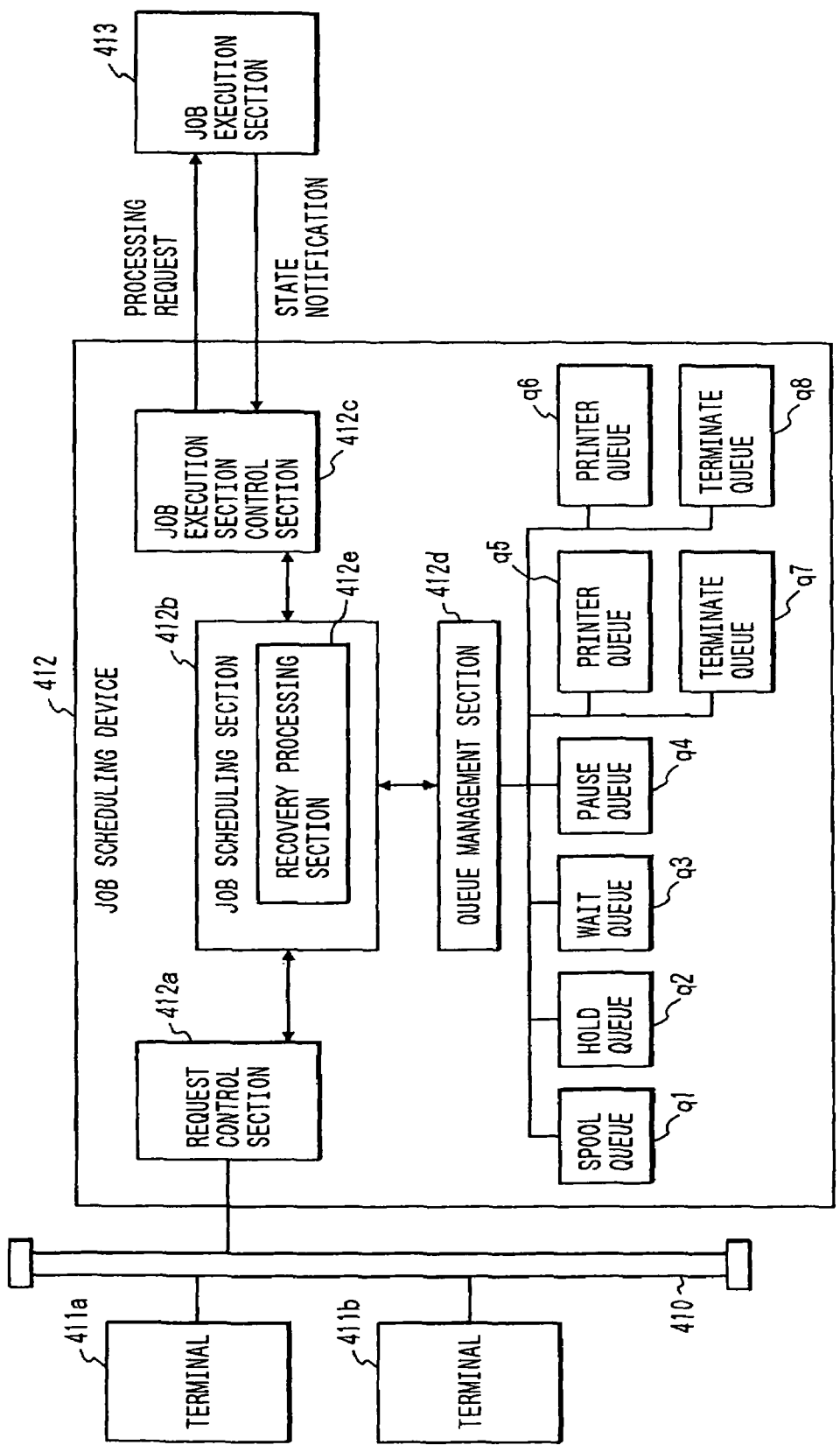
FIG. 42 is a block diagram showing the overall configuration of a job processing system and the detailed configuration of a job scheduling device according to a sixth embodiment of the present invention.
Figure 43:
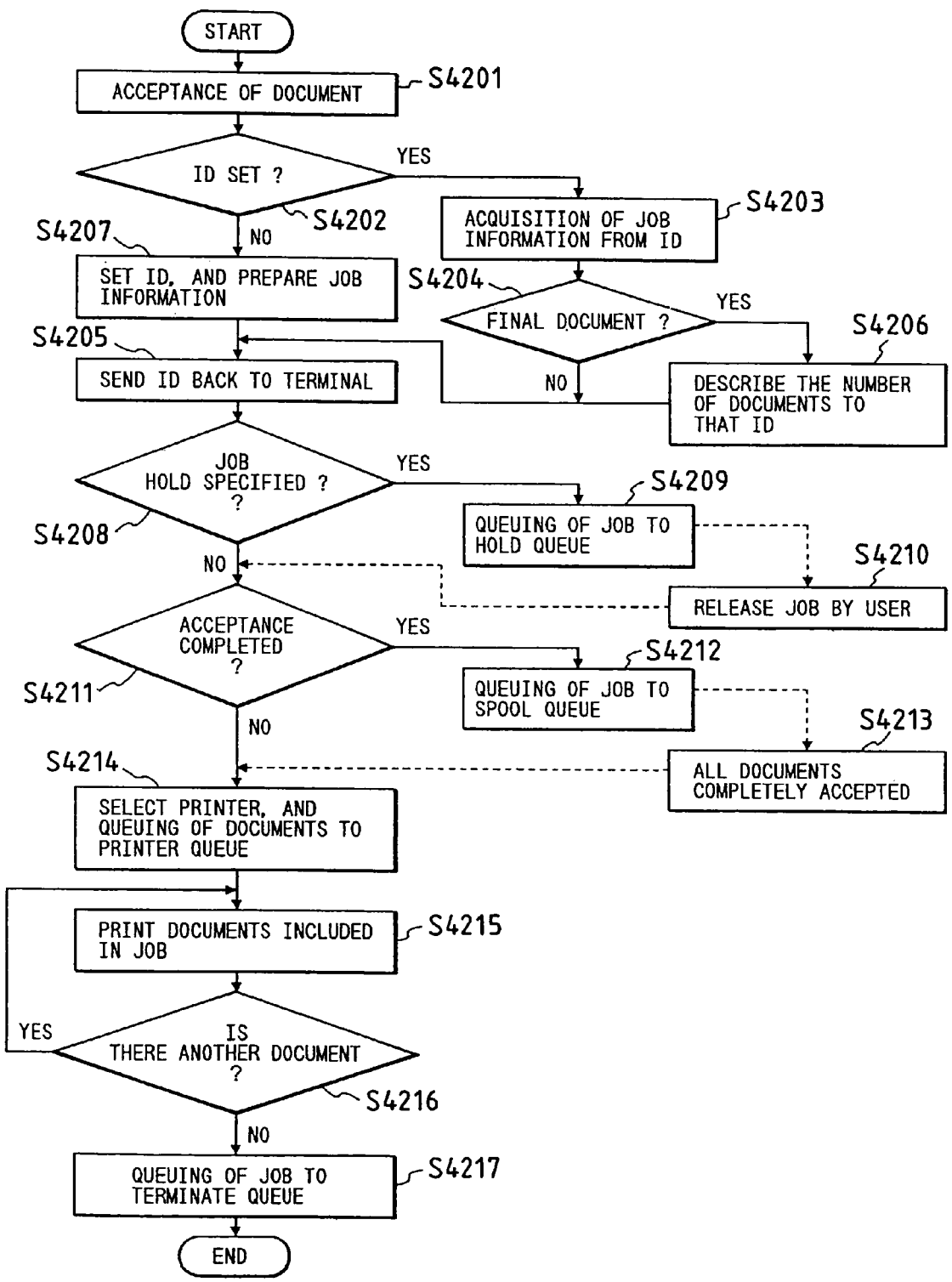
FIG. 43 is a flowchart showing processing procedures the moment when the job scheduling device shown in FIG. 42 received a job and the moment when printing is carried out.

With reference to FIGS. 42 to 44, a job processing system according to a sixth embodiment of the present invention. The job processing system of this embodiment is directed to make it possible to easily recover the system from failures in a configuration in which job scheduling is effected using a plurality of queues.

FIG. 42 is a block diagram showing the overall configuration of a job processing system used in this embodiment and the detailed configuration of the job scheduling system.

As shown in FIG. 42, this job processing system is made up of terminals 411a and 411b which issue a processing request for a job, and a job scheduling device 41 which is connected to the terminals 411a and 411b through a network 10 and carries out scheduling when processing a job using a job execution section 413.

In this embodiment, the job execution section 413 is made up of two printers for carrying out print processing and one converter for converting a format.

The job scheduling device 412 is made up of a request control section 412a, a job execution section control section 412c, a queue management section 412d, a spool queue q1, a hold queue q2, a wait queue q3, a pause queue q4, printer queues q5 and q6, and terminate queues q7 and q8.

Upon receipt of a job processing request from the terminals 411a and 411b, the request control section 412a issues a request for scheduling a job to the job scheduling section 412b.

The job which this request control section 412a accepts includes a one-job one-document job in which one job consists of only one document, and a one-job multidocument job in which one job consists of a plurality of documents.

As described above, the one-job multidocument job comprises an after-complete job (hereinafter referred to as an AC job) and a before-complete job (hereinafter referred to as a BC job).

The AC job is characterized in that a job is output to the job scheduling section 412b after all documents included in that job are accepted. On the other hand, the BC job is characterized in that a job is sequentially output to the job scheduling section 412b upon acceptance of a document included in that job.

The job scheduling section 412b effects scheduling by queuing a job accepted from the request control section 412a using the queue management section 412d.

Specifically, the job scheduling section 421b stores print data included in the accepted job a master file (not shown), prepares information (hereinafter referred to as job information) for managing a queue based on the attribute information included in the job, and queues the job.

Further, in addition to the simple scheduling of a job, the job scheduling section 412b carries out the following processing in order to achieve smooth recovery from the interruption of job processing:

(1a) the modification of a job status after the movement of job information when the job information is moved from a certain queue to another queue;

(1b) the deletion of a job in the order of a master file and job information when the job is deleted;

(1c) the modification of job information after the recording of an account when the account is written; and (1d) the resetting of constituent elements of job information (hereinafter referred to as members) when an inconsistency arises between the members.

The job scheduling section 412b is provided with a recovery processing section 412e which effects recovery from the interruption of job processing.

This recovery processing section 412e effects recover processing, which will be described later, with respect to job information retained in each queue when job processing is resumed.

The job execution section control section 412c outputs a job processing request from the job scheduling section 412b to the job execution section 413.

The queue management section 412d manages a queue of jobs by retaining job information in any one of the spool queue q1, the hold queue q2, the wait queue q3, the pause queue q4, the printer queues q5 and q6, and the terminate queues q7 and q8.

Jobs managed by the queue management section 412d belong to any one of the above mentioned eight queues unless otherwise deleted by a user or the system.

The spool queue q1 queues job information of the AC job. Job information is retained in this spool queue q.1 until all documents contained in a job are accepted. When all of the documents are completely accepted, the job information is moved to a printer queue provided corresponding to a printer which will be used.

The hold queue q2 queues job information of unscheduled job, and the user can edit job information retained in the hold queue q2.

The job information retained in this hold queue q2 stays in this queue until the user issues an instruction, and the information is moved to the spool queue q1, the printer queue q5, or the printer queue q6 in response to the user's instruction.

The wait queue q3 queues job information of a job waiting for a password input when the job timed out. The job information retained in the wait queue q3 is retained in this queue until the job is released from a password waiting state by user's input of a password. When the job is released from the password input wait, the job information is moved to the queue where it was originally situated when the timeout occurred.

The pause queue q4 queues job information of a job which the user instructs to pause, and the job information retained in this pause queue q4 is retained in this queue until the user instructs the resumption of the job. When the user instructs the resumption of the job, the job information is moved to an assigned printer queue.

The printer queues q5 and q6 are provided corresponding to printers so as to queue job information of jobs which are waiting for printing. Only job information of a job assigned to each printer is queued in a corresponding printer queue.

In this embodiment, the printer queue 5 corresponds to either one of two printers provided in the job execution section 413, and the printer queue q6 corresponds to the other printer.

A processing request is issued with respect to the job information retained in the printer queue q5 or q6 if the printer becomes enabled and if the leading job in the printer queue q5 or q6 includes a processable document. When the print processing of the printer is completed, the job information of that job is moved to the terminate queue q7 or q8.

The terminate queues q7 and q8 are provided corresponding to the printers in order to queue job information of printed jobs. Only job information of a job assigned to each printer is queued in a corresponding terminate queue.

As a result of the use of the job scheduling device 412 having the above configuration, it becomes possible to manage a queue corresponding to the state of a job and hence to effect appropriate scheduling.

In this embodiment, an explanation will be given of the case where the job execution section 413 has two printers. The number of printer queues and terminate queues is determined corresponding to the number of registered printers retained in the job execution section 413.

The processing procedures of the scheduling device 412 will now be described. Here, the processing of the scheduling device, which recovery is required in response to the interruption of processing, will be described later.

FIG. 43 is a flowchart showing processing procedures of the scheduling device 412 shown in FIG. 42 between the receipt of a job and the execution of print processing.

As shown in FIG. 43, upon receipt of a job output from the terminal 411a or 411b via the network 410 (step S4201), the request control section 412a checks whether or not a job ID, which will be described later, is set to the job (step S4202). If the job ID is set to the job, job information is obtained from this job ID (step S4203), and then it is checked whether or not the accepted document is the final document (step S4204).

If the document is not the final document, the job ID is sent back to the terminal which issued the request (step S4205). On the other hand, if the document is the final document, the number of documents is written into the job ID (step S4206), and the job ID is sent back to the terminal which issued the request (step S4205).

Contrary to this, if the job ID is not set to the job, a job ID is newly set to the job and job information is prepared (step S4207), and the job ID is sent back to the terminal which issued the request (step S4205).

The job scheduling section 412b which accepted the job information of that job checks whether or not a job hold is specified for that job (step S4208). If the job hold is not specified for that job, the job is queued in the hold queue q2 (step S4209).

On the other hand, if the job hold is not specified for that job, or if the user issued a hold cancellation instruction with respect to the job queued in the hold queue q2 (step S4210), it is checked whether or not that job is an AC job (an after-complete job) (step S4211). If the job is the AC job, the job is queued in the spool queue q1 (step S4212).

Contrary to this, if the job is not the AC job, or if all documents included in the job queued in the spool queue q1 are completely accepted (step S4213), a printer which carries out printing is selected, and the job is queued in a printer queue corresponding to the selected printer (step S4214).

When a processing turn of the job queued in the printer queue came, a document included in that job is printed (step S4215).

If the job is a one-job multidocument job, all documents included in that job are printed (steps S4215 and S4216).

After the job has been output to the terminate queue (step S4217), printing is completed.

In this way, the job accepted by the job scheduling device 12 is finally retained in the terminate queue.

Subsequently, the configuration of the job information queued in each queue will be described.

FIG. 44 is an explanatory view showing the configuration of job information queued in each queue.

As shown in FIG. 44, the job information comprises a job ID representing an identification number of a job; docsecNum for use in identifying a one-job multidocument; currentIocNum to which the docsecNum for issuing a print request is set; a status 430a which represents the state of a job; prevQID representing a previously retained queue ID; jobCopyCount representing the number of copies; requestCounter representing how many times a print request for a document is issued to a job execution section; complete- Counter representing how many times the processing of a document is completed; abortedCounter representing the number of times a job is aborted during the processing of a document; collateFlag representing whether or not collation is carried out; resumeFlag representing whether or not resumption of the job is carried out; previousStatus representing a previous status; retry representing a retry counter when a job is rejected by the job execution section; complete representing whether or not a document is the final document; convertID representing an ID of a requesting converter; ohPagesComp representing how many pages of a job were output; ohDocPagesComp representing how many pages of a document were output; ohCurJobState representing the current state of a job; ohPrevJobState representing a previous job status; ohJobStateReason representing the reason for a transition of the current job status; ohAssignJEID representing an ID of a printer assigned as a result of the selection of a printer; retryCounter representing the number of retries after recovery; and processingFlag representing whether or not a job is being currently printed.

Further, the status 430a comprises:
pending: Printer waiting for processing
requesting: Printing being requested
printing: Printing being executed
aborting: Operation being cancelled
cancelled: Canceling being completed
retained: Printing completed
suspended: Pausing being executed
startwaiting: Start being waited
passwordwaiting: Password input being waited
endwaiting: End being waited
convert_pending: Conversion being waited
convert_requesting: Response being waited during conversion request
converting: Conversion being executed
convert_end: Conversion completed
passwd_release: Release of password
passwd_timeout: Password timed out
terminated: Output terminated
convert_failed: Conversion failure
job_aborted: Printing aborted
interrupted: Interrupt wait
convert_aborting: Conversion being cancelled
convert_canceled: Conversion cancellation completed
none: Undefined The management of the state of a job using the job information consisting of the above members makes it possible to carefully schedule the job.

Subsequently, processing of the job scheduling section 412b in order to prevent the loss and destruction of data resulting from the interruption of job processing will now be described.

As previously mentioned, this job scheduling section carries out the following processing:

(1a) When job information is moved, a job status is modified after the movement of the job information.

(1b) When a job is deleted, the job is deleted in the order of a master file and job information.

(1c) When an account is written, job information is changed after the recording of the account.

(1d) If inconsistency arises between members of job information, the members will be reset.

Each processing will be described.

(1a) If processing is interrupted while job information retained in a certain queue is moved to another queue, it will look as if the job information was not transferred even though the status, which is one of the members of the job information, has been rewritten.

In such a case, if simple recovery is effected, inconsistency arises between the status of the job information and a practical queue retaining that job information, and it becomes impossible to appropriately carry out recovery.

To prevent this, when job information is moved, the job scheduling section 412b rewrites the status of that job information after having moved the job information. When the recovery processing section 412e carries out recovery processing, the recovery processing is effected based not on the status but on the queue which practically retains the job information.

For example, if the system should go down during the execution of pause operation, the job information is retained in either the printer queue q5 or the pause queue q4. Where the job information is retained in the printer queue q5 at the time of recovery, that job information is rendered in a pending status. Where the job information is retained in the pause queue q4, the job information is rendered in a suspended status.

As a result of this, it becomes possible to eliminate inconsistency between the status of the job information and the practical queue retaining the job information.

(1b) If processing is interrupted while a print job is deleted, job information of that print job may be retained in any one of queues even though the master file retaining print data of that print job has been deleted.

In such a case, inconsistency arises between the master file and job information, and it becomes impossible to effect appropriate recovery.

To prevent this, when the job is deleted, the job scheduling section 412b deletes the master file, and thereafter deletes the job information. If the master file is not present in spite of the fact that requestCounter of the job information is more than one when the recovery processing section 412e effects recovery processing, recovery processing to delete the job information is carried out.

As a result of this, it is possible to eliminate inconsistency between the master file and job information.

(1c) If processing is interrupted while the writing of an account and the transfer of job information to the terminate queue are carried out, the writing of the account will be terminated, but the transfer of the job information may become unfinished.

To prevent this, the job scheduling section 412b modifies the status of the job information after the recording of the account has been completed. If the job information is in the terminated status when the recovery processing section 412e effects recovery processing, the recovery processing is carried out in such a way that the recording of the account has been completed.

As a result of this, it is possible to check whether or not the account is recorded.

(1d) If job processing is interrupted when the job execution section 413 can process a plurality of documents at one time, the number of produced copies may become indefinite.

To prevent this, the job scheduling section 412b decrements a requestCounter, which represents the number of requests for printing a document to the job execution section 413, every time the print request is issued to the job execution section 413. Upon receipt of an acknowledgement of the completion of printing processing from the job execution section 413, the job scheduling section 412b increments a completeCounter which represents the number of times document processing is terminated.

If jobCopyCount=requestCounter+completeCounter does not stand when the recovery processing is effected, the recovery processing is resumed by newly setting requestCounter=job CopyCount−completeCounter.

For example, if requestCounter=2, jobCopyCount=5, and completeCounter=1,—a sum between the requestCounter and the completeCounter is smaller than the jobCopyCount. Hence, the processing is continued by newly setting "4" to the requestCounter.

As a result of this, even if the processing is interrupted, it becomes possible to appropriately set the number of times requests for printing a document are issued to the job execution section 413.

The processing carried out by the recovery processing section 412e will be described.

The processing of the recovery processing section 412e falls into two categories: namely, processing which is carried out immediately after an abnormal condition occurs, and processing which is carried out when the job scheduling section reboots. These two types of processing will be explained hereinbelow.

The processing carried out immediately after the occurrence of an abnormal condition will first be explained.

The recovery processing section 412e carries out the processing when (2a) the job execution section 413 detects an abnormal condition within the system, and a document being processed is aborted;

(2b) the job execution section 413 suddenly terminates the processing as a result of the occurrence of an abnormal condition;

(2c) and a converter processing section of printer and converter processing sections of the job execution section 413 which converts a format is abnormally terminated.

Each of these three cases will be described.

(2a) If a job is being suspended or an interrupt wait is being executed when the job execution section 413 is aborted, the occurrence of an abnormal condition is output to a terminal which issued the request. As a result of this, the user can be notified of the occurrence of an error.

If the final document of a one-job one-document job or a one-job multidocument job is being instructed to print when the aborting processing is received from the job execution section 413, the job is aborted.

However, if a document other than the final document of the one-job multidocument job is being instructed to print at this time, the requestCounter of that job is set to −1. Upon receipt of an acknowledgement of the termination of the job scheduling device 413 from a manager (not shown) which supervises the job scheduling device 412 and the job execution section 413, a requestCounter set to −1 is searched, and a job corresponding to that requestCounter is aborted. At this time, if the format of another document is being converted, a termination request is issued to the conversion processing section which carries out the conversion of a format. When the conversion processing section received that termination request, the job is aborted.

Through the execution of postprocessing associated with the occurrence of such an error, it becomes possible to easily effect recovery processing when an error arises.

(2b) If a job is being suspended or an interrupt wait is being executed when the job execution section 413 is suddenly terminated, the occurrence of an abnormal condition is output to a terminal which issued the request in the same manner as in the case of (2a).

If the final document of a one-job one-document job or a one-job multidocument job is being instructed to print when the aborting processing is received from the job execution section 413, the job being processed is rendered in a pending status. When an enabled acknowledgement is received from the job execution section after the job has been restarted, the printing of the pending job is requested again. As a result of this, it is possible to prevent a job from being lost.

However, if an error arises again while the job once rendered in a waiting state by the job execution section 413 is being processed, the user's instruction is needed to restart the job by providing the job with a start-wait attribute. This is intended to prevent the repetition of a print request and errors.

(2c) If a job is being converted (converting) or waiting for response while requesting conversion (convert_requesting) when the conversion processing section of the job execution section 413 which converts a format is abnormally terminated, the job is rendered in a conversion waiting status (convert_pending). Thereafter, the conversion request is issued again when an enabled acknowledgement is received from the conversion processing section.

As a result of this, even if an error arises, it is possible to smoothly convert a format.

The processing which the recovery processing section 412e carries out when the job scheduling section 412 reboots will be described.

When the job scheduling section 412 reboots, the recovery processing section 412e executes the recovery of the spool queue q1, the hold queue q2, the wait queue q3, the pause queue q4, the printer queues q5 and q6, and the terminate queues q7 and q8.

The recovery processing of each queue will be explained.

(3a) Recovery Processing of Spool q1

As regards a job retained in the spool q1 at the time of recovery, a document queued in a queue at that time is dealt as one job, and a printer is assigned to that job. The job is then moved to a printer queue corresponding to the assigned printer. Then, the job is rendered in a pending status.

If the assigned printer is disabled to accept queuing, the job is rendered in a preprocessing status which means that the job is not processed yet. The reason of the change of the current job status (ohJobStateReason: hereinafter referred to as reason) is set to none, and the job is left in the spool queue 1.

Such a job can be deleted by a command "DeleteJob" or may be canceled by a command "Cancel".

If it is notified that the printer queue q5 or q6 assigned by a command (PSM_Command) which assigns a job becomes enabled, the job is scheduled.

If the assigned printer queue is missing, the job is rendered in a preprocessing status, and the job is left in the spool queue q1.

This job can be deleted using the command "DeleteJob", but it cannot be canceled by the command "Cancel".

If it is notified that a printer having the same name as the assigned printer is registered and the printer assigned by the PSM_Command becomes enabled, the job is scheduled.

If there is a document without a master file for storing print data of a job, the document is aborted and retained in the terminate queue.

(3b) Recovery Processing of Hold Queue q2

A job retained in the hold queue q2 at the time of recovery is rendered in a held status, and the reason is set to jobholdset.

Jobs which are queued at the time of recovery are handled as one job, and there is a document without a master file to which print data of a job are stored. At that time, the document is aborted.

(3c) Recovery Processing of Wait Queue q3

A job retained in the wait queue q3 at the time of recovery is rendered in a held status, and the reason is set to password-set which represents a password input wait.

In the case of a BC job, documents which are queued at the time of recovery are handled as one job. Further, jobs which are being converted or waiting for response while requesting conversion are rendered in a conversion request wait status (convert_pending). When a processing enabled acknowledgement is received from the conversion processing section, a request for converting the jobs is issued.

If there is a document without a master file for storing print data of a job, the document is aborted.

(3d) Recovery Processing of Pause Queue q4

A job retained in the pause queue q4 at the time of recovery is rendered in a paused status, and the reason is set to none.

In the case of a BC job, documents which are queued at the time of recovery are handled as one job. Further, jobs which are being converted or waiting for response while requesting conversion are rendered in a conversion request wait status (convert_pending). When a processing enabled acknowledgement is received from the conversion processing section, a request for converting the jobs is issued.

If there is a job which has not timed out at the time of recovery and is waiting for a password (in a password wait status), the password input is regarded as not being provided. Further, if resuming processing for releasing the job from the startwait and password wait states was carried out, the job is queued to the end of the printer queue. The job is again rendered in a password wait status when a processing request is issued to the job execution section 413.

If there is a document without a master file for storing print data of a job, the document is aborted.

(3e) Recovery Processing of Printer Queues q5 and q6

A job retained in the printer queues q5 and q6 at the time of recovery is rendered in a pending status, and the reason is set to none.

A processing document, which was in a requesting state or a printing state when abnormally terminated, issues a processing request to the job execution section 413 after an enabled acknowledgement has been received from the job execution section 413.

If the same job is abnormally terminated, the job is rendered in a start waiting state after having been recovered.

Subsequently, a processing job, which was receiving abortexit from the job execution section 413 when abnormally terminated, is aborted. Further, jobs which are being converted or waiting for response while requesting conversion are rendered in a conversion request wait status (convert_pending). When a processing enabled acknowledgement is received from the conversion processing section, a request for converting the jobs is issued.

Moreover, a job, which was in the startwait and password-wait states when abnormally terminated, is again rendered in the startwait and passwordwait states when an enabled acknowledgement is accepted from the job execution section 413.

If there is no document to which a processing request should be issued, and if the processing of a job has already been completed, the job is moved to the terminate queue and is rendered in a terminated status. Then, the reason is sent to complete_with_error.

In the case of a BC job, documents which are queued at the time of recovery are handled as one job. If there is a document without a master file for storing print data of a job, the document is aborted.

(3f) Recovery Processing of Terminate Queues q7 and q8

Jobs, retained in the terminate queues q7 and q8 at the time of recovery, are rendered in a terminated status. Further, as regards jobs aborted as a result of the abnormal termination are rendered, the reason of the jobs is set to canceled_by_user.

Through the execution of a series of the above mentioned processing, the recovery processing section 412e can recover the jobs retained in each queue.

As previously mentioned, according to the present embodiment, upon receipt of a job processing request from the terminal 411a and 411b, the job scheduling section 412b schedules jobs while moving the job from one queue to another queue depending on the state of that job. Hence, it becomes possible to carefully manage jobs.

If any failure arises during the scheduling of jobs, the recovery processing section 412e recovers the previous state of each of jobs retained in the plurality of queues at the time of recovery from the failure. Even if a system failure arises, the influence of the system failure can be reduced, and job processing can be executed as instructed by the user.

Further, in this embodiment, the status of job information is rewritten after the job information has been moved, and recovery processing is carried out based on the practical queue which retains the job. Hence, it is possible to eliminate inconsistency between the status of job information and the practical queue retaining that job information.

In this embodiment, job information is deleted after a master file has been deleted, and if the master file is not present in spite of the fact that requestCounter of the job information is more than one, recovery processing to delete the job information is carried out. Hence, it is possible to eliminate inconsistency between the job information and the master file.

Furthermore, in this embodiment, the status of job information is changed after an account has been recorded, and if the job information is in a terminated status, recovery processing is carried out in such a way that the account has already been recorded. Therefore, it is possible to check whether or not the account is recorded.

Moreover, in this embodiment, the job scheduling section decrements a requestCounter, which represents the number of requests for printing a document to the job execution section 413, every time the print request is issued to the job execution section 413. Upon receipt of an acknowledgement of the completion of printing processing from the job execution section, the job scheduling section increments a completeCounter which represents the number of times document processing is terminated. In this way, the requestCounter and the completeCounter are matched with each other. Hence, if processing is interrupted, the number of times (requestCounter) a request for printing a document is issued to the job execution section 413 can be appropriately set.

As has been described above, according to the sixth embodiment, upon receipt of a job processing request from a terminal, the job scheduling unit schedules a job while moving the job from one queue to another queue depending on the state of that job. Even if a failure arises during the scheduling of a job, recovery unit recovers the previous state of each of jobs retained in a plurality of queues at the time of recovery from the failure. Even if a system failure arises, the influence of the system failure can be reduced, and job processing can be executed as instructed by the user.

With reference to FIGS. 44 to 51, a job processing system according to a seventh embodiment of the present invention will be described. The job processing system of this embodiment is intended to simply modify the attribute of a job. The overall configuration (shown in FIG. 45) of the job processing system of the seventh embodiment is substantially the same as that of the sixth embodiment (shown in FIG. 42), the same reference numerals are provided to designate corresponding features shown in FIG. 42, and hence the detailed explanation thereof will be omitted here for brevity. Moreover, since the configuration of job information of the seventh embodiment is the same as that of the sixth embodiment (shown in FIG. 44), FIG. 44 used in describing the sixth embodiment is quoted to the extent necessary.

Figure 45:
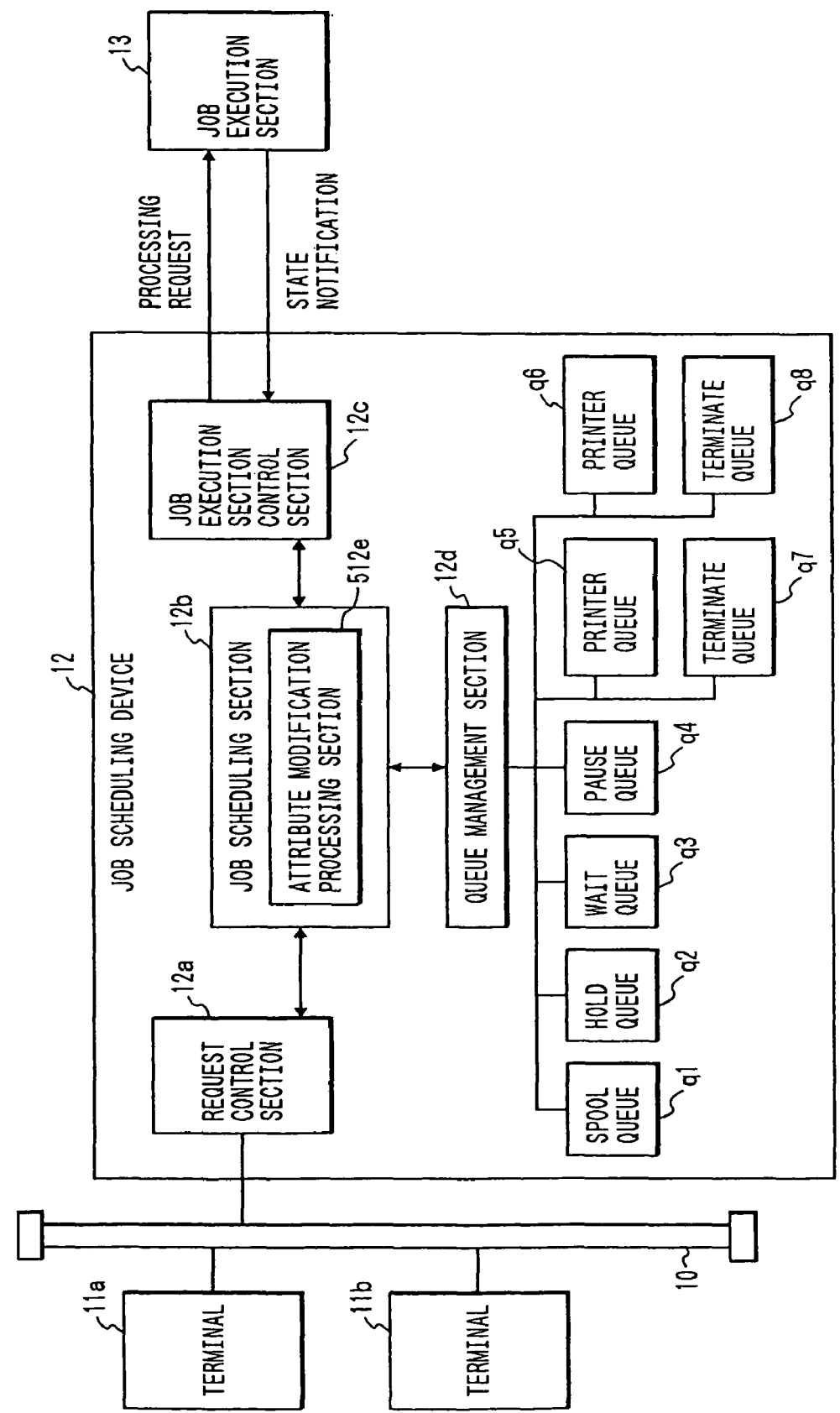
FIG. 45 is a block diagram showing the overall configuration of a job processing system and the detailed configuration of a job scheduling device used in a seventh embodiment of the present invention.

In FIG. 45, the job scheduling section 412b resides in an attribute modification section 512e which modifies attribute information in response to a request for modifying the attribute information of a job.

Upon receipt of the request for modifying the attribute of a job, the attribute modification section 512e checks whether or not the attribute of that job is changeable. If the attribute is changeable, the attribute modification section changes attribute information of the job after having checked whether or not the attribute information should be changed.

This attribute modification section 512e checks
(1) whether or not the attribute of the job is changeable; and
(2) whether or not the attribute information to be changed is appropriate. If the modification of the attribute information is possible, the attribute information of the job will be changed.

Specifically, with regard to the check designated by (1), it is checked
(1a) whether or not the job information of a job designated so as to change its attribute is in the hold queue q2;
(1b) whether or not the job information of a job designated so as to change its attribute is in the printer queue q5 or q6, and whether or not the job is not currently processed and has never been interrupted in the past; and
(1c) whether or not the job information of a job designated so as to change its attribute is present in the pause queue q4, and whether or not the job has never been interrupted in the past.

Each of these checks will be described.
(1a) Check as to whether or not job information is in the hold queue q2

A job whose job information is queued in the hold queue q2 is a non-scheduled job specified by the user as has been described above, and that job has been rendered in an instruction waiting state from the beginning by the user.

For this reason, if the job information is in the hold queue q2, it means that no processing has never been executed since the job was accepted. Therefore, the attribute of that job can be changeable.

When jobs in a start waiting state (startwaiting), an end waiting state (endwaiting), and a password input waiting (passwordwaiting) are retained in this hold queue q2, the system may be constructed so as not to allow the attribute information of these jobs to be changed in view of the fact that these jobs are in a waiting state. For convenience of explanation, in this embodiment, an explanation will be given of a user-specified nonscheduled job by focusing on this job.

(1b) Check as to whether or not job information is in the printer queue q5 or q6, and whether or not the processing of the job has never been interrupt the now and before now Even when the job information is in the printer queue q5 or q6, the job in a processing wait state is not subjected to any processing in principle. Accordingly, the attribute of that job is changeable.

However, if a pause instruction is issued while the job is being processed, and if the job once temporarily moved to the pause queue is in the printer queue q5 or q6 according to a resumption instruction, the change of the attribute is not admitted in order to obtain a match between the document having been printed and the document which is processed from now.

(1c) Check as to whether or not the job information is in the pause queue 4, and whether or not the previous job state is being processed A job whose job information is retained in the pause queue q4 is not processed because that job is instructed to pause. For this reason, in principle, the attribute information is changeable.

However, the jobs whose job information is retained in the pauses queue q4 include a job which was subjected to a pause instruction while being printed. If the attribute information of such a job which was subjected to interruption while being printed is changed, it becomes difficult to obtain a match between the document which has already been printed and the document which will be printed later.

To prevent this, it is not admitted to change the attribute of a job which was subjected to interruption while being processed.

In this way, the attribute modification section 512e confirms a queue which retains job information of jobs designated so as to change their attributes. If the jobs are retained in the hold queue q2, the attribute modification section 512e admits the modification of the attributes of the jobs. If the jobs are in the printer queues q5 and q6, and the pause queue q4, the modification of the attributes of the jobs is admitted on condition that the jobs are not being processed.

Procedures for confirmation of the state of a job carried out by the attribute modification section 512e will be described.

Figure 46:
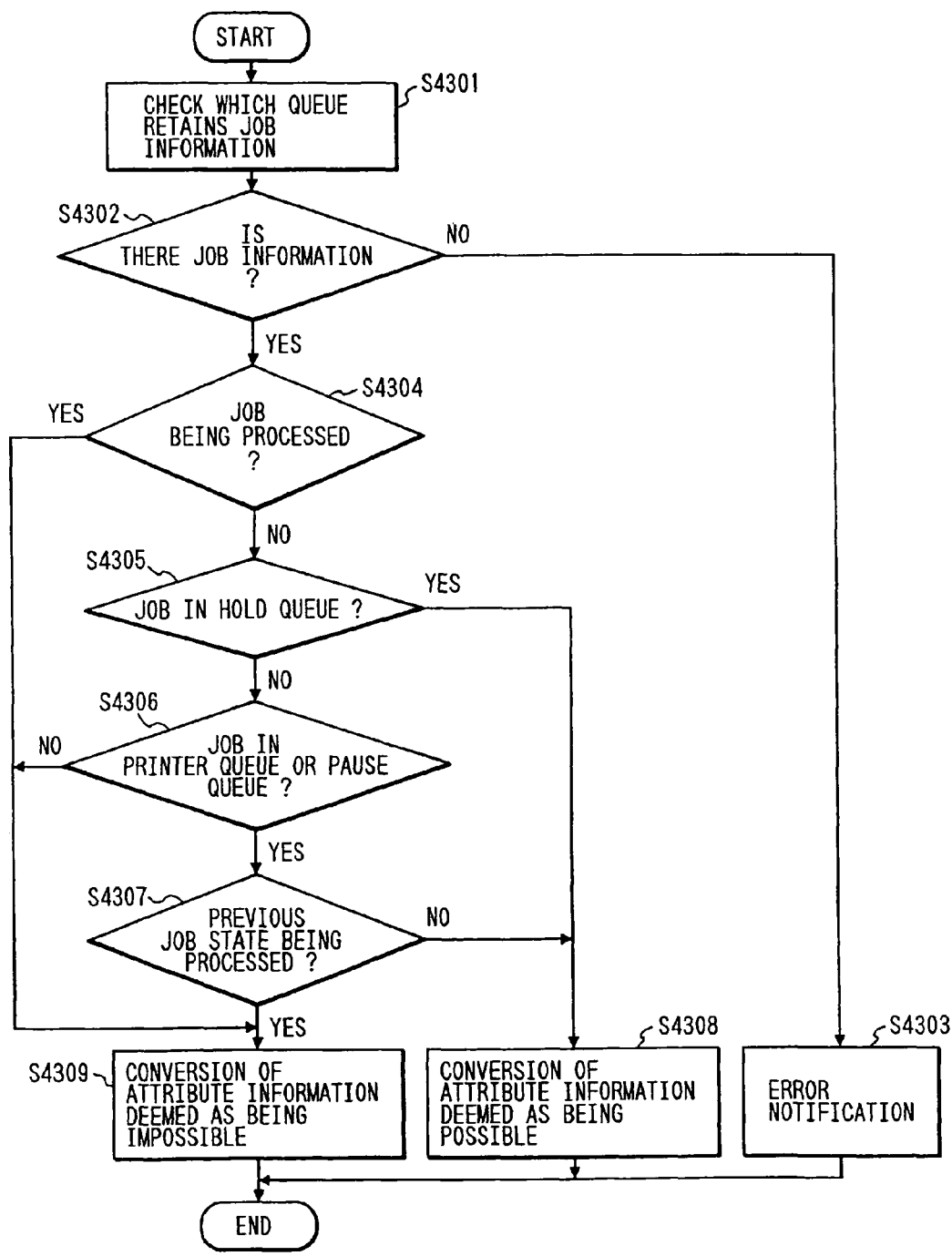
FIG. 46 is a flowchart showing procedures for confirmation of a job status which is carried out by an attribution modification section shown in FIG. 45.

FIG. 46 is a flowchart showing procedures for confirmation of the state of a job carried out by the attribute modification section 512e shown in FIG. 45.

As shown in FIG. 46, upon receipt of an instruction for the modification of the attribute information of a job, the attribute modification section 512e checks that the job information of the specified job is present in any queue (step S4301). If the job information is not present in any of the queues, an error notification is issued to the user, and then the processing is terminated (steps S4302 and S4303).

On the other hand, if the job information is present, it is checked whether or not the job is being processed (step S4304). If the job is being processed, the attribute information of that job is deemed as being unchangeable (step S4309), and hence the processing is terminated.

If the job is not being processed, it is checked whether or not the job information of that job is retained in the hold queue q2 (step S4305). If the job information is held in the hold queue q2, the attribute information of that job is deemed as being changeable.

If the job information of this job is retained in the printer queue q5 or q6, or the pause queue q4 (step S4306), it is further checked whether or not the job is being processed (step S4307).

Specifically, it is checked whether or not the job has previously been processed by checking whether or not the previous state of the job information (previous_job_state) is in a processing state (processing).

As a result of this, if the job was not previously in the processing state, the attribute information of that job is deemed as being changeable (step S4308). On the other hand, if the job was previously in the processing state, the modification of the attribute information of the job is not admitted (step S4309).

If the job information is present in a queue other than the hold queue q2, the pause queue q4, and the printer queue q5 or q6, the modification of the attribute information of the job is not admitted (step S4309).

In other words, when the job information is present in either the terminate queue q7 or q8, the processing of that job has already been completed. Further, when the job information is present in the spool queue q1, the acceptance of an AC job has not been completed yet. Moreover, when the job information is in the wait queue q4, the job is waiting for a password input, and therefore the attribute information of that job should not be changed.

Through the execution of a series of the previously mentioned processing, it is possible to check whether or not the correction of the attribute information of a job is possible depending on the state of the job when an instruction for the modification of the attribute information of that job is accepted.

Subsequently, an explanation will be given of a check as to whether or not the attribute information which the attribute modification section 512e corrects (2) is appropriate.

If the previously mentioned job is in the state in which the attribute information thereof is changeable, the attribute information can be modified in principle. However, the user attempts to provide erroneous attribute information, the modification of the attribute information should not be admitted.

To prevent such erroneous modification of the attribute information, a check is made for the following three points with respect to the attribute information specified and corrected by the user: namely, (2a) whether or not an attribute not supported by the job scheduling device 412 is specified;

(2b) whether or not multiple values (Multi_Value) are provided as an attribute value to an item where a single value (Single_Value) should be provided; and (2c) whether or not the attribute information of a job which the second and later documents possess is specified. For (2c), when a one-job multidocument is used, each document possesses the attribute information of a job. On the assumption that the attribute information the first document possesses must be changed in order to change the attribute information of the job, it is checked whether or not the attribute information which the second and later documents have is specified.

Figure 47:
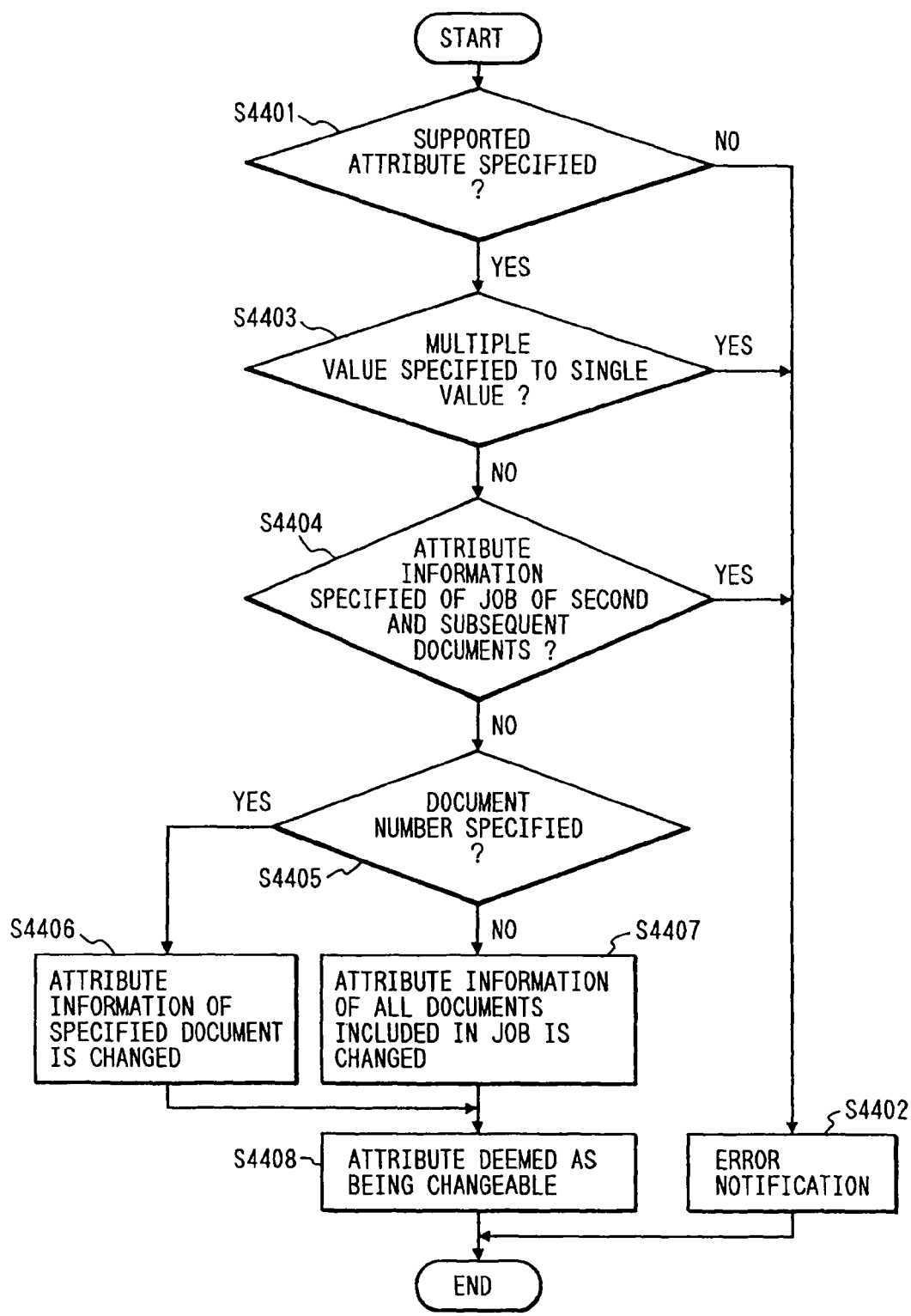
FIG. 47 is a flowchart showing procedures for confirmation of attribute information which is carried out by the attribute modification section shown in FIG. 45.

FIG. 47 is a flowchart showing procedures for the confirmation of the attribute information carried out by the attribute modification section 512e.

As shown in FIG. 47, upon receipt of the corrected attribute information specified by the user, the attribute modification section 512e checks whether or not the attribute information includes an attribute which is not supported by the job scheduling device 412 (step S4401). If the attribute information includes the attribute which is not supported by the job scheduling device, an error acknowledgement is issued (step S4402), and the processing is terminated.

On the other hand, if the attribute information only comprises the attribute supported by the job scheduling device 412, it is checked whether or not multiple values (Multi_Value) are provided as an attribute value to an item where a single value (Single_Value) should be provided (step S4403). If the multiple values are provided, an error acknowledgement is issued (step S4402), and the processing is terminated.

To the contrary, if the multiple values are not provided, it is confirmed whether or not the job attribute information of the second and subsequent documents for the one-job multidocument is specified (step S4404), and if the attribute information of the second and subsequent documents is specified, an error acknowledgement is issued (step S4402), and the processing is terminated.

If the attribute information of a job of the first document is specified, it is further checked whether or not a document number (document_sequential_number) is specified.

As a result of this, if a document number is specified, the attribute information of only the specified document is changed (step S4406). If the document number is not specified, the attribute information of all documents included in that job is changed (step S4407). The modification of the attribute information is deemed as being changeable (step S4408), and the processing is terminated.

Through the execution of a series of the previously mentioned processing, it becomes possible to reduce the chance that the user provides erroneous attribute information.

Subsequently, an explanation will be given of procedures for modification of the attribute information which the attribute modification section 512e carries out after having completed the confirmation of a job status as shown in FIG. 46 and the confirmation of attribute information as shown in FIG. 47.

When the user modifies the attribute information, the user specifies a modifier operator (modifyoperator) and an attribute value (value). At that time, it is possible for the user to simultaneously specify a qualifier (qualifier). Alternatively, it is also possible to specify the modifier operator and the qualifier without designating the attribute value.

The qualifier is a parameter showing either true or false, and represents that an attribute with its qualifier being set to true must be processed using the specified attribute value. If the attribute with its qualifier being set to true cannot be processed using the specified attribute value, that job is processed as an error.

For example, if a qualifier of the attribute which designates paper size of a certain job is set to true, and if an attribute value of that attribute is specified to true, the job must necessarily printed on A4 size paper when the job is executed. If it is impossible to print the job on A4 size paper, that job is processed as an error.

Moreover, any one of replacement (replace), addition (add), deletion (remove value), and the setting of a default (set_to_default) can be specified for the modifier operator (modify operator).

Where the setting of a default (set_to_default) is specified for the modifier operator (modify operator) will be described using a modified example which will be explained later.

Figure 48:
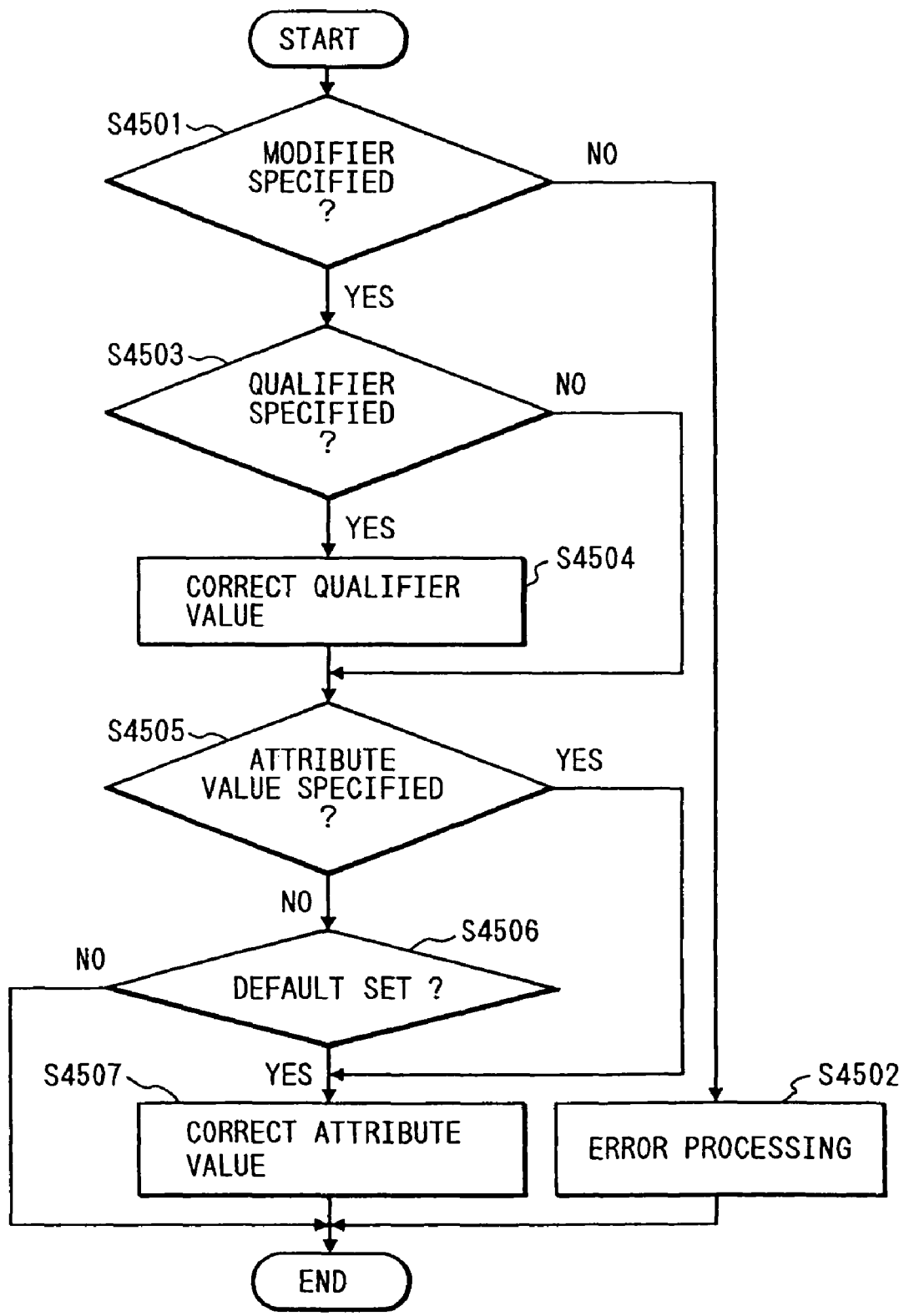
FIG. 48 is a flowchart showing processing procedures when the attribute modification section shown in FIG. 45 modifies attribute information.

FIG. 48 is a flowchart showing procedures executed when the attribute information is changed by the attribute information modification section 512e shown in FIG. 45.

As shown in FIG. 48, to begin with, it is checked whether or not the modifier operator (modify operator) is specified (step S4501). If the modifier operator is not specified, error processing is executed (step S4502), and the processing is terminated.

On the other hand, if the modifier operator (modify operator) is specified, it is further checked whether or not the qualifier is specified (step S4503). If the qualifier is specified, a value of the qualifier is corrected as instructed (step S4504). However, if the qualifier is not specified, the processing proceeds to step S4505.

Subsequently, it is checked whether or not the attribute value is specified (step S4505). If the attribute value is not specified, it is further checked whether or not the modifier operator (modify operator) is set to the default value (set_to_default) (step S4506).

As a result of this, if the attribute value is specified, and if the modifier operator is set to the default value without the designation of the attribute value, the attribute value is corrected (step S4507). If the attribute value is not specified, and if the modifier operator is not set to the default value, the processing is terminated.

Through the execution of a series of the previously mentioned processing, it is possible to confirm corrections of the qualifier and attribute value depending on the conditions of the modifier operator (modify operator) and the qualifier (qualifier) or the setting conditions of the attribute value.

The above descriptions are directed to explain the case where the user sets an attribute value by himself, and an explanation of the case where the default value is used was omitted. Hereinbelow, an explanation will be given not only of the case where the user himself sets the attribute value but also of a modified example in which an attribute value can be set using the default value.

Figure 49:
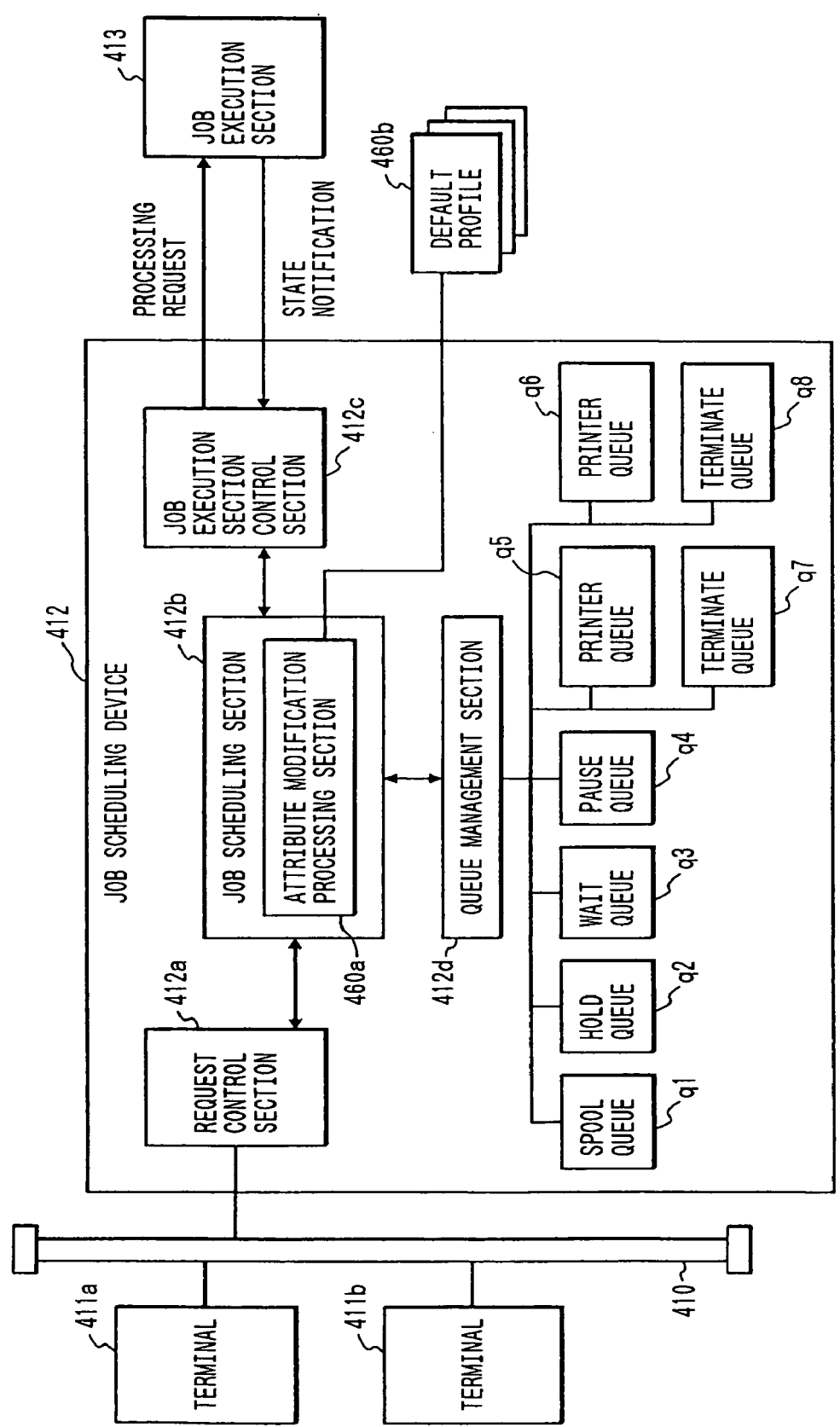
FIG. 49 is a block diagram showing the overall configuration of a job processing system used in a modified example of the seventh embodiment.

FIG. 49 is a block diagram showing the overall configuration of a job processing system used in a modified example.

As shown in FIG. 49, the job scheduling device 412 is provided with an attribute modification section 460a which allows the user to set an attribute value by himself and also permits the modification of an attribute using the default value.

This attribute modification section 460a can fetch a default attribute information from a default profile 460b which holds a default attribute information as needed, when an attribute modification instruction using a default value is received.

Specifically, if the user sets a default (set_to_default) to the modifier operator (modify operator), and if the attribute modification section 460a accepted the default (set_to_default) a necessary default will be fetched from the default profile 460a.

The default profile 460a is a storage section for storing default attribute information, and it is possible to have prepared a plurality of default profiles to which different default values are set. When the user sets default values, it becomes possible for the user to change attribute information to desired attribute information by selecting a default profile having desired attribute information and inputting a file name for that default file.

An explanation will be given of where attributes are changed without the use of default attribute information and where attributes are changed with the use of default attribute information.

Figure 50A:
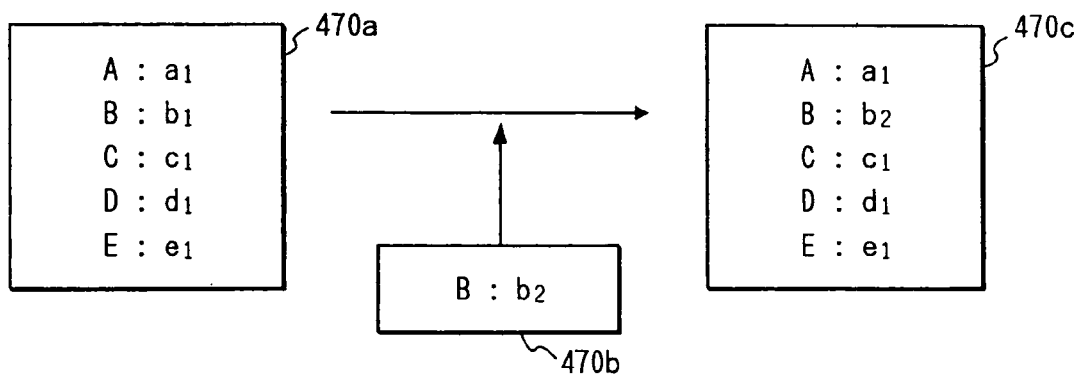
FIGS. 50a and 50b are schematic representations showing one example of the case where the attribute modification section shown in FIG. 49 modifies attributes without the use of default attribute information and the case where the attribute modification section modifies attributes using the default attribute information.
Figure 50B:
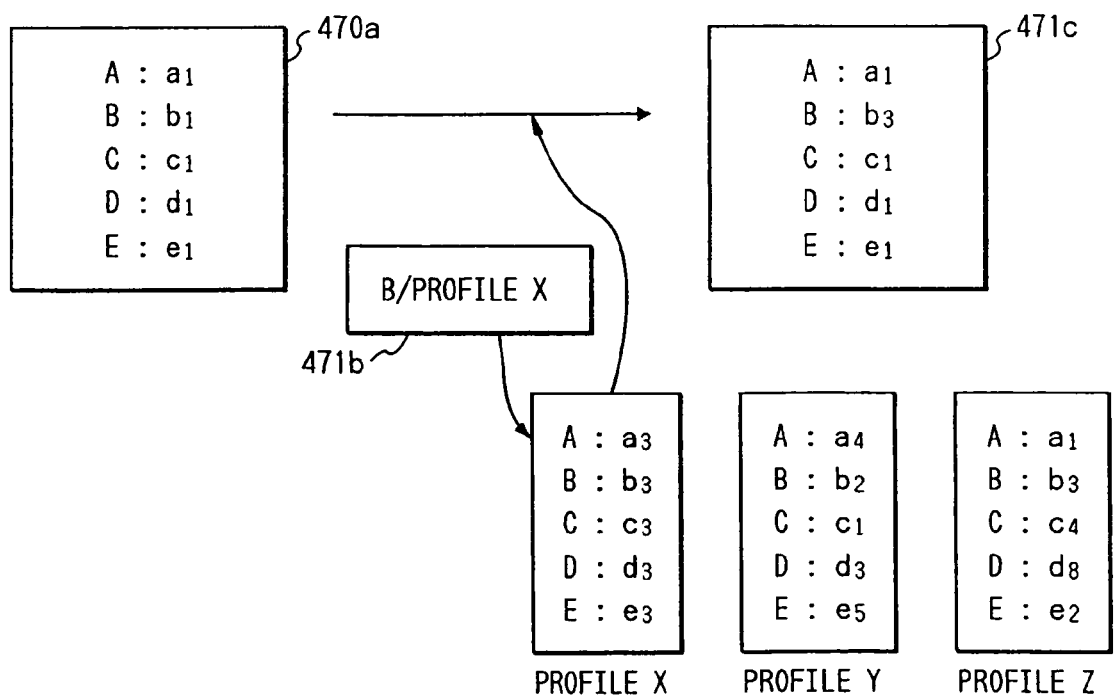

FIGS. 50a and 50b are schematic representations showing one example of the case where attributes are changed without the use of default attribute information and the case where attributes are changed with the use of default attribute information.

As shown in FIG. 50a, on the assumption that attribute information 470a of a job consists of five attributes A(=a1), B(=b1), C(=c1), D(=d1), and E(=e1), when an instruction 70b for changing the attribute B to b2 is received from the user, the attribute modification section 460a generates new attribute information 470c with its attribute B being changed from b1 to b2 as instructed by the user.

On the other hand, as shown in FIG. 50b, on the assumption that there are three types of profiles, i.e., default profiles X, Y, and Z, when an instruction 471b for changing the attribute B using the default profile X is received, the value b3 of the attribute B is fetched from the default profile X, and the attribute information 470a is changed using the attribute value b3.

As a result of this, it is possible to obtain new attribute information 471c with the value of the attribute B being changed to b3.

In the case of the one-job multidocument, the number of documents included in a job differs depending on jobs. For this reason, if an instruction for changing an attribute with the use of the default value is issued by specifying not a document but a job, a default value is set to the attribute information of a job which all documents included in the job possess.

However, if the user knows the number of documents included in one job, it is possible to specify the attribute modification section in such a way that the attribute of the default file X is applied to documents 1 and 2 and the attribute of the default file Y is applied to documents 3 and 4.

Processing procedures executed by the attribute modification section 460a will be described.

Figure 51:
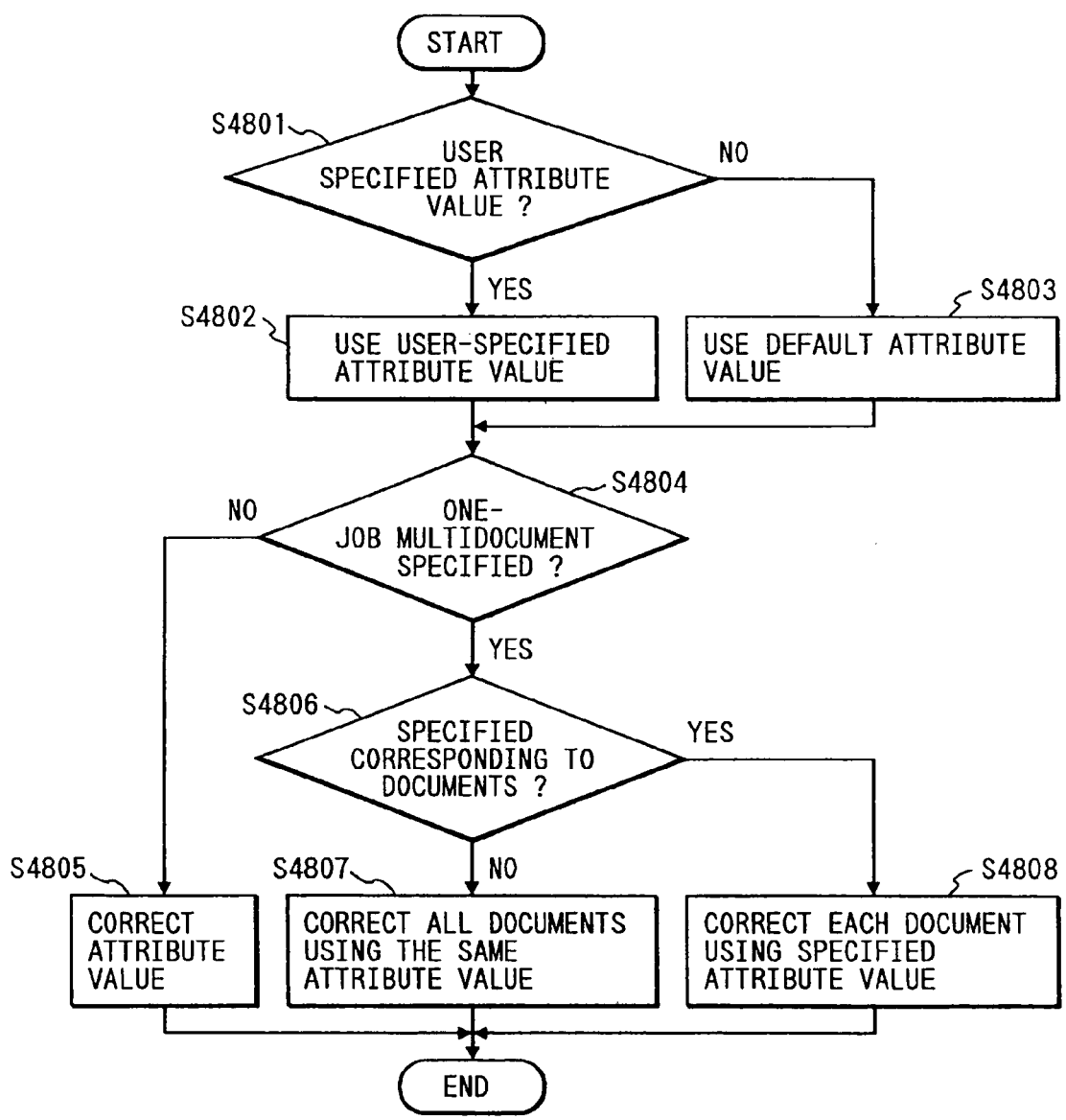
FIG. 51 is a flow chart showing attribute modification processing carried out by the attribute modification section shown in FIG. 49.

FIG. 51 is a flowchart showing procedures for modification of attributes carried out by the attribute modification section 460a shown in FIG. 49.

As shown in FIG. 51, to begin with, upon receipt of an instruction for modification of attribute information, the attribute modification section 460a checks whether or not the user specified an attribute value (step S4801). If the attribute value is specified, the attribute value is utilized (step S4802). If the attribute value is not specified, an attribute value retained in the default profile is utilized (step S4803).

If there are a plurality of default profiles, and if a default profile is specified, an attribute value of that default profile is used. However, if the default profile is not specified, the attribute value of the first profile is utilized.

It is checked whether or not the job is the one-job multi-document (step S4804). If the job is the one-job multidocument, the attribute information is corrected using the attribute value (step S4805).

On the other hand, if the job is the one-job multidocument, it is checked whether or not a profile having an attribute to be changed is specified in such a way as to correspond to a document (step S4806). If the profile is not specified corresponding to a document, the attribute information of all documents is corrected using the same attribute value (step S4807).

On the other hand, if the profile is specified corresponding to a document, the attribute information is corrected using an attribute value specified to each document (step S4808), and the processing is terminated.

Through a series of the above mentioned processing, it is possible to change attribute information not only using the attribute value specified by the user but also using the attribute value stored in the default profiles.

As previously mentioned, according to the seventh embodiment, if a print job processing request is received from the terminal 411a or 411b, the job scheduling device 412b schedules print jobs while moving a print job from one queue to another queue depending on the state of the print job. If an instruction for modification of attribute information of the print job is received during the scheduling of the print job, the attribute modification section 512e changes the attribute information only when the print job is in the state wherein the attribute information thereof is changeable, and when the instruction for modification of the attribute information is free from errors. Even if attribute information is erroneously specified, it is possible to easily change the attribute information while reducing a user's burden, a drop in the use efficiency of a network, and print waiting time.

In the modified example, the attribute modification section 460*a* fetches the default attribute value from the default profile 460*b* and modifies the attribute information. By virtue of such a configuration, it becomes possible to modify the attribute information without the specification of the attribute value by the user.

In the seventh embodiment and the modified example thereof, an explanation was only given of the case where the attribute modification section 512*e* is provided in the job scheduling section 12*b*. However, the attribution modification section 512*e* can be provided independently outside the job scheduling section.

What is claimed is:

1. A job scheduling device which sequentially stores jobs, for which processing requests were received from terminals, in a queue and sequentially processes the jobs held in the queue using a job execution section, said job scheduling device comprising:

a plurality of queues provided corresponding to a status of a sequential job process;

a scheduling unit that schedules the jobs using the plurality of queues, wherein each job has associated job information which includes job status information; and a recovery unit that recovers the status of each of the jobs being held in the plurality of queues, at the time of recovery from a failure, if any failure occurred while the jobs are being scheduled by said scheduling unit, wherein the status recovered by the recovery unit is the status immediately before the occurrences of the failure and wherein if the status of a job is changed due to the failure, the status recovered is a changed status and the job information including the job status information associated with the job having the changed status is updated to reflect the changed status.

* * * * *